(12) United States Patent
Miyaguchi et al.

(10) Patent No.: US 6,256,564 B1
(45) Date of Patent: Jul. 3, 2001

(54) CONTROL APPARATUS OF OCCUPANT PROTECTION DEVICE

(75) Inventors: Koichi Miyaguchi; Yasumasa Kanameda; Joerg Heckel; Masami Okano, all of Tomioka (JP)

(73) Assignee: Bosch Electronics Corporation, Gunma (JP)

( * ) Notice: Subject to any disclaimer, the term of this patent is extended or adjusted under 35 U.S.C. 154(b) by 0 days.

(21) Appl. No.: 09/500,323

(22) Filed: Feb. 8, 2000

(30) Foreign Application Priority Data

Feb. 26, 1999 (JP) .................................................. 11-051202
Apr. 2, 1999 (JP) .................................................. 11-095927

(51) Int. Cl.⁷ .................................................. B60R 21/32
(52) U.S. Cl. ........................... 701/45; 701/46; 280/728.1
(58) Field of Search .................................. 701/45, 46, 47; 280/735, 734, 730.1; 180/271, 232, 282, 268

(56) References Cited

U.S. PATENT DOCUMENTS 5,544,915 * 8/1996 Fendt et al. ........................... 280/735
6,167,335 * 12/2000 Ide et al. .................................. 701/45

FOREIGN PATENT DOCUMENTS 885414    4/1996  (JP) .

* cited by examiner

*Primary Examiner*—Tan Nguyen
(74) *Attorney, Agent, or Firm*—Birch, Stewart, Kolasch & Birch, LLP

(57) ABSTRACT

A control apparatus of an occupant protection device detects whether a vehicle is in a collision requiring to drive the occupant protection device based on at least one front acceleration sensor provided in a front part of the vehicle, in addition to a collision detection based on a room acceleration sensor provided in a room of the vehicle. When the collision is detected based on the front acceleration sensor, an integrated value of an acceleration signal of the room acceleration sensor is increased. Since the front acceleration sensor is provided in the front part of the vehicle, the front acceleration sensor detects a collision acceleration early and gives a sensor output to the control unit, even in case of a collision in which a collision acceleration transmitted to the room acceleration sensor may be weakened. By this, since the integrated value of the room acceleration sensor is increased immediately, the control unit can exactly drive the occupant protection device such as an air bag without causing a delay in collision detection.

48 Claims, 27 Drawing Sheets

FIG. 27
(a) Gf1 (Gf2)
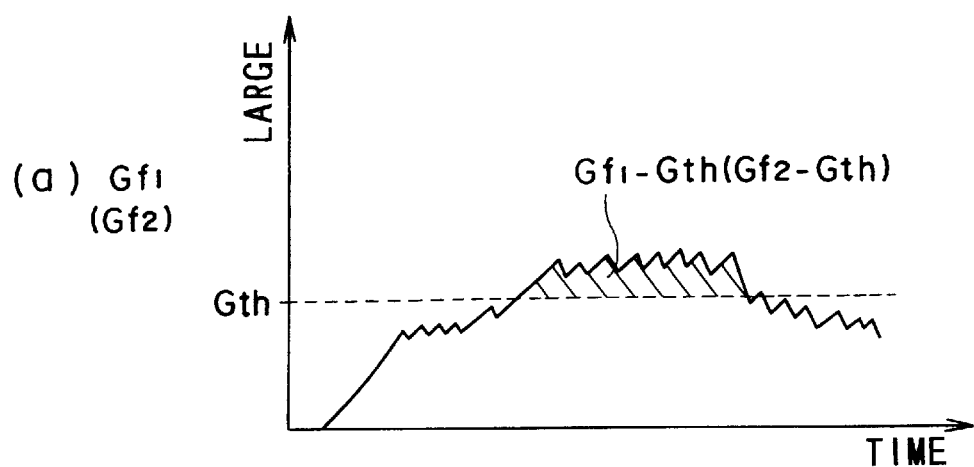
(b) Gf1 (Gf2)
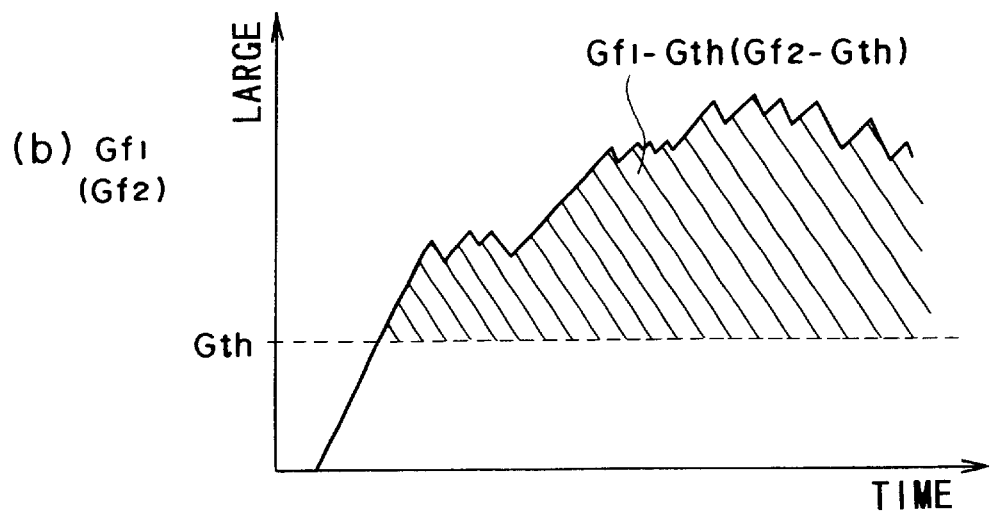

CONTROL APPARATUS OF OCCUPANT PROTECTION DEVICE

BACKGROUND OF THE INVENTION

The present invention relates to a control apparatus for controlling an occupant protection device of a vehicle, such as an airbag and seat-belt tensioner.

A conventional control apparatus for controlling an occupant protection device, as shown in The Japanese Patent Laid Open Publication No. 8-85414, for example, has an acceleration sensor provided on a floor tunnel in a car room. The acceleration sensor detects an acceleration operating to a car body through the floor tunnel, and gives an analog signal representative of the acceleration to the control apparatus. The control apparatus integrates the acceleration signal from the acceleration sensor, detects an occurrence of a collision requiring a drive of an occupant protection device based on a comparison between an integrated value of the acceleration signal and a predetermined collision decision threshold value, and drives the occupant protection device such as an airbag.

By the way, when an impact of collision is absorbed by a crush of a collision part of the car body, it can be assumed that a collision acceleration transmitted to the floor tunnel is weakened. In such a case, since an acceleration detected by the acceleration sensor provided on the floor tunnel is small, though there is no fear of it causing difficulties in occupant protection at time of collision, a fear of causing a delay in driving the occupant protection device exists. In particular, a collision, such as an offset collision or an oblique collision, tends to cause a case in which the acceleration transmitted to the floor tunnel is weakened. Because of this, from the viewpoint of improving a control of the occupant protection device, regardless of whether the collision acceleration transmitted to the acceleration sensor provided in the car room is weakened, an exact control of the occupant protection device is desired.

SUMMARY OF THE INVENTION

It is an object of the present invention to provide an improved control apparatus of an occupant protection device.

Another object of the present invention is to provide a control apparatus that can exactly control the occupant protection device, regardless of whether a collision acceleration transmitted to an acceleration sensor provided in a car room is weakened.

The above and other objects are attained by a control apparatus of an occupant protection device having a room acceleration sensor, provided in a room of a vehicle, for detecting an acceleration of the vehicle and outputting an acceleration signal representative thereof, comprising: at least one front acceleration sensor, provided in a front part of the vehicle, for detecting the acceleration of the vehicle and outputting an acceleration signal representative thereof or an integrated value of the acceleration signal as a sensor output; and a control unit, connected to said room acceleration sensor and said front acceleration sensor, for inputting the acceleration signal of said room acceleration sensor and the sensor output of said front acceleration sensor, said control unit driving the occupant protection device when an integrated value of the acceleration signal of said room acceleration sensor exceeds a predetermined threshold value, said control unit detecting whether the vehicle is in a collision requiring to drive the occupant protection device based on the sensor output of said front acceleration sensor, and increasing the integrated value of said room acceleration sensor when the collision is detected based on the sensor output of said front acceleration sensor.

According to a composition like this, in addition to the collision detection based on the room acceleration sensor, whether the vehicle is in the collision is detected based on the sensor output of the front acceleration sensor provided in the front part of the vehicle. When the collision is detected based on the front acceleration sensor, the integrated value of the acceleration signal of the room acceleration sensor is increased. Since the front acceleration sensor is provided in the front part of the vehicle, the front acceleration sensor detects a collision acceleration early and gives the sensor output to the control unit, even in case of a collision, such as an offset or oblique collision, in which a collision acceleration transmitted to the room acceleration sensor provided in the room of the vehicle may be weakened. By this, since the integrated value of the room acceleration sensor is increased immediately, the control unit can exactly drive the occupant protection device without causing a delay in collision detection.

The above and other objects are also attained by a control apparatus of an occupant protection device having a room acceleration sensor, provided in a room of a vehicle, for detecting an acceleration of the vehicle and outputting an acceleration signal representative thereof, comprising: first and second front acceleration sensors provided in a front part of the vehicle, each of said first and second front acceleration sensors detecting the acceleration of the vehicle and outputting an acceleration signal representative thereof or an integrated value of the acceleration signal as a sensor output; and a control unit, connected to said room acceleration sensor, said first front acceleration sensor and said second front acceleration sensor, for inputting the acceleration signal of said room acceleration sensor and the sensor outputs of said first and second front acceleration sensors, said control unit driving the occupant protection device when an integrated value of the acceleration signal of said room acceleration sensor exceeds a predetermined threshold value, said control unit detecting whether the vehicle is in the collision requiring to drive the occupant protection device based on each of the sensor outputs of said first and second acceleration sensors, respectively, said control unit recognizing a first collision time representative of a time point of the collision detected based on the sensor output of said first front acceleration sensor, and recognizing a second collision time representative of a time point of the collision detected based on the sensor output of said second front acceleration sensor, said control unit adding a predetermined addition value to the integrated value of the acceleration signal of said room acceleration sensor when the time difference between the first collision time and the second collision time is smaller than the predetermined value.

According to a composition like this, the first collision time representative of a time point of the collision detected based on the first front acceleration sensor is recognized, and the second collision time representative of a time point of the collision detected based on the second front acceleration sensor is recognized. And, when the time difference between the first and second collision times is smaller than the predetermined value, the integrated value of the room acceleration sensor is increased. Since the first and second front acceleration sensors are provided in the front part of the vehicle, the front acceleration sensors detect a collision acceleration early and give the sensor outputs to the control unit, even in case of a collision in which a collision acceleration transmitted to the room acceleration sensor provided in the room of the vehicle may be weakened. By this, since the integrated value of the room acceleration sensor is increased immediately, the control unit can exactly drive the occupant protection device.

The above and other objects are also attained by a control apparatus of an occupant protection device having a room acceleration sensor, provided in a room of a vehicle, for detecting an acceleration of the vehicle and outputting an acceleration signal representative thereof, comprising: at least one front acceleration sensor, provided in a front part of the vehicle, for detecting the acceleration of the vehicle and outputting an acceleration signal representative thereof or an integrated value of the acceleration signal as a sensor output; and a control unit, connected to said room acceleration sensor and said front acceleration sensor, for inputting the acceleration signal of said room acceleration sensor and the sensor output of said front acceleration sensor, said control unit computing an added value by adding the integrated value of the acceleration signal of said front acceleration sensor to an integrated value of the acceleration signal of said room acceleration sensor, and driving the occupant protection device when the added value exceeds a predetermined threshold value.

According to a composition like this, the integrated value of the acceleration signal of the front acceleration sensor and the integrated value of the acceleration signal of the room acceleration sensor are added. Since the front acceleration sensor is provided in the front part of the vehicle, the integrated value of the room acceleration sensor is increased immediately, even in case of a collision in which a collision acceleration transmitted to the room acceleration sensor provided in the room of the vehicle may be weakened. Hence, the control unit can exactly drive the occupant protection device.

The above and other objects are also attained by a control apparatus of an occupant protection device having a room acceleration sensor, provided in a room of a vehicle, for detecting an acceleration of the vehicle and outputting an acceleration signal representative thereof, comprising: at least one front acceleration sensor, provided in a front part of the vehicle, for detecting the acceleration of the vehicle and outputting an acceleration signal representative thereof; and a control unit, connected to said room acceleration sensor and said front acceleration sensor, for inputting the acceleration signals of said room and front acceleration sensors, said control unit computing an acceleration added value by adding the acceleration signal of said front acceleration sensor to the acceleration signal of said room acceleration sensor, and computing an integrated value of the acceleration added value, said control unit driving the occupant protection device when the integrated value of the acceleration added value exceeds a predetermined threshold value.

According to a composition like this, the acceleration added value is computed by adding the acceleration signal of the front acceleration sensor to the acceleration signal of the room acceleration sensor, and the integrated value of the acceleration added value is computed. Since the front acceleration sensor is provided in the front part of the vehicle, the integrated value of the acceleration added value is increased immediately, even in case of a collision in which a collision acceleration transmitted to the room acceleration sensor provided in the room of the vehicle may be weakened. Hence, the control unit can exactly drive the occupant protection device.

Furthermore, the above and other objects are attained by a control apparatus of an occupant protection device having a room acceleration sensor, provided in a room of a vehicle, for detecting an acceleration of the vehicle and outputting an acceleration signal representative thereof, comprising: at least one front acceleration sensor, provided in a front part of the vehicle, for detecting the acceleration of the vehicle and outputting an acceleration signal representative thereof; and a control unit, connected to said room acceleration sensor and said front acceleration sensor, for inputting the acceleration signals of said room and front acceleration sensors, said control unit extracting an acceleration part over a predetermined value from the acceleration signal of said front acceleration sensor, and computing an integrated value of the acceleration part, said control unit computing an added value by adding the integrated value of the acceleration part to an integrated value of the acceleration signal of said room acceleration sensor, and driving the occupant protection device when the added value exceeds a predetermined threshold value.

According to a composition like this, the integrated value of the acceleration part over the predetermined value in the acceleration signal of the front acceleration sensor is added to the integrated value of the acceleration signal of the room acceleration sensor. Because of this, the integrated value of the room acceleration sensor is increased immediately, even in case of a collision in which a collision acceleration transmitted to the room acceleration sensor provided in the room of the vehicle may be weakened. Moreover, since the integrated value of the acceleration part over the predetermined value in the acceleration signal of the front acceleration sensor is added to the integrated value of the room acceleration sensor, a difference in dimension between an integrated value of the front acceleration sensor at the time of a small collision and an integrated value of the front acceleration sensor at the time of a big collision becomes more apparent. Hence, it is easy to distinguish between an collision requiring to drive the occupant protection device and an collision not requiring to drive it.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects, features and attendant advantages of the present invention will be appreciated as the same become better understood by means of the following description and accompanying drawings wherein:

FIG. 27 is an explanatory drawing for explaining an or integration processing of a acceleration signal of a front acceleration sensor in the ninth embodiment of FIGS. 25, 26, and 20.

DETAILED DESCRIPTION OF THE INVENTION

Figure 1:
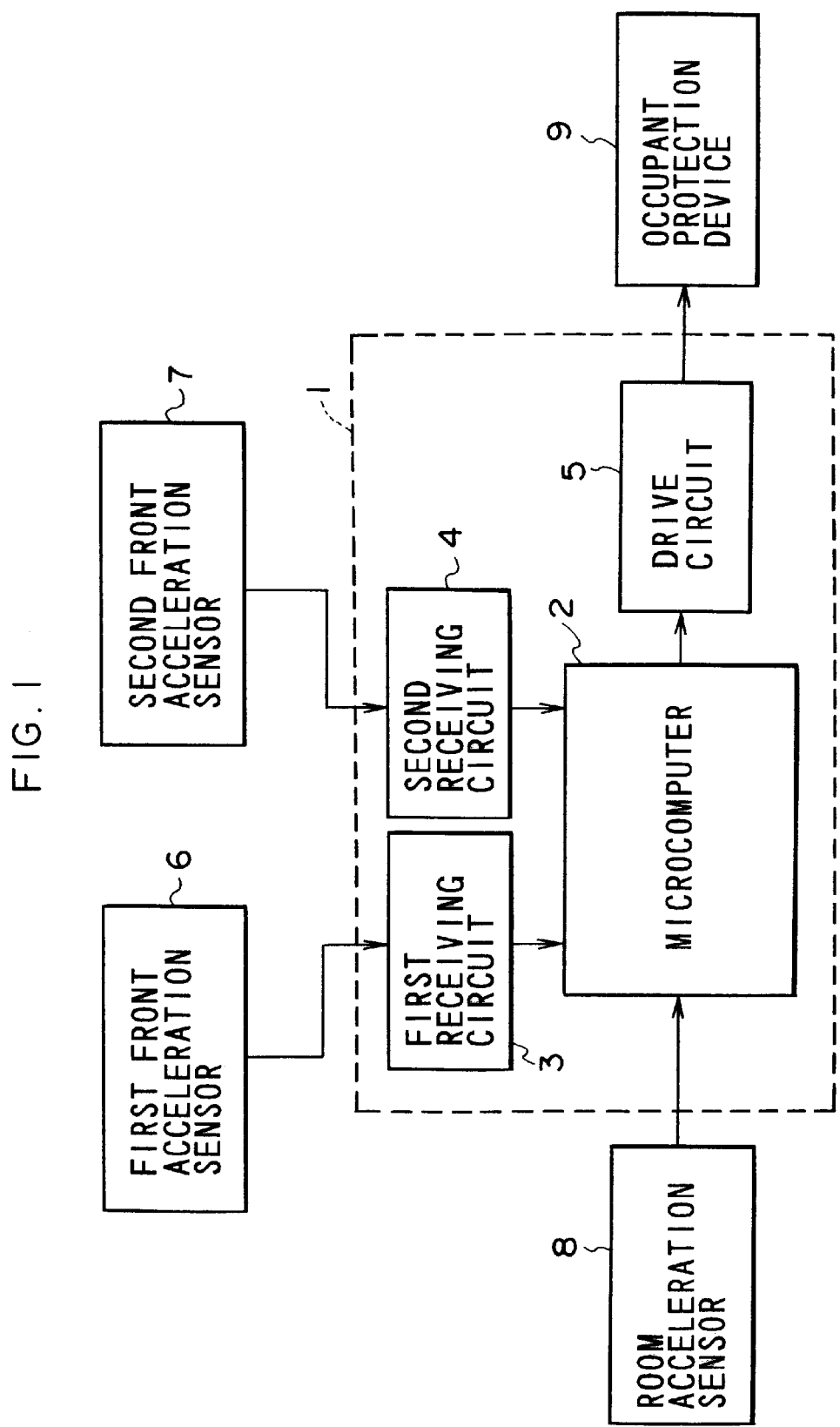
FIG. 1 is a block diagram showing a first embodiment of the present invention.

In FIG. 1, a reference numeral 1 is a control unit. The control unit 1 has a microcomputer 2, first and second receiving circuits 3 and 4, and a drive circuit 5. The microcomputer 2 inputs sensor outputs of first and second front acceleration sensors 6 and 7 by way of the first and second receiving circuits 3 and 4, inputs a sensor output of a room acceleration sensor 8, and gives a collision detection signal to the drive circuit 5 based on the sensor outputs of the acceleration sensors 6–8. The drive circuit 5, when the collision detection signal is input, outputs a drive signal to an occupant protection device 9, and thereby the occupant protection device 9 is driven. The occupant protection device 9 concretely is an airbag or a seat-belt tensioner. The control unit 1 is provided on a floor tunnel in a car room.

The first and second front acceleration sensors 6 and 7 are provided at front parts of a vehicle, for example, at left and right ends of a radiator mount maintaining a radiator, respectively, so that the first and second front acceleration sensors 6 and 7 can detect a collision acceleration early in case of a collision, such as an offset collision and an oblique collision. Therefore, for example, the first front acceleration sensor 6 is positioned near a left fender of the front part of the vehicle, and the second front acceleration sensor 7 is positioned near a right fender of the front part of the vehicle. Since the first and second front acceleration sensors 6 and 7 have a temperature compensation function as described below, the front acceleration sensors 6 and 7 can be provided without requiring a consideration whether they receive heat from an engine. The first and second front acceleration sensors 6 and 7 each have a circuit composition shown in FIG. 2.

Figure 2:
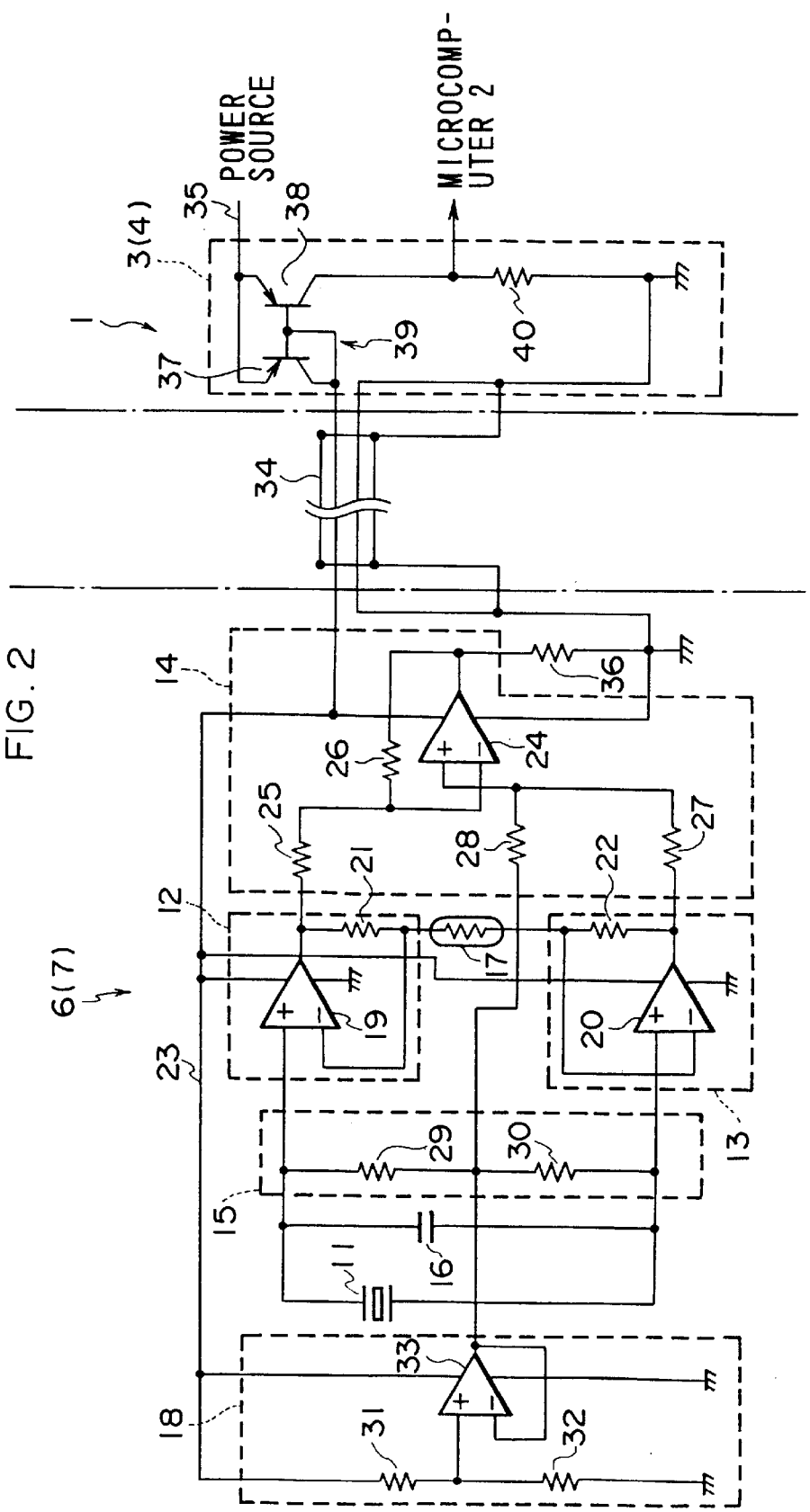
FIG. 2 is a circuit diagram showing an example of first and second front acceleration sensors and first and second receiving circuits in FIG. 1.

FIG. 2 is a circuit diagram showing an example of the front acceleration sensors 6 and 7 and the receiving circuits 3 and 4 of the control unit 1 in FIG. 1.

The first (second) front acceleration sensor 6 (7) includes a piezo-electric element 11 for detecting an acceleration, an amplifier circuit having first and second non-inverting amplifier circuits 12 and 13 and a differential amplifier circuit 14, a bias resistor circuit 15, a condenser 16, a temperature compensation element 17 as temperature compensation means, and a reference voltage circuit 18.

The first non-inverting amplifier circuit 12 of the amplifier circuit has a bipolar transistor type operational amplifier 19 and a resistor 21 inserted between a negative input terminal and an output terminal of the operational amplifier 19. The second non-inverting amplifier circuit 13 of the amplifier circuit has a bipolar transistor type operational amplifier 20 and a resistor 22 inserted between a negative input terminal and an output terminal of the operational amplifier 20. An operating power source of the operational amplifiers 19 and 20 is supplied from a sensor power supply line 23. As described below, the control unit 1 supplies a predetermined constant voltage to the sensor power supply line 23 by way of the receiving circuit 3 (4). A positive input terminal of the operational amplifier 19 of the first non-inverting amplifier circuit 12 is connected to one end of the piezo-electric element 11, and a positive input terminal of the operational amplifier 20 of the second non-inverting amplifier circuit 13 is connected to the other end of the piezo-electric element 11. By this, voltage outputs at both ends of the piezo-electric element 11 are non-inversion amplified and converted to low impedances respectively by the first and second non-inverting amplifier circuits 12 and 13. Since the voltage outputs of the piezo-electric element 11 are lowered by a parallel insertion of the condenser 16 to the piezo-electric element 11 as described below, the resistors 21 and 22 of the first and second non-inverting amplifier circuits 12 and 13 are set to relatively high value so that decrement in the voltage outputs of the piezo-electric element 11 can be supplemented by gains of the operational amplifiers 19 and 20.

The differential amplifier circuit 14 of the amplifier circuit has a bipolar transistor type operational amplifier 24. An operating power source of the operational amplifier 24 is supplied from the sensor power supply line 23. A negative input terminal of the operational amplifier 24 is connected through a resistor 25 to the output terminal of the operational amplifier 19 of the first non-Inverting amplifier circuit 12, and is also connected through a resistor 26 to an output terminal thereof. A positive input terminal of the operational amplifier 24 is connected through a resistor 27 to the output terminal of the operational amplifier 20 of the second non-inverting amplifier circuit 13, and also receives a reference potential from the reference voltage circuit 18 through a resistor 28. The differential amplifier circuit 14 differentially amplifies the outputs of the first and second non-inverting amplifier circuits 12 and 13, and outputs an acceleration signal as the sensor output. As described below, the reference potential given from the reference voltage circuit 18 to the differential amplifier circuit 14 is given by way of a reference voltage buffer amplifier 33 so as to match with output impedances of the first and second non-inverting amplifier circuits 12 and 13. By this, a common mode rejection ratio of the differential amplifier circuit 14 becomes large. Accordingly, an influence of offset voltage due to the gain increment of the first and second non-inverting amplifier circuits 12 and 13 is suppressed by the differential amplifier circuit 14.

The bias resistor circuit 15 has a bias resistor 29 inserted between the positive input terminal of the first non-inverting amplifier circuit 12 and the reference potential of the reference voltage circuit 18, and a bias resistor 30 inserted between the positive input terminal of the second non-inverting amplifier circuit 13 and the reference potential of the reference voltage circuit 18. The condenser 16 is inserted in parallel with the piezo-electric element 11 so that a composite capacity with the piezo-electric element 11 increases. By this, a lower cut-off frequency is lowered without increasing resistor values of the bias resistors 29 and 30. Since the control unit 1 performs a collision decision by converting the acceleration signals from the first and second front acceleration sensors 6 and 7 into velocities, it is necessary to give even a lower frequency in which velocity variations can be detected more easily. For example, it is desirable to give a frequency even below 10 Hz. Also, when the bias resistors 29 and 30 are set, for example, to high resistance values of about 100 MΩ in order to lower the lower cut-off frequency, it is not possible to use these resistors under a normal atmosphere. Further, when the bias resistor 29 and 30 are set to the high resistance values as mentioned above, a DC voltage may be applied to the piezo-electric element 11 by influence of bias current, and thereby a migration may be caused in the piezo-electric element 11. Because of this, it is desirable to set the bias resistors 29 and 30 to about 1 MΩ. Since the lower cut-off frequency is determined by the composite capacity of the piezo-electric element 11 and the condenser 16 and the resistance values of the bias resistors 29 and 30, a capacity value of the condenser 16 is set so that the bias resistors 29 and 30 are about 1 MΩ, and furthermore, so that the lower cut-off frequency is a low value below 10 Hz, for example. Although the voltage outputs of the piezo-electric element 11 are decreased by the parallel insertion of the condenser 16 to the piezo-electric element 11, this is supplemented by the gain increment of the first and second non-inverting amplifier circuits 12 and 13 as mentioned above. Also, since an output-temperature characteristic of the piezo-electric element 11 becomes apparent by the parallel insertion of the condenser 16, the temperature compensation element 17 is provided in order to compensate the output-temperature characteristic of the piezo-electric element 11. The output-temperature characteristic of the piezo-electric element 11 is a positive characteristic. Therefore, the outputs of the piezo-electric element 11 are increased when temperature rises, and are decreased when temperature drops.

The temperature compensation element 17 is inserted between the negative input terminal of the operational amplifier 19 of the first non-inverting amplifier circuit 12 and the negative input terminal of the operational amplifier 20 of the second non-inverting amplifier circuit 13. In this example, the temperature compensation element 17 is a posistor. The posistor 17 lowers the gains of the first and second non-inverting amplifier circuits 12 and 13 when temperature rises, and raises these gains when temperature drops. By this, the outputs of the piezo-electric element 11 is compensated against temperature variations. Since the gains of the first and second non-inverting amplifier circuits 12 and 13 are adjusted by a single temperature compensation element, decrement in number of elements and simplification of circuit composition can be achieved.

The reference voltage circuit 18 has a series connection of voltage dividing resistors 31 and 32 inserted between the sensor power supply line 23 and the ground, and the reference voltage buffer amplifier 33 composed of a bipolar transistor type operational amplifier. The buffer amplifier 33 receives a voltage divided by the voltage dividing resistors 31 and 32 as a positive input, and a negative input terminal is connected to its output terminal. The reference voltage circuit 18 gives the reference potential to the differential amplifier circuit 14 and the bias resistor circuit 15 by way of the buffer amplifier 33. Thus, matching with the output impedances of the first and second non-inverting amplifier circuits 12 and 13 can be attained, and thereby the common mode rejection ratio of the differential amplifier circuit 14 is increased. An operating power source of the reference voltage buffer amplifier 33 is supplied from the sensor power supply line 23. Since the sensor outputs of the first and second front acceleration sensors 6 and 7 are transmitted as current variations in the sensor power supply line 23 to the control unit 1 as described below, the voltage dividing resistors 31 and 32 are set to relatively high values of some KΩ so that a current flowing through the resistors 31 and 32 to the ground becomes small. Incidentally, in this example the reference potential is given to the bias resistor circuit 15 by way of the reference voltage buffer amplifier 33, but it is also acceptable to directly give the divided voltage of the resistors 31 and 32 to the bias resistor circuit 15.

The sensor power supply line 23 of the first (second) front acceleration sensor 6 (7) is connected to the first (second) receiving circuit 3 (4) of the control unit 1 by way of a transmission cable 34, and receives a predetermined constant voltage from a unit power supply line 35 in the control unit 1 by way of the first (second) receiving circuit 3 (4). In this example, from the viewpoint of noise prevention, a twisted pair cable is used as the transmission cable 34. The output terminal of the operational amplifier 24 of the differential amplifier circuit 14 which gives the sensor output of the front acceleration sensor 6 (7) is grounded through an output resistor 36, and thereby the sensor output is given as current variations in the sensor power supply line 23 to the receiving circuit 3 (4) by way of the twisted pair cable 34. Incidentally, since the operational amplifiers 19, 20, 24 and 33 in the front acceleration sensor 6 (7) operate with nearly a constant current, the operating current of the operational amplifiers 19, 20, 24 and 33 does not affect the sensor output given as current variations.

The first (second) receiving circuit 3 (4) of the control unit 1 has a current mirror circuit 39 having a pair of transistors 37 and 38, and a detection resistor 40. One transistor 37 of the current mirror circuit 39 at its emitter is connected to the unit power supply line 35, at its collector is connected to the sensor power supply line 23 by way of the twisted pair cable 34, and at its base is connected to the collector and a base of the other transistor 38. The other transistor 38 at its emitter is connected to the unit power supply line 35, and at its collector is grounded through the detection resistor 40. The sensor output from the front acceleration sensor 6 (7) is given as a voltage signal to the microcomputer 2 by the detection resistor 40.

In the circuit of FIG. 2, when the piezo-electric element 11 does not detect any acceleration, the differential amplifier circuit 14 gives a prescribed voltage output based on the reference potential of the reference voltage circuit 18, and thereby a prescribed current flows through the output resistor 36 to the ground. Accordingly, a certain current corresponding to the prescribed current which flows through the output resistor 36 of the front acceleration sensor 6 (7) is given to the unit power supply line 35 of the control unit 1 by way of the sensor power supply line 23 and the twisted pair cable 34. In the first (second) receiving circuit 3 (4), the pair of transistors 37 and 38 give a current to the detection resistor 40 based on base-emitter voltages according to the certain current flowing through the unit power supply line 35. Thus, a prescribed voltage signal indicating that no acceleration is detected is given by way of the detection resistor 40 to the microcomputer 2. The microcomputer 2 inputs the prescribed voltage signal by way of A/D conversion.

On the other hand, when the piezo-electric element 11 detects an acceleration, the voltage outputs of the both ends of the piezo-electric element 11 are non-inversion amplified by the first and second non-inverting amplifier circuits 12 and 13, respectively, and the non-inversion amplified outputs are differentially amplified by the differential amplifier circuit 14. By this, the differential amplifier circuit 14 gives a voltage output which varies according to the detected acceleration, and the voltage output is given as current variations to the unit power supply line 35 of the control unit 1 by way of the output resistor 36. In the receiving circuit 3 (4), a base-emitter voltage of one transistor 37 of the current mirror circuit 39 varies according to the current variations in the unit power supply line 35, that is, the sensor output of the front acceleration sensor 6 (7). By this, the other transistor 38 gives the detection resistor 40 a collector current so that a base-emitter voltage of the other transistor 38 is the same potential as the base-emitter voltage of one transistor 37. By this, the sensor output of the front acceleration sensor 6 (7) is given as a voltage signal by the detection resistor 40, and the microcomputer 2 inputs the voltage signal by way of A/D conversion. If the detection resistor 40 is set to the same resistance value as that of the output resistor 36 of the front acceleration sensor 6 (7), a voltage nearly the same as a voltage at both ends of the output resistor 36 is given from the detection resistor 40.

According to the composition of FIG. 2, the output fluctuations of the piezo-electric element 11 due to variations in ambient temperature are compensated by the gain adjustments of the first and second non-inverting amplifier circuits 12 and 13 by means of the temperature compensation element 17. Because of this, even when the front acceleration sensor 6 (7) is provided in a place with extreme ambient temperature variations such that it directly receives heat from the vehicle engine, the sensor output of the front acceleration sensor 6 (7) does not fluctuate by variations in ambient temperature.

Also, by inserting the condenser 16 in parallel with the piezo-electric element 11, the composite capacity is increased. By this, the lower cut-off frequency can be lowered without increasing the resistance values of the bias resistors 29 and 30. Because of this, the front acceleration sensor 6 (7) can output even a lower frequency, and thereby the sensor output that facilitates a collision decision can be given. Also, it is not necessary to set the bias resistors 29 and 30 to such high resistance values that cannot be used in an ordinary atmosphere. Further, the migration in the piezo-electric element 11, occurring by setting the bias resistors 29 and 30 to high resistance values, can be prevented.

Also, the sensor output of the front acceleration sensor 6 (7) is transmitted to the receiving circuit 3 (4) of the control unit 1 as current variations in the power supply lines 23, 34 and 35. Because of this, it is not necessary to provide a signal line. Also, since it is not necessary to use a ground potential by car body grounding as a reference, noise prevention can be done more effectively.

Further, the receiving circuit 3 (4) of the control unit 1 is formed with the current mirror circuit 39 comprising the transistors 37 and 38. Because of this, since temperature characteristics of the base-emitter voltages of the transistors 37 and 38 are cancelled, no temperature compensation means is required. Also, since the receiving circuit 3 (4) operates with a voltage supplied to the front acceleration sensor 6 (7), there is no need to prepare another operating voltage, and the composition of the receiving circuit 3 (4) can be simplified in the extreme.

Reverting to FIG. 1, the room acceleration sensor 8 is provided on the floor tunnel in the car room together with the control unit 1. The room acceleration sensor 8 detects an acceleration transmitted through the floor tunnel, and gives an acceleration signal to the microcomputer 2 as the sensor output. Since the room acceleration sensor 8 is provided on the floor tunnel In the car room, in case of a collision in which a collision acceleration transmitted to the floor tunnel is weakened because of an impact absorption by a crush of the car body, there is a fear that the collision acceleration detected by the room acceleration sensor 8 is small. However, in case of a collision, such as a head-on collision, in which the collision acceleration is easily transmitted to the floor tunnel, the collision acceleration can be detected early by the room acceleration sensor 8. As the room acceleration sensor 8, a well-known acceleration sensor can be used, or an acceleration sensor which is composed likewise the front acceleration sensor 6 (7) in FIG. 2 can be used.

The microcomputer 2 of the control unit 1 executes the following controls according to flow diagrams of FIG. 3, FIG. 4 and FIG. 5 described below. The microcomputer 2, based on each of the acceleration signals from the first and second front acceleration sensors 6 and 7, decides whether the vehicle is in a collision requiring a drive of the occupant protection device 9, respectively, and increases an integrated value of the acceleration signal of the room acceleration sensor 8 when the collision is detected based on the acceleration signal of the first front acceleration sensor 6 and/or the acceleration signal of the second front acceleration sensor 7. And, when the integrated value of the acceleration signal of the room acceleration sensor 8 exceeds a predetermined room threshold value, the microcomputer 2 outputs the collision detection signal to the drive circuit 5.

Figure 3:
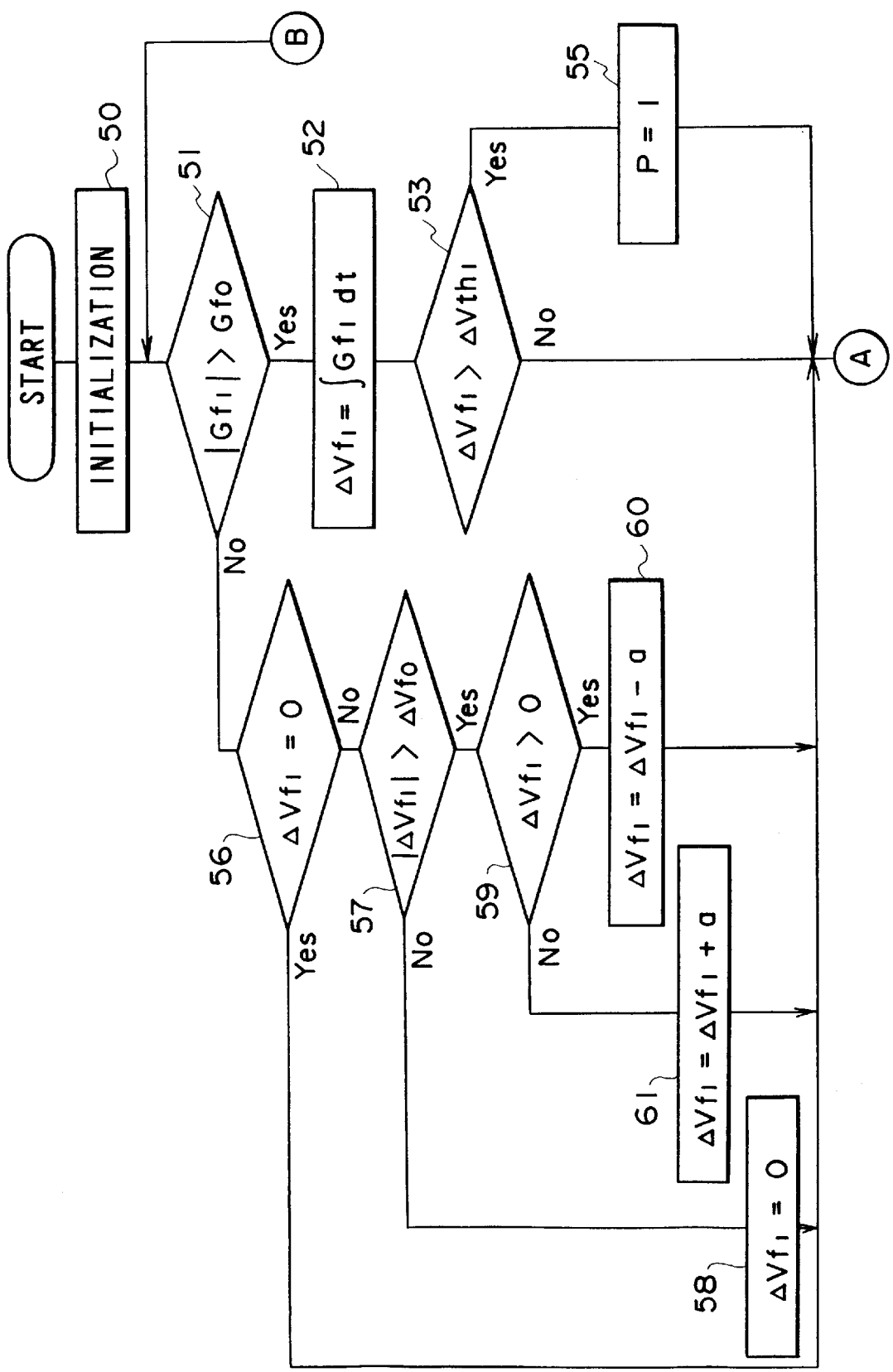
FIG. 3, FIG. 4 and FIG. 5 are flow diagrams of a microcomputer in FIG. 1.
Figure 4:
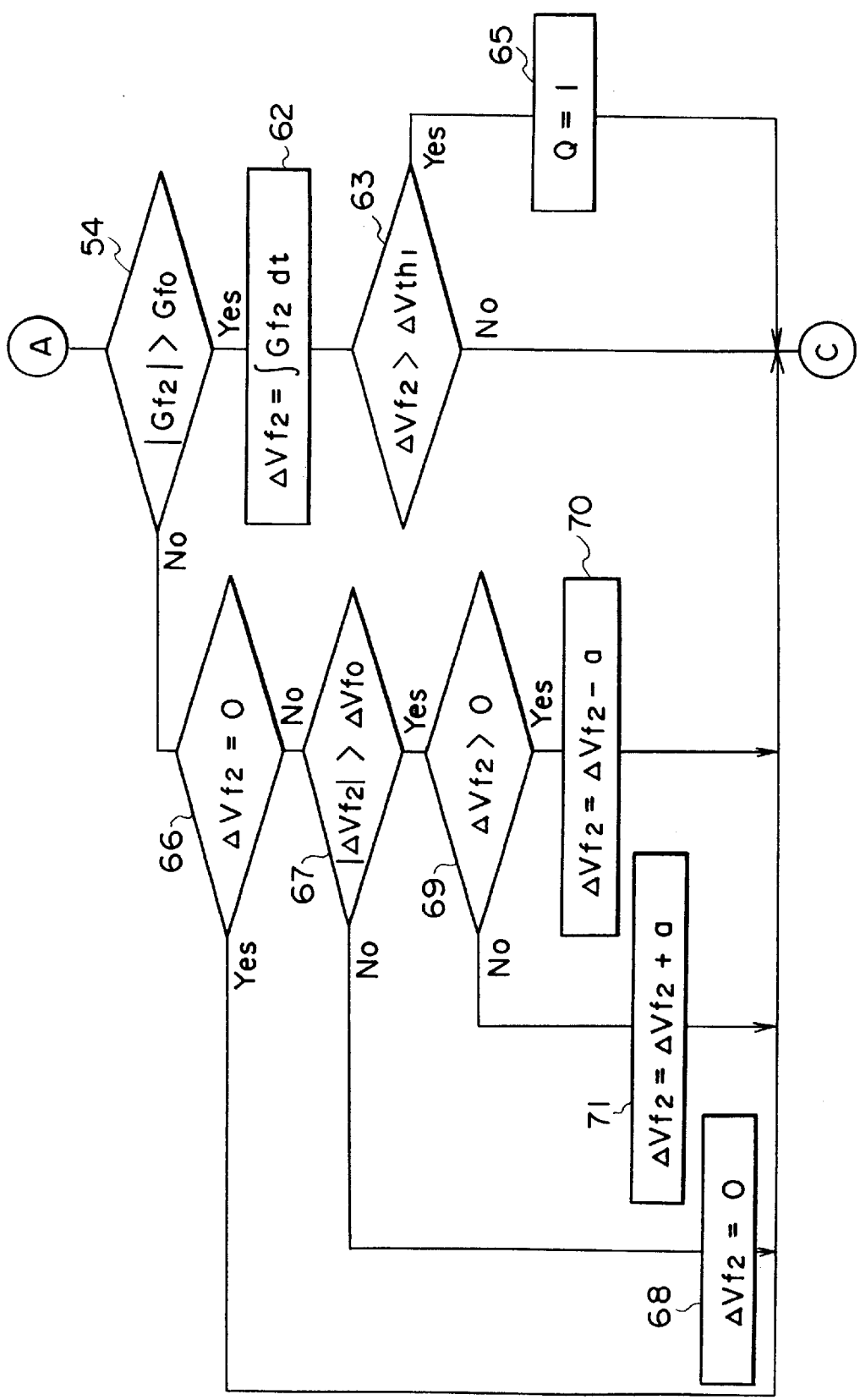
Figure 5:
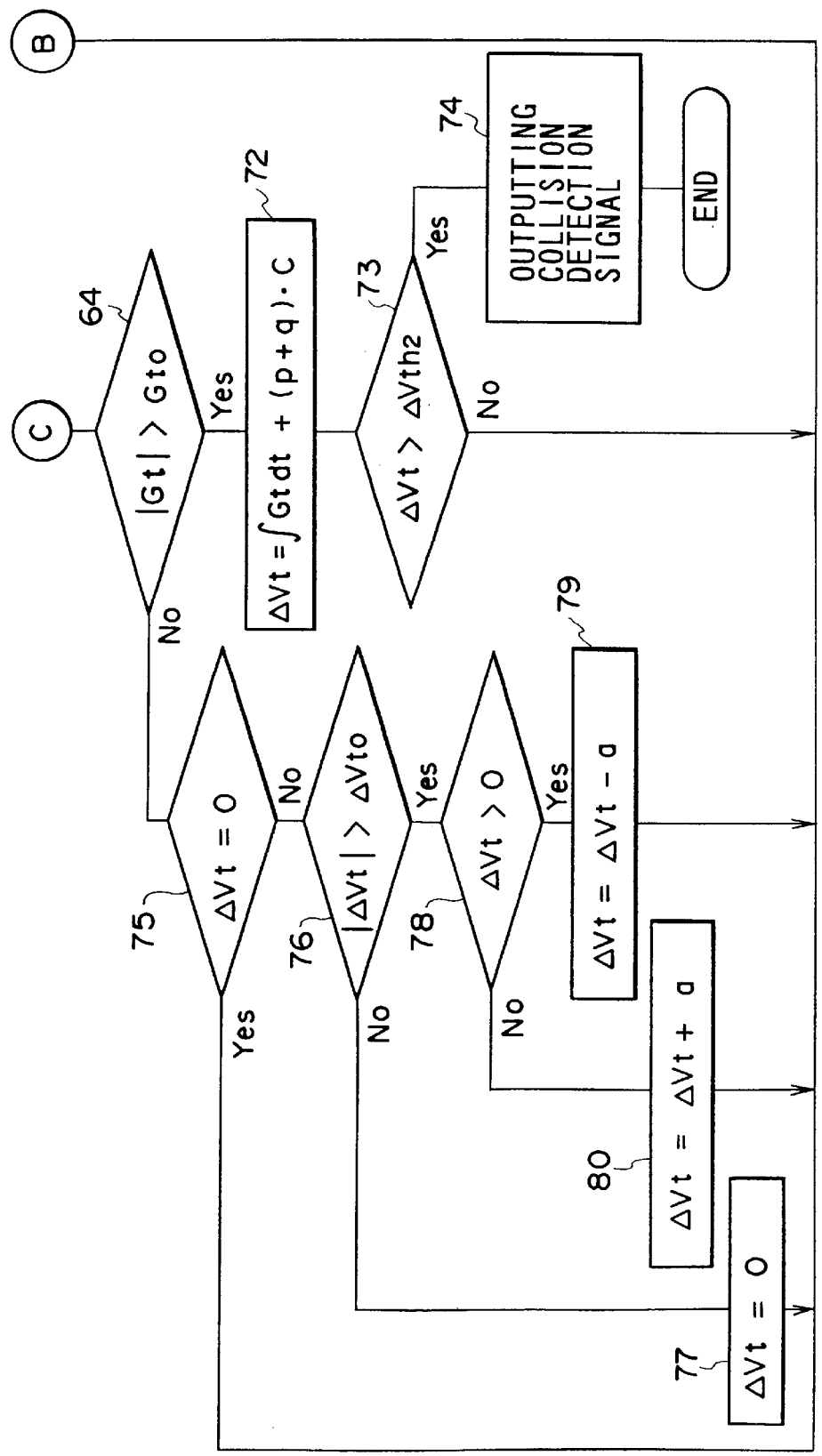

FIG. 3, FIG. 4 and FIG. 5 are flow diagrams of the microcomputer 2 in FIG. 1. A terminal A of FIG. 4 is connected to a terminal having the same sign A of FIG. 3, and terminals B and C of the FIG. 5 are connected to terminals having the same signs B and C of FIG. 3 and FIG. 4.

When a power source is applied by turning on an ignition switch (not shown in the drawings) of the vehicle, the microcomputer 2 of the control unit 1 starts the control processing according to the flow diagrams, and enters a step 51 after an initialization in a step 50.

In the step 51, the microcomputer 2 inputs an acceleration signal Gf1 of the first front acceleration sensor 6, and decides whether an absolute value of the acceleration signal Gf1 is larger than a front reference value Gfo. The front reference value Gfo is a reference value for deciding whether to integrate the acceleration signal Gf1 and an acceleration signal Gf2. As described below, the acceleration signal Gf2 is the sensor output of the second front acceleration sensor 7. The front reference value Gfo is set so that an integration of the acceleration signals Gf1 and Gf2 is not performed against a non-collision acceleration of the vehicle occurring by a sudden braking and so on. In the step 51, when the absolute value of the acceleration signal Gf1 is larger than the reference value Gfo, the microcomputer 2 enters from the step 51 to a step 52 and computes an integrated value ΔVf1 of the acceleration signal Gf1. In a following step 53, the microcomputer 2 decides whether the integrated value ΔAf1 is larger than a front threshold value ΔAth1. The front threshold value ΔAth1 is a threshold value for deciding whether the vehicle is in the collision requiring to drive the occupant protection device 9, and is a threshold value in relation to the integrated value ΔAf1 and an integrated value ΔAf2. As described below, the integrated value ΔAf2 is an integrated value of the acceleration signal Gf2 of the second front acceleration sensor 7. In the step 53, when the integrated value ΔAf1 is not larger than the threshold value ΔAth1, the microcomputer 2 enters a step 54 of FIG. 4. When the integrated value ΔAf1 is larger than the threshold value ΔAth1, the microcomputer 2 recognizes the occurrence of the collision and enters a step 55. In the step 55, a first increment flag P which has been reset to "0" by the initialization in the step 50 is set to "1". The first increment flag P is a flag for setting a factor p of an addition value {(p+q)×C} in a step 72 of FIG. 5 to "1" or "0". The factor p is "0" when the flag P is "0", and the factor p is set to "1" when the flag P is set to "1". Thereafter, the microcomputer 2 enters the step 54 of FIG. 4.

On the other hand, in the step 51, when the absolute value of the acceleration signal Gf1 is not larger than the front reference value Gfo, the microcomputer 2 enters a reset processing of steps 56–61, and goes to the step 54 of FIG. 4 after the reset processing. In the step 56 of the reset processing, whether the integrated value ΔVf1 is "0" is decided. If the absolute value of the acceleration signal Gf1 has not exceeded the front reference value Gfo yet after starting the control processing, the integrated value ΔVf1 is the initial value namely "0". Accordingly, the microcomputer 2 directly enters from the step 56 to the step 54 of FIG. 4. When the integrated value ΔVf1 is not "0", the microcomputer 2 enters from the step 56 to the step 57 and decides whether the absolute value of the integrated value ΔVf1 is larger than a front reset reference value ΔVfo. The front reset reference value ΔVfo is a reference value for deciding whether to reset the integrated value ΔVf1 of the first front acceleration sensor 6 and the integrated value ΔVf2 of the second front acceleration sensor 7 to "0". In this embodiment, the front reset reference value ΔVfo is set as a<ΔVfo<2a. "a" is a subtraction value described below. When the absolute value of the integrated value ΔVf1 is not larger than the reference value ΔVfo, the microcomputer 2 enters from the step 57 to the step 58, resets the integrated value ΔVf1 to "0", and enters the step 54 of FIG. 4. When the absolute value of the integrated value ΔVf1 is larger than the reference value ΔVfo, the microcomputer 2 enters from the step 57 to the step 59 and decides whether the integrated value ΔVf1 is larger than "0". When the integrated value ΔVf1 is larger than "0", the subtraction value "a" is subtracted from the integrated value ΔVf1 in the step 60. When the integrated value ΔVf1 is not larger than "0", the subtraction value "a" is added to the integrated value ΔVf1 in the step 61. Thereafter, the microcomputer 2 enters the step 54 of FIG. 4. Since the acceleration signals Gf1 and Gf2 of the first and second front acceleration sensors 6 and 7 fluctuate by resonance and so on, the acceleration signals Gf1 and Gf2 may temporally become smaller than the front reference value Gfo after they becoming larger than the value Gfo while detecting a collision acceleration. In such a case, in this embodiment, a prior integrated value is not immediately reset to "0", but it is processed gradually toward the rest direction by means of the subtraction value "a". Because of this, when the acceleration signals Gf1 and Gf2 exceed the front reference value Gfo again, the integral processing can be continued from the prior integrated value, and thereby a collision detection can be performed quickly. Incidentally, the integrated value ΔVf1 becomes smaller than "0" in the step 59 when the vehicle is collided from behind, for example. In such a case, since the integrated value ΔVf1 becomes a negative value, the first increment flag P is not set. And, an integrated value in such a case is processed toward the reset direction by the step 61, and thereby a continuance of an unstable signal is prevented.

In the step 54 of FIG. 4, the microcomputer 2 inputs the acceleration signal Gf2 of the second front acceleration sensor 7, and decides whether the absolute value of the acceleration signal Gf2 is larger than the front reference value Gfo. In the step 54, when the absolute value of the acceleration signal Gf2 is larger than the reference value Gfo, the microcomputer 2 enters a step 62 and computes the integrated value ΔVf2 of the acceleration signal Gf2. In a following step 63, the microcomputer 2 decides whether the integrated value ΔVf2 is larger than the front threshold value ΔVth1. When the integrated value ΔVf2 is not larger than the threshold value ΔVth1, the microcomputer 2 enters from the step 63 to a step 64 of FIG. 5. When the integrated value ΔVf2 is larger than the threshold value ΔVth1, the microcomputer 2 recognizes an occurrence of the collision, and enters a step 65. In the step 65, a second increment flag C which has been reset to "0" by the initialization in the step 50 is set to "1". The second increment flag Q is a flag for setting a factor q of the addition value {(p+q)×C} in the step 72 of FIG. 5 to "1" or "0". The factor q is "0" when the flag Q is "0", and the factor q is set to "1" when the flag Q is set to "1". Thereafter, the microcomputer 2 enters the step 64 of FIG. 5.

On the other hand, in the step 54, when the absolute value of the acceleration signal Gf2 is not larger than the front reference value Gfo, the microcomputer 2 enters a reset processing of steps 66–71, and goes to the step 64 of FIG. 5 after the reset processing. In the reset processing of the steps 66–71, the same processing as the aforementioned reset processing of the steps 56–61 in relation to the first front acceleration sensor 6 is executed. That is, in the step 66, whether the integrated value ΔVf2 is "0" is decided. When the integrated value ΔVf2 is "0", the microcomputer 2 directly enters from the step 66 to the step 64 of FIG. 5. When the integrated value ΔVf2 is not "0", the microcomputer 2 enters from the step 66 to the step 67. In the step 67, whether the absolute value of the integrated value ΔVf2 is larger than the front reset reference value ΔVfo is decided. When the absolute value of the integrated value ΔVf2 is not larger than the reference value ΔVfo, the microcomputer 2 resets the integrated value ΔVf2 to "0" in the step 68, and then enters the step 64 of FIG. 5. When the absolute value of the integrated value ΔVf2 is larger than the reference value ΔVfo, the microcomputer 2 enters from the step 67 to the step 69 and decides whether the integrated value ΔVf2 is larger than "0". When the integrated value ΔVf2 is larger than "0", the subtraction value "a" is subtracted from the integrated value ΔVf2 in the step 70. When the integrated value ΔVf2 is not larger than "0", the subtraction value "a" is added to the integrated value ΔVf2 in the step 71. Thereafter, the microcomputer 2 enters the step 64 of FIG. 5. Incidentally, in such a case in which the vehicle is collided from behind, the second increment flag Q is not set since the integrated value ΔVf2 becomes a negative value. And, an integrated value in such a case is processed toward the reset direction by the step 71.

In the step 64 of FIG. 5, the microcomputer 2 inputs an acceleration signal Gt of the room acceleration sensor 8, and decides whether the absolute value of the acceleration signal Gt is larger than a room reference value Gto. The room reference value Gto is a reference value for deciding whether to integrate the acceleration signal Gt. The room reference value Gto is set so that an integration of the acceleration signal Gt is not performed against a non-collision acceleration of the vehicle occurring by a sudden braking and so on. In the step 64, when the absolute value of the acceleration signal Gt is larger than the reference value Gto, the microcomputer 2 enters a step 72 and computes an integrated value ΔAt by adding the addition value {(p+q)×C} to an integrated value of the acceleration signal Gt. In the addition value {(p+q)×C}, C is a numerical constant. If neither the first increment flag P nor the second increment flag Q is set, the addition value {(p+q)×C} is "0". If either the flag P or the flag Q is set, the addition value {(p+q)×C} is "C". If both the flags P and Q are set, the addition value {(p+q)×C} is "2C". Therefore, the integrated value ΔVt is increased to {the integrated value of the acceleration signal Gt+C} when either the flag P or the flag Q is set, and is further increased to {the integrated value of the acceleration signal Gt+2C} when both of them are set. The microcomputer 2 enters a step 73 after the step 72, and decides whether the integrated value ΔVt is larger than the room threshold value ΔVth2. The room threshold value ΔVth2 is a threshold value for deciding whether the vehicle is in the collision requiring to drive the occupant protection device 9. The room threshold value ΔVth2 and the aforementioned front threshold value ΔVth1 are set experimentally based on a collision requiring the drive of the occupant protection device 9 and a collision not requiring its drive. In the step 73, when the integrated value ΔVt is not larger than the threshold value ΔVth2, the microcomputer 2 returns to the step 51 of FIG. 3. The microcomputer 2 makes a round of the flow diagrams of FIG. 3, FIG. 4 and FIG. 5 within a very short time. Therefore, even when a collision is in progress, sometimes the integrated value ΔVt does not exceed the threshold value ΔVth2 in the step 73 due to the extent of the integration of the acceleration signal Gt, for example. In such a case, the microcomputer 2 returns to the step 51 of FIG. 3, and the aforementioned control processing is repeated. In the step 73, when the integrated value ΔVt is larger than the threshold value ΔVth2, the microcomputer 2 enters a step 74, outputs the collision detection signal to the drive circuit 5, and finishes the control processing. The drive circuit 5, when the collision detection signal is provided from the microcomputer 2, outputs the drive signal to the occupant protection device 9, and thereby the occupant protection device 9 such as an airbag is driven.

On the other hand, in the step 64, when the absolute value of the acceleration signal Gt is not larger than the room reference value Gto, the microcomputer 2 enters a reset processing of steps 75–80, and returns to the step 51 of FIG. 3 after the reset processing. In the reset processing of the steps 75–80, the same processing as the aforementioned reset processing of the steps 56–61 in relation to the first front acceleration sensor 6 is executed. That is, in the step 75, whether the integrated value ΔVt is "0" is decided. When the integrated value ΔVt is "0", the microcomputer 2 directly returns to the step 51 of FIG. 3. When the integrated value ΔVt is not "0", the microcomputer 2 enters the step 76. In the step 76, whether the absolute value of the integrated value ΔVt is larger than a room reset reference value ΔVto is decided. When the absolute value of the integrated value ΔVt is not larger than the reference value ΔVto, the microcomputer 2 resets the integrated value ΔVt to "0" in the step 77, and then returns the step 51 of FIG. 3. When the absolute value of the integrated value ΔVt is larger than the reference value ΔVto, the microcomputer 2 enters from the step 76 to the step 78. The room reset reference value ΔVto is a reference value for deciding whether to reset the integrated value ΔVt of the room acceleration sensor 8 to "0", and this is set likewise the aforementioned front reset reference value ΔVfo. In the step 78, whether the integrated value ΔVt is larger than "0" is decided. When the integrated value ΔVt is larger than "0", the subtraction value "a" is subtracted from the integrated value ΔVt in the step 79. When the integrated value ΔVt is not larger than "0", the subtraction value "a" is added to the integrated value ΔVt in the step 80. Thereafter, the microcomputer 2 returns the step 51 of FIG. 3. Incidentally, in such a case in which the vehicle is collided from behind, the integrated value of the acceleration signal Gt becomes a negative value, and the flags P and Q are not set as described above. Therefore, the collision detection signal is not provided to the drive circuit 5. And, an integrated value of the acceleration signal Gt in such a case is processed toward the reset direction by the step 80.

According to the first embodiment described above, the first and second increment flags P and Q are set based on the sensor outputs of the first and second acceleration sensors 6 and 7, respectively. When either the flag P or the flag Q is set, the integrated value ΔVt of the room acceleration sensor 8 is increased to {the integrated value of the acceleration signal Gt+C}. When both the flag P and the flag Q are set, the integrated value ΔVt is further increased to {the integrated value of the acceleration signal Gt+2C}. Then, when the integrated value ΔVt exceeds the room threshold value ΔVth2, the occupant protection device 9 is driven. The first and second front acceleration sensors 6 and 7, as described above, are provided at the right and left sides of the front part of the vehicle. Hence, even in case of a collision, such as an oblique or offset collision, in which the collision acceleration transmitted to the room acceleration sensor 8 provided on the floor tunnel may be weakened, the first and/or second front acceleration sensors 6 and 7 can detect the collision acceleration early and give the sensor output to the control unit 1. By this, since the integrated value ΔVt is increased immediately by setting of the flag P and/or the flag Q, the control unit 1 can exactly drive the occupant protection device 9 without causing a delay in collision decision.

A sensitivity of the first and second front acceleration sensors 6 and 7 can easily be changed by changing the front threshold value ΔVth1. Therefore, a sensitivity adjustment according to car types and so on is easy, and a dispersion in sensitivity can also be reduced.

Figure 6:
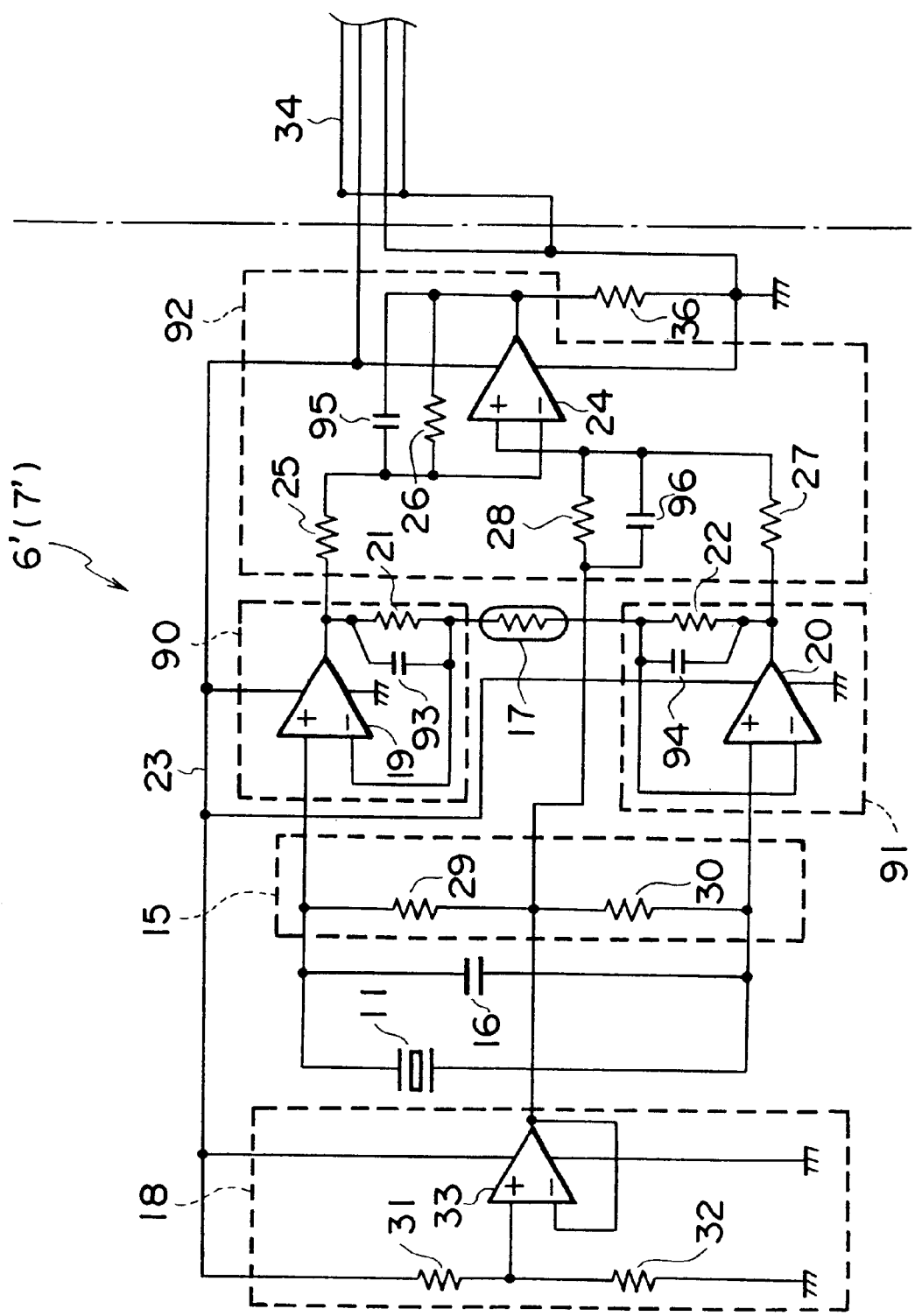
FIG. 6 is a circuit diagram showing another example of the first and second front acceleration sensors in FIG. 1.

FIG. 6 is a circuit diagram showing another example of the first and second front acceleration sensors of FIG. 1. In FIG. 6, components that are given the same reference numerals as those of FIG. 2 indicate the same.

In FIG. 6, a reference numeral 6' (7') is a first (second) front acceleration sensor. The front acceleration sensor 6' (7') is applied to the composition of FIG. 1 instead of the first (second) front acceleration sensor 6 (7) of FIG. 2. In the front acceleration sensor 6' (7'), an amplifier circuit has first and second non-inverting amplifier circuit 80 and 81 with integrating functions and a differential amplifier circuit 82 with an integrating function. By this, the front acceleration sensor 6' (7') outputs an integrated value of an acceleration signal as a sensor output. The first and second non-inverting amplifier circuits 80 and 81 have condensers 83 and 84 each inserted in parallel with the resistors 21 and 22, in addition to the composition of the first and second non-inverting amplifier circuits 12 and 13 of FIG. 2. The differential amplifier circuit 82 has condensers 85 and 86 each inserted in parallel with the resistors 26 and 28, in addition to the composition of the differential amplifier circuit 14 of FIG. 2. According to a composition like this, the Integrated value of the acceleration signal, as the sensor output, are given from the front acceleration sensor 6' (7') to the microcomputer 2 of FIG. 1. In this example, composition and operation of other portions is as described in relation to FIG. 2.

Figure 7:
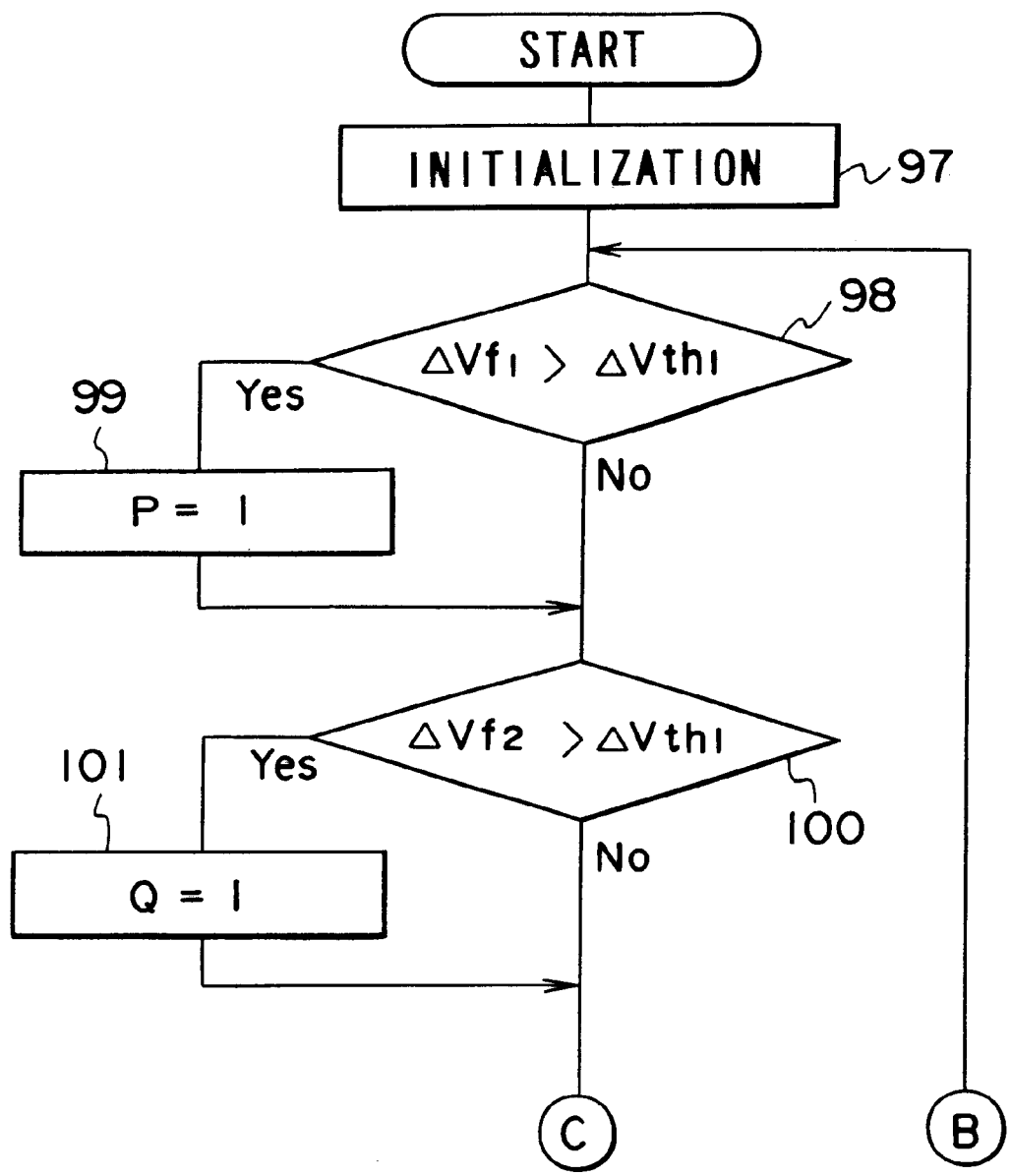
FIG. 7 is a flow diagram of the microcomputer of FIG. 1 showing a second embodiment of the present invention, and constitutes the flow diagrams of the microcomputer together with FIG. 5.

FIG. 7 is a flow diagram of the microcomputer 2 of FIG. 1 showing a second embodiment. FIG. 7 shows the flow diagram in the case in which the first and second front acceleration sensors 6' and 7' of FIG. 6 are used, and this is applied to the microcomputer 2 in place of the flow diagrams of FIG. 3 and FIG. 4. Terminals B and C of FIG. 7 are connected to terminals having the same signs B and C of FIG. 5. That is, FIG. 7 constitutes the flow diagrams of the microcomputer 2 together with FIG. 5.

The microcomputer 2 of the control unit 1, when the control processing is started, enters a step 98 after an initialization of a step 97. In the step 98, the microcomputer 2 inputs an integrated value $\Delta Vf1$ of an acceleration signal from the first front acceleration sensor 6', and decides whether the integrated value $\Delta Vf1$ is larger than the front threshold value $\Delta Vth1$. When the integrated value $\Delta Vf1$ is larger than the threshold value $\Delta Vth1$, the microcomputer 2 sets the first increment flag P to "1", and enters a step 100. When the integrated value $\Delta Vf1$ is not larger than the threshold value $\Delta Vth1$, the microcomputer 2 directly enters the step 100. In the step 100, the microcomputer 2 inputs an integrated value $\Delta Vf2$ of an acceleration signal from the second front acceleration sensor 71, and decides whether the integrated value $\Delta Vf2$ is larger than the threshold value $\Delta Vth1$. When the integrated value $\Delta Vf2$ is larger than the threshold value $\Delta Vth1$, the microcomputer 2 sets the second increment flag Q to "1", and enters the step 64 of FIG. 5. When the integrated value $\Delta Vf1$ is not larger than the threshold value $\Delta Vth1$, the microcomputer 2 directly enters the step 64 of FIG. 5.

In the processing of FIG. 5, as described above, the integrated value $\Delta Vt$ of the room acceleration sensor 8 is increased to {the integrated value of the acceleration signal Gt+C} when either the flag P or the flag Q is set, and the integrated value $\Delta Vt$ is further increased to {the integrated value of the acceleration signal Gt+2C} when both the flag P and the flag Q are set. Then, when the integrated value $\Delta Vt$ exceeds the room threshold value $\Delta Vth2$, the occupant protection device 9 is driven.

According to the second embodiment described above, since the microcomputer 2 does not need to perform an integration and a reset processing in relation to the sensor outputs of the first and second front acceleration sensors 6' and 7', simplification of composition as well as an improvement in processing speed can be achieved.

Although in the example of FIG. 6 the first and second non-inverting amplifier circuits 80 and 81 and the differential amplifier circuit 82 each have the integrating function, either the first and second non-inverting amplifier circuits 80 and 81 or the differential amplifier circuit 82 may have the integrating function.

Although two front acceleration sensors are used in the first and second embodiments, this is not intended to limit the scope of the invention. The number of front acceleration sensors can be one, or more than two. When only one front acceleration sensor is used, it is desirable that the front acceleration sensor is provided in a center part of a vehicle front where an impact of collision can easily be absorbed, for example, near a radiator like a center part of a radiator mount holding a radiator. Since such a part is relatively soft in a car body, a collision impact can easily be absorbed and transmission of a collision acceleration to the floor tunnel of vehicle tends to be weakened. When the front acceleration sensor is provided in such a part, in case of a collision in which transmission of the collision acceleration to the floor tunnel is weakened, for example, a center pole collision in which a center part of a car front collides against a pole such as an electric light pole, and an under-ride collision in which a car front goes under a back part of a truck and so on, the collision acceleration can be detected early. It goes without saying that the front acceleration sensor attached as mentioned above can be included in each of the embodiments of the present invention.

Although the factors p and q are set to "1" by setting of the first and second increment flags P and Q in the first and second embodiments, the factors p and q can be set to optional values according to the need.

Figure 8:
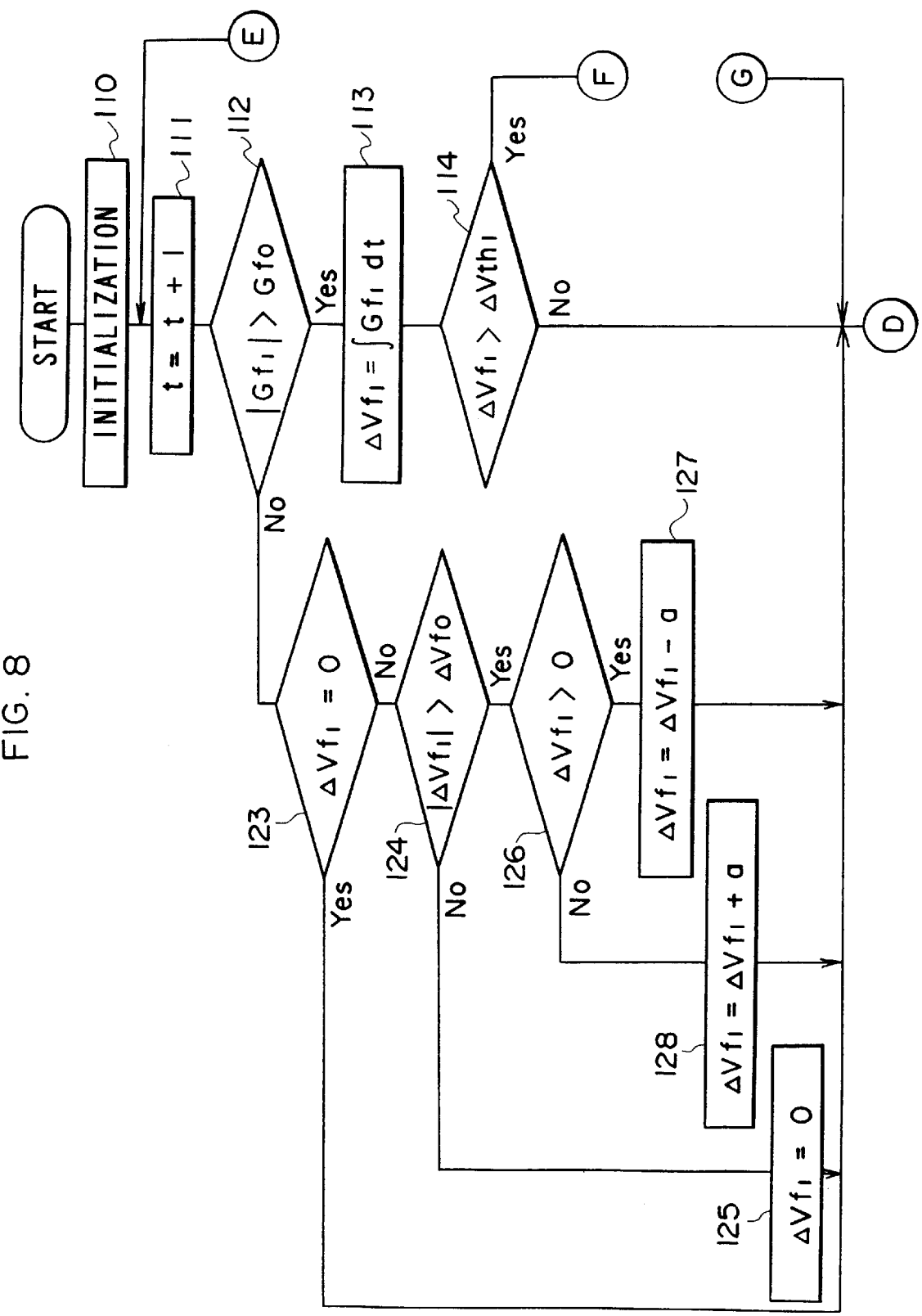
FIG. 8, FIG. 9, FIG. 10, FIG. 11 and FIG. 12 are flow diagrams of the microcomputer of FIG. 1 showing a third embodiment of the present invention.
Figure 9:
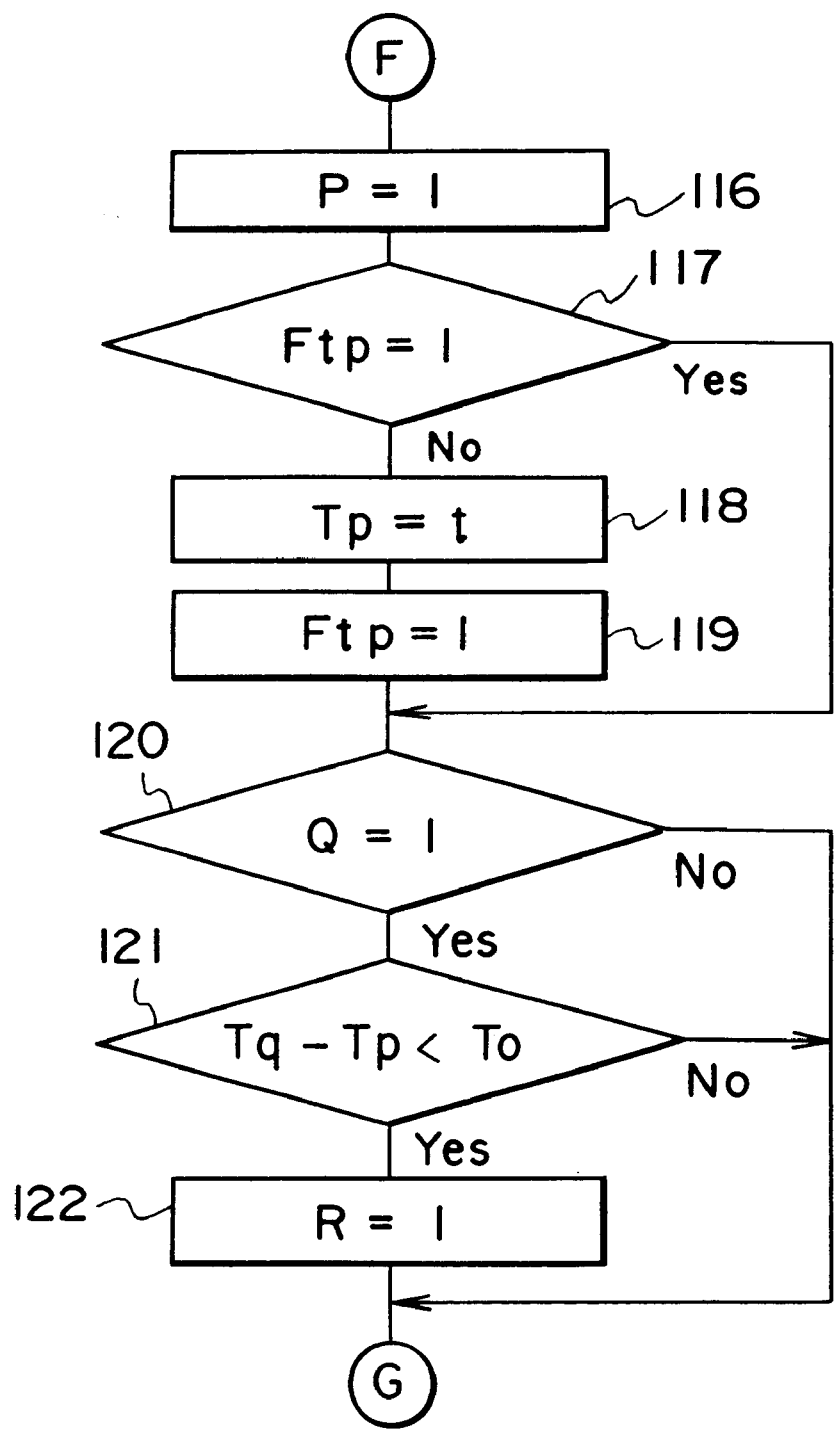
Figure 10:
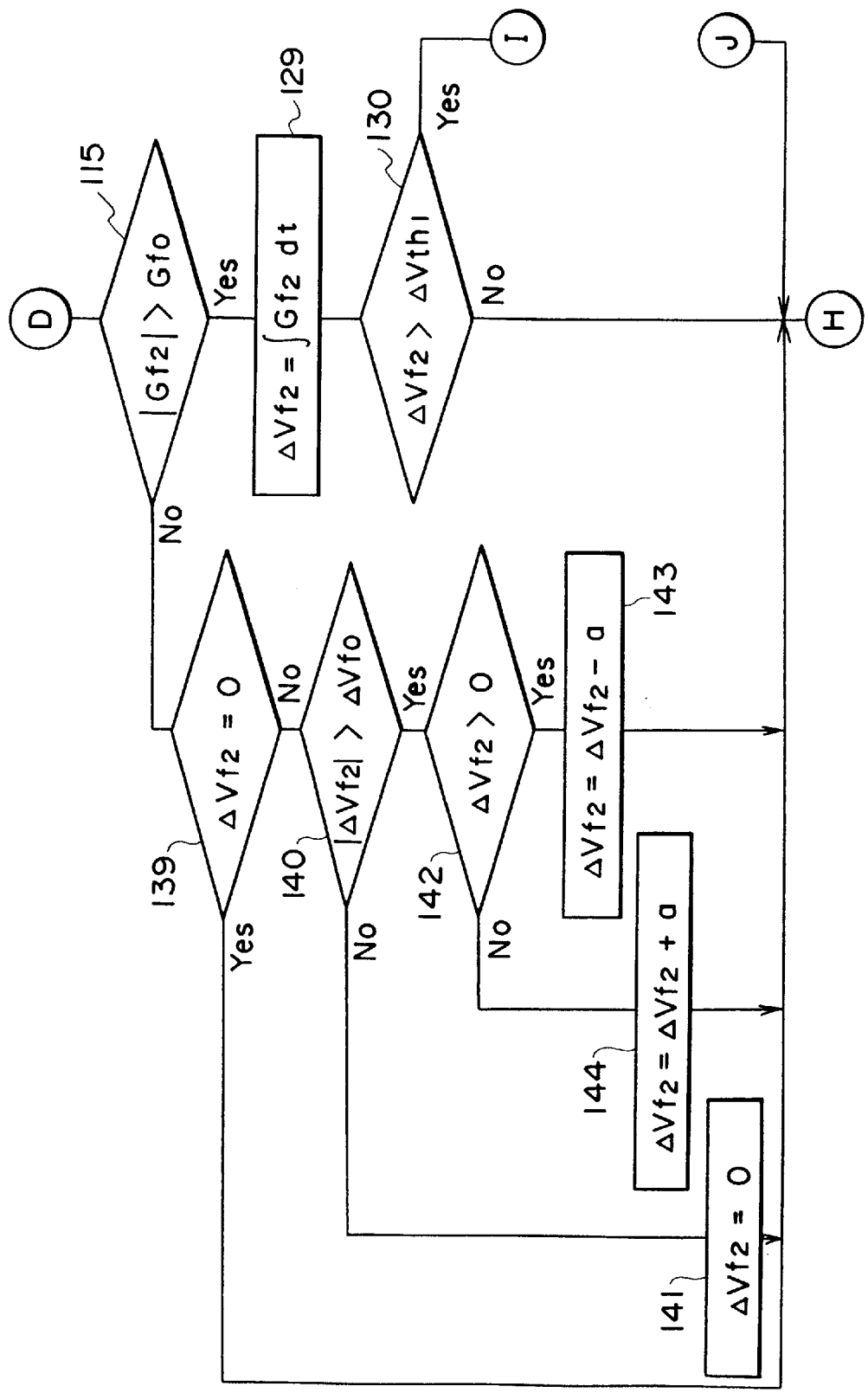
Figure 11:
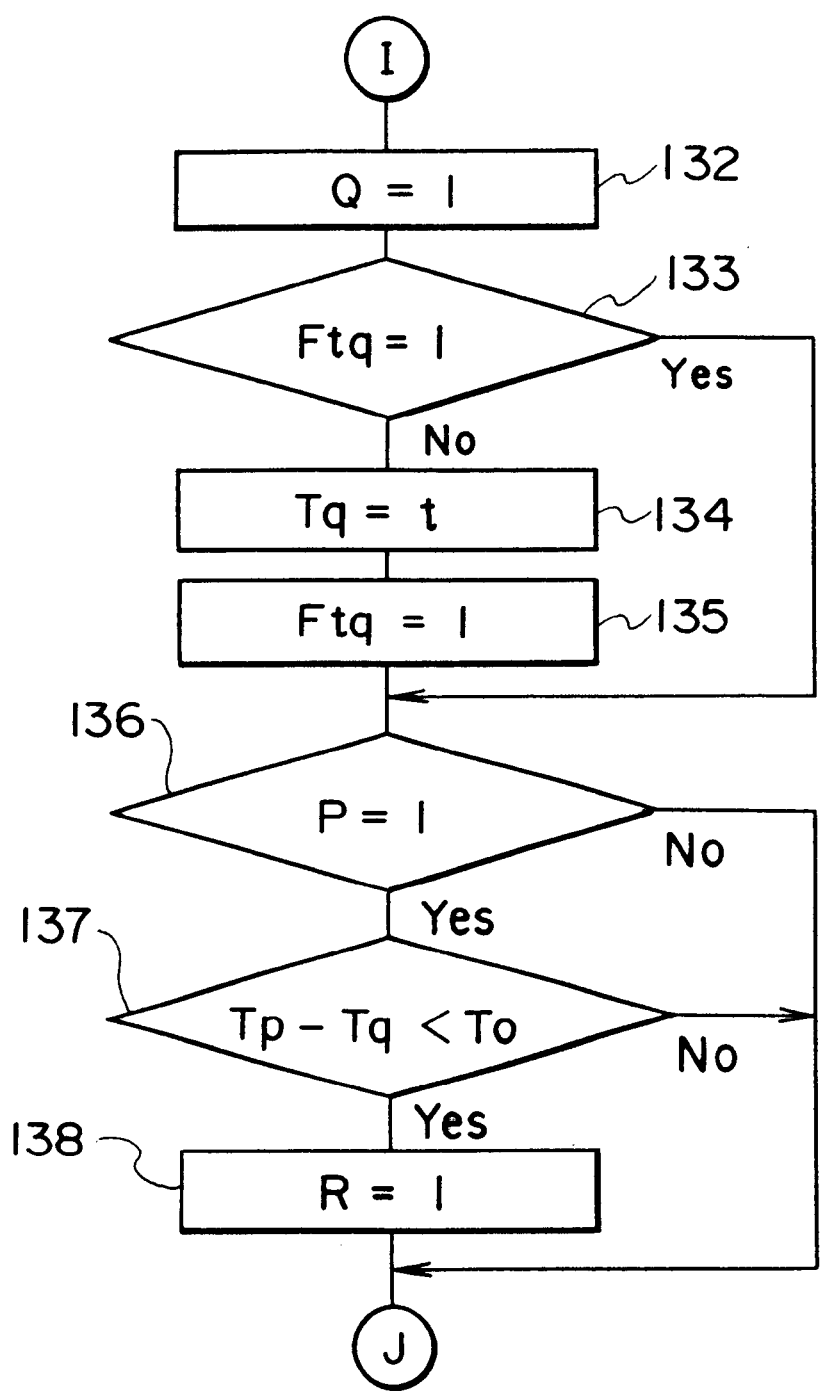
Figure 12:
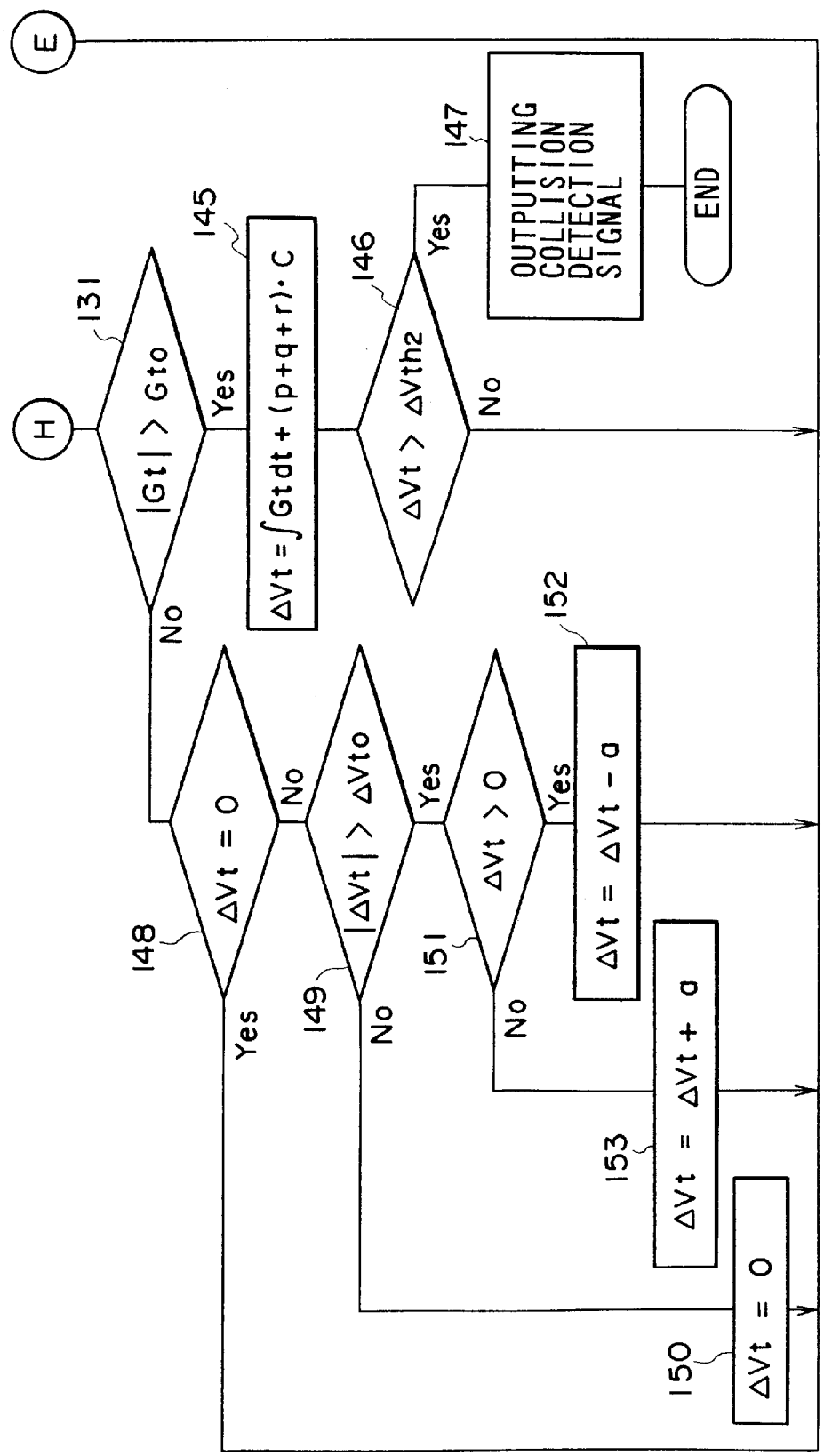

FIG. 8, FIG. 9, FIG. 10, FIG. 11 and FIG. 12 are flow diagrams of the microcomputer 2 of FIG. 1 showing a third embodiment. FIGS. 8–12 are applied to the microcomputer 2 in place of the flow diagrams of FIGS. 3–5. Terminals F and G of FIG. 9 are connected to terminals having the same signs F and G of FIG. 8, a terminal D of FIG. 10 is connected to a terminal having the same sign D of FIG. 8, terminals I and J of FIG. 11 are connected to terminals having the same signs I and J of FIG. 10, and terminals H and E of FIG. 12 are connected to terminals having the same signs H and E of FIG. 8 and FIG. 10.

The microcomputer 2 of the control unit 1, when the control processing is started, enters a step 111 after an initialization of a step 110. In the step 111, a soft-timer t is increased +1. Thereafter, the microcomputer 2 enters a step 112, inputs an acceleration signal Gf1 of the first front acceleration sensor 6, and decides whether an absolute value of the acceleration signal Gf1 is larger than the front reference value Gfo. When the absolute value of the acceleration signal Gf1 is larger than the reference value Gfo, the microcomputer 2 enters from the step 112 to a step 113 and computes an integrated value $\Delta Vf1$ of the acceleration signal Gf1. The microcomputer 2 decides in a following step 114 whether the integrated value $\Delta Vf1$ is larger than the front threshold value $\Delta Vth1$. When the integrated value $\Delta Vf1$ is not larger than the threshold value $\Delta Vth1$, the microcomputer 2 enters a step 115 of FIG. 10. When the integrated value $\Delta Vf1$ is larger than the threshold value $\Delta Vth1$, the microcomputer 2 recognizes an occurrence of the collision, and enters a step 116 of FIG. 9. The front reference value Gfo and the front threshold value $\Delta Vth1$ are as described in the first embodiment of FIGS. 3–5.

In the step 116 of FIG. 9, a first increment flag P which has been reset to "0" by the initialization of the step 110 is set to "1". The first increment flag P is a flag for setting a factor p of an addition value {(p+q+r)×C} in a step 145 of FIG. 12 to "1" or "0". The factor p is "0" when the flag P is "0", and the factor p is set to "1" when the flag P is set to "1l". The microcomputer 2 enters a step 117 after the step 116, and decides whether a first decision flag Ftp is "1". The first decision flag Ftp is a flag for deciding whether the integrated value $\Delta Vf1$ exceeds the front threshold value $\Delta Vth1$ for the first time after starting the control processing. The flag Ftp is reset to "0" in the initialization of the step 110, and is set to "1" in a step 119 described below. If the flag Ftp is not "1" in the step 117, the flag Ftp represents that the integrated value $\Delta Vf1$ exceeds the threshold value $\Delta Vth1$ for the first time. In this case, the microcomputer 2 recognizes a first collision time Tp from the soft-timer t in a step 118, sets the flag Ftp to "1" in the following step 119, and enters a step 120. The first collision time Tp indicates a time point at which the collision is detected based on the sensor output of the first front acceleration sensor 6. If the flag Ftp is set to "1" in the step 119, the microcomputer 2 directly enters from the 117 to the step 120 without entering the steps 118 and 119, from next time. In the step 120, the microcomputer 2 decides whether a second increment flag Q described below is "1". When the flag Q is not "1", the microcomputer 2 directly enters from the step 120 to the step 115 of FIG. 10. When the flag Q is "1", the microcomputer 2 enters a following step 121, and decides whether a time difference Tq−Tp between a second collision time Tq described below and the first collision time Tp is smaller than a predetermined value To. When the time difference Tq−Tp is not smaller than the predetermined value To, the microcomputer 2 directly enters from the step 121 to the step 115 of FIG. 10. When the time difference Tq−Tp is smaller than the predetermined value To, the microcomputer 2 recognizes an occurrence of a collision with a large impact, such as a high-speed collision, in which the occupant protection device 9 is required to drive quickly, and enters a step 122. In the step 122, a third increment flag R which has been reset to "0" by the initialization of the step 110 is set to "1". The third increment flag R is a flag for setting a factor r of an addition value {(p+q+r)×C} in the step 145 of FIG. 12 to "1" or "0". The factor r is "0" when the flag R is "0", and the factor r is set to "1" when the flag R is set to "1". Thereafter, the microcomputer 2 enters the step 115 of FIG. 10.

Reverting to FIG. 8, in the step 112, when the absolute value of the acceleration signal Gf1 of the first front acceleration sensor 6 is not larger than the front reference value Gfo, the microcomputer 2 enters a reset processing of steps 123–128, and goes to the step 115 of FIG. 10 after the reset processing. In the reset processing of the steps 123–128, the same processing as the aforementioned reset processing of the steps 56–61 in FIG. 3 is executed.

In the step 115 of FIG. 10, the microcomputer 2 inputs an acceleration signal Gf2 of the second front acceleration sensor 7, and decides whether an absolute value of the acceleration signal Gf2 is larger than the front reference value Gfo. When the absolute value of the acceleration signal Gf1 is larger than the reference value Gfo, the microcomputer 2 enters from the step 115 to a step 129 and computes an integrated value ΔVf2 of the acceleration signal Gf1. The microcomputer 2 decides in a following step 130 whether the integrated value ΔVf2 is larger than the front threshold value ΔVth1. When the integrated value ΔVf2 is not larger than the threshold value ΔVth1, the microcomputer 2 enters a step 131 of FIG. 12. When the integrated value ΔVf2 is larger than the threshold value ΔVth1, the microcomputer 2 recognizes an occurrence of the collision, and enters a step 132 of FIG. 11.

In the step 132 of FIG. 11, the second increment flag Q which has been reset to "0" by the initialization of the step 110 is set to "1". The second increment flag Q is a flag for setting a factor q of the addition value {(p+q+r)×C} in the step 145 of FIG. 12 to "1" or "0". The factor q is "0" when the flag Q is "0", and the factor q is set to "1" when the flag Q is set to "1". The microcomputer 2 enters a step 133 after the step 132, and decides whether a second decision flag Ftq is "1". The second decision flag Ftq is a flag for deciding whether the integrated value ΔVf2 exceeds the front threshold value ΔVth1 for the first time after starting the control processing. The flag Ftq is reset to "0" in the initialization of the step 110, and is set to "1" in a step 135 described below. If the flag Ftq is not "1" in the step 133, the flag Ftp represents that the integrated value ΔVf1 exceeds the threshold value ΔVth1 for the first time. In this case, the microcomputer 2 recognizes a second collision time Tq from the soft-timer t in a step 134, sets the flag Ftq to "1" in the following step 135, and enters a step 136. The second collision time Tq indicates a time point at which the collision is detected based on the sensor output of the second front acceleration sensor 7. If the flag Ftq is set to "1" in the step 135, the microcomputer 2 directly enters from the 133 to the step 136 without entering the steps 134 and 135, from next time. In the step 136, the microcomputer 2 decides whether the first increment flag P is "1". When the flag P is not "1", the microcomputer 2 directly enters from the step 136 to the step 131 of FIG. 12. When the flag P is "1", the microcomputer 2 enters a following step 137, and decides whether a time difference Tp−Tq between the first collision time Tp and the second collision time Tq is smaller than the predetermined value To. When the time difference Tp−Tq is not smaller than the predetermined value To, the microcomputer 2 directly enters from the step 137 to the step 131 of FIG. 12. When the time difference Tp−Tq is smaller than the predetermined value To, the microcomputer 2 recognizes an occurrence of a collision with a large impact, such as a high-speed collision, in which the occupant protection device 9 is required to drive quickly, and enters a step 138. In the step 138, the third increment flag R is set to B11. Thereafter, the microcomputer 2 enters the step 131 of FIG. 12.

Reverting to FIG. 10, in the step 115, when the absolute value of the acceleration signal Gf2 of the second front acceleration sensor 7 is not larger than the front reference value Gfo, the microcomputer 2 enters a reset processing of steps 139–144, and goes to the step 131 of FIG. 12 after the reset processing. In the reset processing of the steps 139–144, the same processing as the aforementioned reset processing of the steps 66–71 in FIG. 4 is executed.

In the step 131 of FIG. 12, the microcomputer 2 inputs an acceleration signal Gt of the room acceleration sensor 8, and decides whether the absolute value of the acceleration signal Gt is larger than the room reference value Gto. When the absolute value of the acceleration signal Gt is larger than the reference value Gto, the microcomputer 2 enters a step 145 and computes an integrated value ΔVt by adding the addition value {(p+q+r)×C} to an integrated value of the acceleration signal Gt. In the addition value {(p+q+r)×C}, C is a numerical constant. As apparent from FIG. 9 and FIG. 11, only when both the first and second increment flags P and Q are set and furthermore the time difference between the first and second collision times Tp and Tq is smaller than the predetermined value To, the third increment flag R is set to "1". Therefore, the addition value {(p+q+r)×C} is "0" if neither the flag P nor flag Q is set. If either the flag P or the flag Q is set, the addition value {(p+q+r)×C} is "C". If the flags P and Q are set, the addition value {(p+q+r)×C} is "2C". If the flags P, Q and R are set, the addition value {(p+q+r)×C} is "3C". Accordingly, the integrated value ΔVt is increased to {the integrated value of the acceleration signal Gt+C} when either the flag P or the flag Q is set, is further increased to {the integrated value of the acceleration signal Gt+2C} when the flags P and Q are set, and is furthermore increased to (the integrated value of the acceleration signal Gt+3C) when the flags P, Q and R are set. The microcomputer 2 enters a step 146 after the step 145, and decides whether the integrated value ΔVt is larger than the room threshold value ΔVth2. When the integrated value ΔVt is not larger than the threshold value ΔVth2, the microcomputer 2 returns to the step 111 of FIG. 8. When the integrated value ΔVt is larger than the threshold value ΔVth2, the microcomputer 2 enters a step 147, outputs the collision detection signal to the drive circuit 5, and finishes the control processing. The drive circuit 5, when the collision detection signal is provided from the microcomputer 2, outputs the drive signal to the occupant protection device 9, and thereby the occupant protection device 9 is driven. The room reference value Gto and the room threshold value ΔVth2 are as described in the first embodiment of FIGS. 3–5.

On the other hand, in the step 131, when the absolute value of the acceleration signal Gt of the room acceleration sensor 8 is not larger than the room reference value Gto, the microcomputer 2 enters a reset processing of steps 148–153, and returns to the step 111 of FIG. 8 after the reset processing. In the reset processing of the steps 148–153, the same processing as the aforementioned reset processing of the steps 75–80 in FIG. 5 is executed.

According to the third embodiment described above, in addition to the increase of the integrated value ΔVt of the room acceleration sensor 8 based on the sensor outputs of the first and second front acceleration sensors 6 and 7 as described in the first embodiment, the integrated value ΔVt is further increased when the time difference between the first and second collision times Tp and Tq is smaller than the predetermined value To. The first collision time Tp is a time point of the collision detected based on the sensor output of the first front acceleration sensor 6, and the second collision time Tq is a time point of the collision detected based on the sensor output of the second front acceleration sensor 7. In case of a collision with a large impact, such as a high-speed collision, the time difference between the first and second collision times Tp and Tq is smaller. Hence, even in case of a collision such as a high-speed collision, it is possible to exactly drive the occupant protection device 9 without causing a delay in the collision decision.

Figure 13:
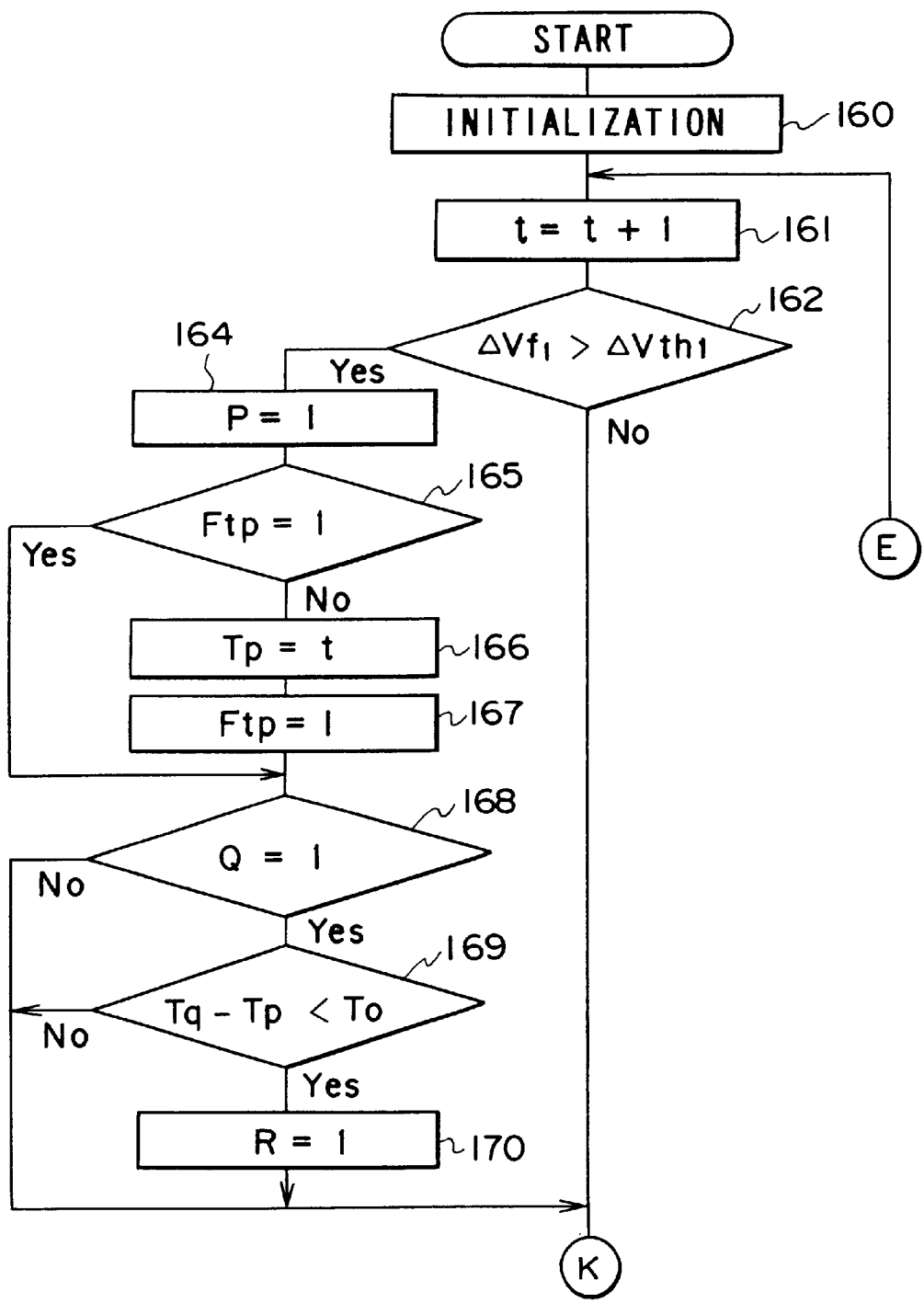
FIG. 13 and FIG. 14 are flow diagrams of the microcomputer of FIG. 1 showing a fourth embodiment of the present invention, and constitute the flow diagrams of the microcomputer together with FIG. 12.
Figure 14:
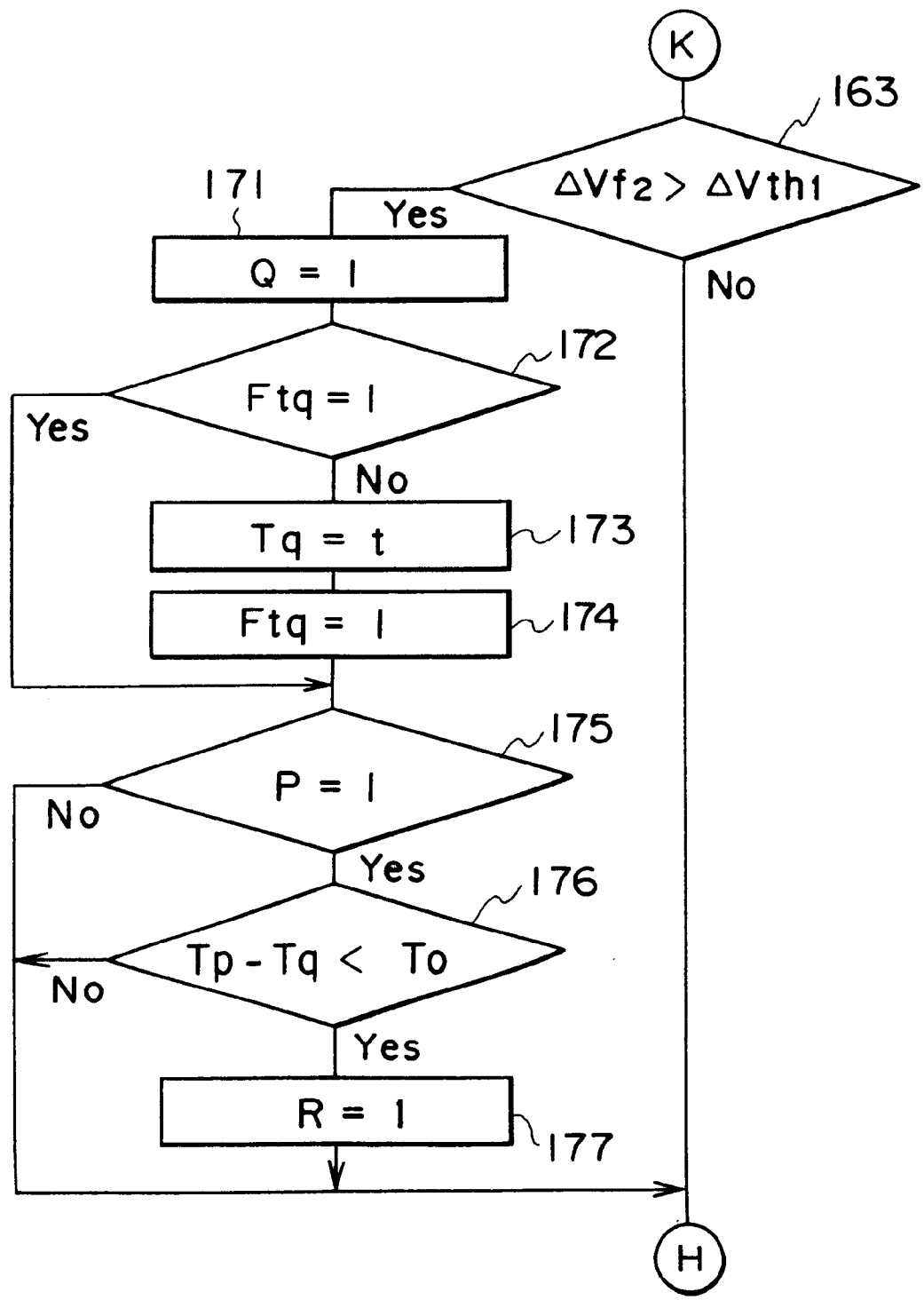

FIG. 13 and FIG. 14 are flow diagrams of the microcomputer 2 of FIG. 1 showing a fourth embodiment. FIG. 13 and FIG. 14 are the flow diagrams in the case in which the first and second front acceleration sensors 6' and 7' of FIG. 6 are used, and these are applied to the microcomputer 2 in place of the flow diagrams of FIG. 8, FIG. 9, FIG. 10 and FIG. 11. A terminal E of FIG. 13 is connected to a terminal having the same sign E of FIG. 12, and terminals K and H of FIG. 14 are connected to terminals having the same signs K and H of FIG. 12 and FIG. 13. That is, FIG. 13 and FIG. 14 constitute the flow diagrams of the microcomputer 2 together with FIG. 12.

The microcomputer 2 of the control unit 1, when the control processing is started, enters a step 161 after an initialization of a step 160. In the step 161, a soft-timer t is increased +1. Thereafter, the microcomputer 2 enters a step 162, inputs an integrated value ΔVf1 of an acceleration signal from the first front acceleration sensor 6', and decides whether the integrated value ΔVf1 is larger than the front threshold value ΔVth1. When the integrated value ΔVf1 is not larger than the threshold value ΔVth1, the microcomputer 2 enters a step 163 of FIG. 14. When the integrated value ΔVf1 is larger than the threshold value ΔVth1, the microcomputer 2 recognizes an occurrence of the collision, and enters a step 164. In steps 164–170, the same processing as the aforementioned steps 116–122 in FIG. 9 is executed. That is, in the step 164, the first increment flag P is set to "1". In a following step 165, whether the first decision flag Ftp is "1" is decided. The microcomputer 2, when the flag Ftp is not "1", recognizes the first collision time Tp in a step 166, sets the flag Ftp to "1" in a step 167, and then enters a step 168. If the flag Ftp is set to "1", the microcomputer 2 directly enters from the step 165 to the step 168. In the step 168, whether the second increment flag Q is "1" is decided. The microcomputer 2 enters the step 163 of FIG. 14 when the flag Q is not "1", and enters a following step 169 when the flag Q is "1". In the step 169, whether the time difference Tq–Tp between the first collision time Tp and the second collision time Tq is smaller than the predetermined value To is decided. The microcomputer 2, when the time difference Tq–Tp is not smaller than the predetermined value To, enters the step 163 of FIG. 14. The microcomputer 2, when the time difference Tq–Tp is smaller than the predetermined value To, sets the third increment flag R to "1" in a step 170, and then enters the step 163 of FIG. 14.

In the step 163 of FIG. 14, the microcomputer 2 inputs an integrated value ΔVf2 of an acceleration signal from the second front acceleration sensor 7', and decides whether the integrated value ΔVf1 is larger than the front threshold value ΔVth1. When the integrated value ΔVf1 is not larger than the threshold value ΔVth1, the microcomputer 2 enters the step 131 of FIG. 12. When the integrated value ΔVf1 is larger than the threshold value ΔVth1, the microcomputer 2 recognizes an occurrence of the collision, and enters a step 171. In steps 171–177, the same processing as the aforementioned steps 132–138 in FIG. 11 is executed. That is, in the step 171, the second increment flag Q is set to "1". In a following step 172, whether the first decision flag Ftq is "1" is decided. The microcomputer 2, when the flag Ftq is not "1", recognizes the second collision time Tq in a step 173, sets the flag Ftq to "1" in a step 174, and then enters a step 175. If the flag Ftq is "1", the microcomputer 2 directly enters the step 175. In the step 175, whether the first increment flag P is "1" is decided. The microcomputer 2 enters the step 131 of FIG. 12 when the flag P is not "1", and enters a following step 176 when the flag P is "1". In the step 176, whether the time difference Tp–Tq between the first collision time Tp and the second collision time Tq is smaller than the predetermined value To is decided. The microcomputer 2, when the time difference Tp–Tq is not smaller than the predetermined value To, enters the step 131 of FIG. 12. The microcomputer 2, when the time difference Tp–Tq is smaller than the predetermined value To, sets the third increment flag R to "1" in a step 177 and enters the step 131 of FIG. 12.

According to the fourth embodiment described above, since the microcomputer 2 does not need to perform an integration and a reset processing in relation to the sensor outputs of the first and second front acceleration sensors 6' and 7', simplification of composition as well as an improvement in processing speed can be achieved.

Although the factors p, q and r are set to "1" by setting of the first, second and third increment flags P, Q and R in the third and fourth embodiments, the factors p, q and r can be set to optional values according to the need.

Figure 15:
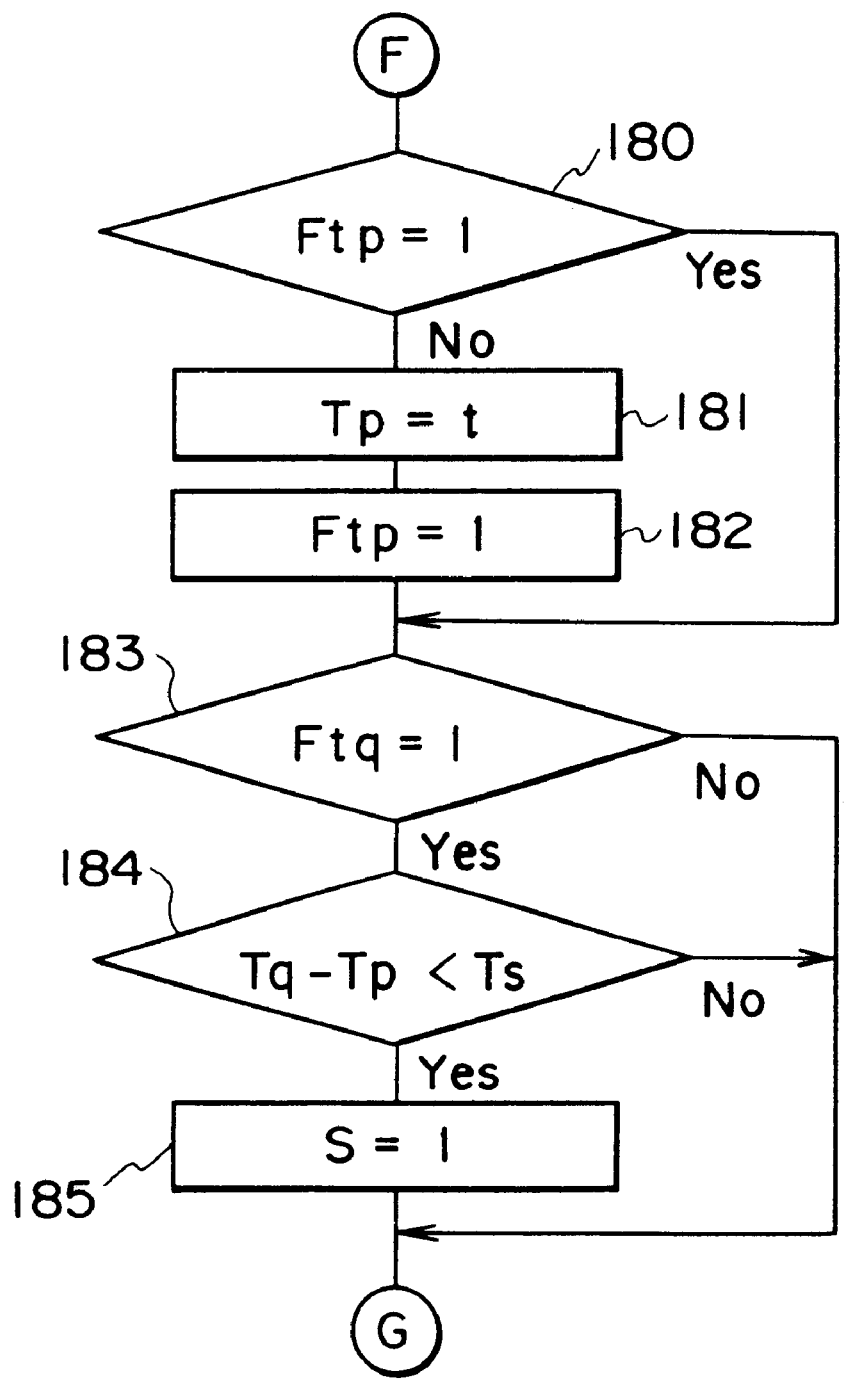
FIG. 15, FIG. 16 and FIG. 17 are flow diagrams of the microcomputer of FIG. 1 showing a fifth embodiment of the present invention. and constitute the flow diagrams of the microcomputer together with FIG. 8 and FIG. 10.
Figure 16:
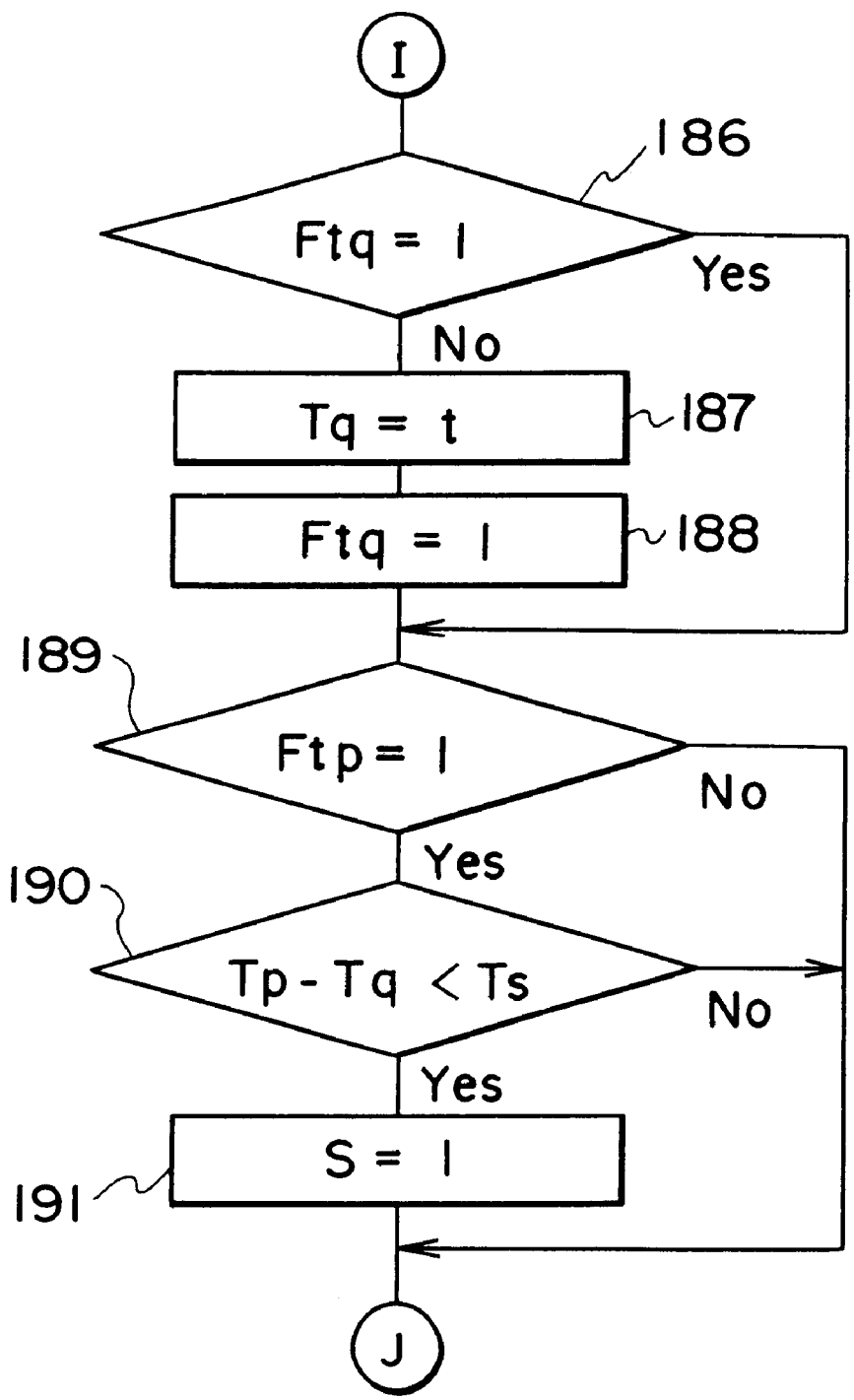
Figure 17:
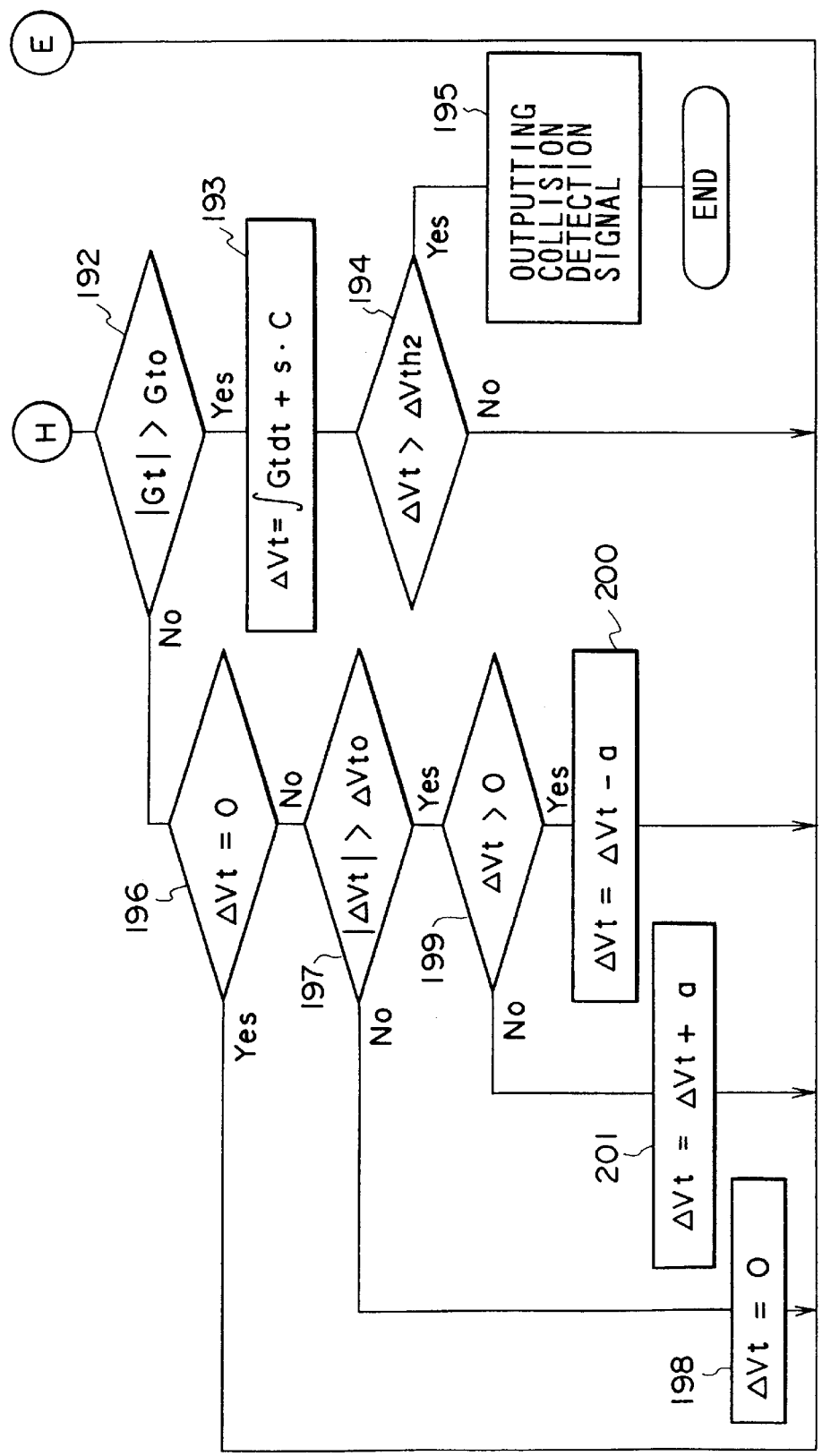

FIG. 15, FIG. 16 and FIG. 17 are flow diagrams of the microcomputer 2 of FIG. 1 showing a fifth embodiment. FIGS. 15–17 are applied to the microcomputer 2 in place of the flow diagrams of FIG. 9, FIG. 11, and FIG. 12. Terminals F and G of FIG. 15 are connected to terminals having the same signs F and G of FIG. 8, terminals I and J of FIG. 16 are connected to terminals having the same signs I and J of FIG. 10, and terminals H and E of FIG. 17 are connected to terminals having the same signs H and E of FIG. 8 and FIG. 10. That is, FIGS. 15–17 constitute the flow diagrams of the microcomputer 2 together with FIG. 8 and FIG. 10.

The microcomputer 2 of the control unit 1, when the integrated value ΔVf1 of the acceleration signal Gf1 of the first front acceleration sensor 6 is larger than the front threshold value ΔVth1, enters a step 180 of FIG. 15 and decides whether the first decision flag Ftp is "1". The flag Ftp is as described in FIG. 9. When the flag Ftp is not "1", namely when the integrated value ΔVf1 exceeds the threshold value ΔVth1 for the first time after starting the control processing, the microcomputer 2 enters a step 181 and recognizes the first collision time Tp from the soft-timer t of the step 111 of FIG. 8. Thereafter, the microcomputer 2 sets the flag Ftp to "1" in a step 182, and enters a step 183. When the flag Ftp is "1" in the step 180, the microcomputer 2 directly enters from the 180 to the step 183 without entering the steps 181 and 182. In the step 183, the microcomputer 2 decides whether the second decision flag Ftq is "1". The flag Ftq is as described in FIG. 11. When the flag Ftq is not "1", since the second collision time Tq based on the second front acceleration sensor 7 has not been recognized as yet, the microcomputer 2 directly enters from the step 183 to the step 115 of FIG. 10. When the flag Ftq is "1", the microcomputer 2 enters a following step 184 and decides whether a time difference between Tq–Tp the second collision time Tq and the first collision time Tp is smaller than a predetermined value Ts. The microcomputer 2 directly enters from the step 184 to the step 115 of FIG. 10 when the time difference Tq–Tp is not smaller than the predetermined value Ts, and enters a step 185 when the time difference Tq–Tp is smaller than the predetermined value Ts. In the step 185, an increment flag S which has been reset to "0" by the initialization in the step 110 of FIG. 8 is set to "1". The increment flag S is a flag for setting a factor s of an addition value (s×C) in a step 193 of FIG. 17 to "1" or "0". The factor s is "0" when the flag S is "0", and the factor s is set to "1" when the flag S is set to "1". After the step 185, the microcomputer 2 enters the step 115 of FIG. 10.

In the step 130 of FIG. 10, when the integrated value ΔVf2 of the acceleration signal Gf2 of the second front acceleration sensor 7 is larger than the front threshold value ΔVth1, the microcomputer 2 enters a step 186 of FIG. 16 and decides whether the second decision flag Ftq is "1". When the flag Ftq is not "1", namely when the integrated value ΔVf2 exceeds the threshold value ΔVth1 for the first time after starting the control processing, the microcomputer 2 enters a step 187 and recognizes the second collision time Tq from the soft-timer t of the step 111 of FIG. 8. Thereafter, the microcomputer 2 sets the flag Ftq to "1" in a step 188, and enters a step 189. If the flag Ftq is set to "1" in the step 188, the microcomputer 2 directly enters from the 186 to the step 189 without entering the steps 187 and 188. In the step 189, the microcomputer 2 decides whether the first decision flag Ftp is "1". When the flag Ftp is not "1", since the first collision time Tp based on the first front acceleration sensor 6 has not been recognized as yet, the microcomputer 2 directly enters from the step 189 to a step 192 of FIG. 17. When the flag Ftp is "1", the microcomputer 2 enters a following step 190 and decides whether a time difference Tp–Tq between the first collision time Tp and the second collision time Tq is smaller than the predetermined value Ts. The microcomputer 2 directly enters from the step 190 to the step 192 of FIG. 17 when the time difference Tp–Tq is not smaller than the predetermined value Ts, and enters a step 191 when the time difference Tp–Tq is smaller than the predetermined value Ts. In the step 191, the increment flag S is set to "1".

In the step 192 of FIG. 17, the microcomputer 2 inputs an acceleration signal Gt of the room acceleration sensor 8, and decides whether the absolute value of the acceleration signal Gt is larger than the room reference value Gto. When the absolute value of the acceleration signal Gt is larger than the reference value Gto, the microcomputer 2 enters a step 193 and computes an integrated value ΔVt by adding the addition value (s×C) to an integrated value of the acceleration signal Gt. In the addition value (s×C), C is a numerical constant. If the increment flag S is not set to "1", the addition value (s×C) is "0". If the flag S is set to "1", the addition value (s×C) is "C". By this, when the flag S is set, namely when the time difference between the first collision time Tp based on the first front acceleration sensor 6 and the second collision time Tq based on the second front acceleration sensor 7 is smaller than the predetermined value Ts, the integrated value ΔVt is increased to {the integrated value of the acceleration signal Gt+C}. The microcomputer 2 enters a step 194 after the step 193, and decides whether the integrated value ΔVt is larger than the room threshold value ΔVth2. When the integrated value ΔVt is not larger than the threshold value ΔVth2, the microcomputer 2 returns to the step 111 of FIG; 8. When the integrated value ΔVt is larger than the threshold value ΔVth2, the microcomputer 2 enters a step 195, outputs the collision detection signal to the drive circuit 5, and finishes the control processing.

On the other hand, in the step 192, when the absolute value of the acceleration signal Gt of the room acceleration sensor 8 is not larger than the room reference value Gto, the microcomputer 2 enters a reset processing of steps 196–201, and returns to the step 111 of FIG. 8 after the reset processing. In the reset processing of the steps 196–201, the same processing as the aforementioned reset processing of the steps 75–80 in FIG. 5 is executed.

According to the fifth embodiment described above, when the time difference between the first and second collision times Tp and Tq is smaller than the predetermined value Ts, the integrated value of the acceleration signal Gt of the room acceleration sensor 8 is increased. The first collision time Tp is a time point of the collision detected based on the sensor output of the first front acceleration sensor 6, and the second collision time Tq is a time point of the collision detected based on the sensor output of the second front acceleration sensor 7. When the integrated value ΔVt namely {the integrated value of the acceleration signal Gt+s×C} is larger than the room threshold value ΔVth2, the occupant protection device 9 is driven. The first and second front acceleration sensors 6 and 7 are provided at the right and left sides of the front part of the vehicle. Hence, even in case of a collision, such as an oblique or offset collision, in which the collision acceleration transmitted to the room acceleration sensor 8 provided on the floor tunnel may be weakened, the first and second front acceleration sensors 6 and 7 can detect the collision acceleration early and give the sensor outputs to the control unit 1. By this, since the integrated value ΔVt is increased immediately by setting of the flag S, the control unit 1 can exactly drive the occupant protection device 9 without causing a delay in collision decision.

Although the factor s is set to "1" by setting of the increment flag S in the fifth embodiment, the factor s can be set to an optional value according to the need.

Figure 18:
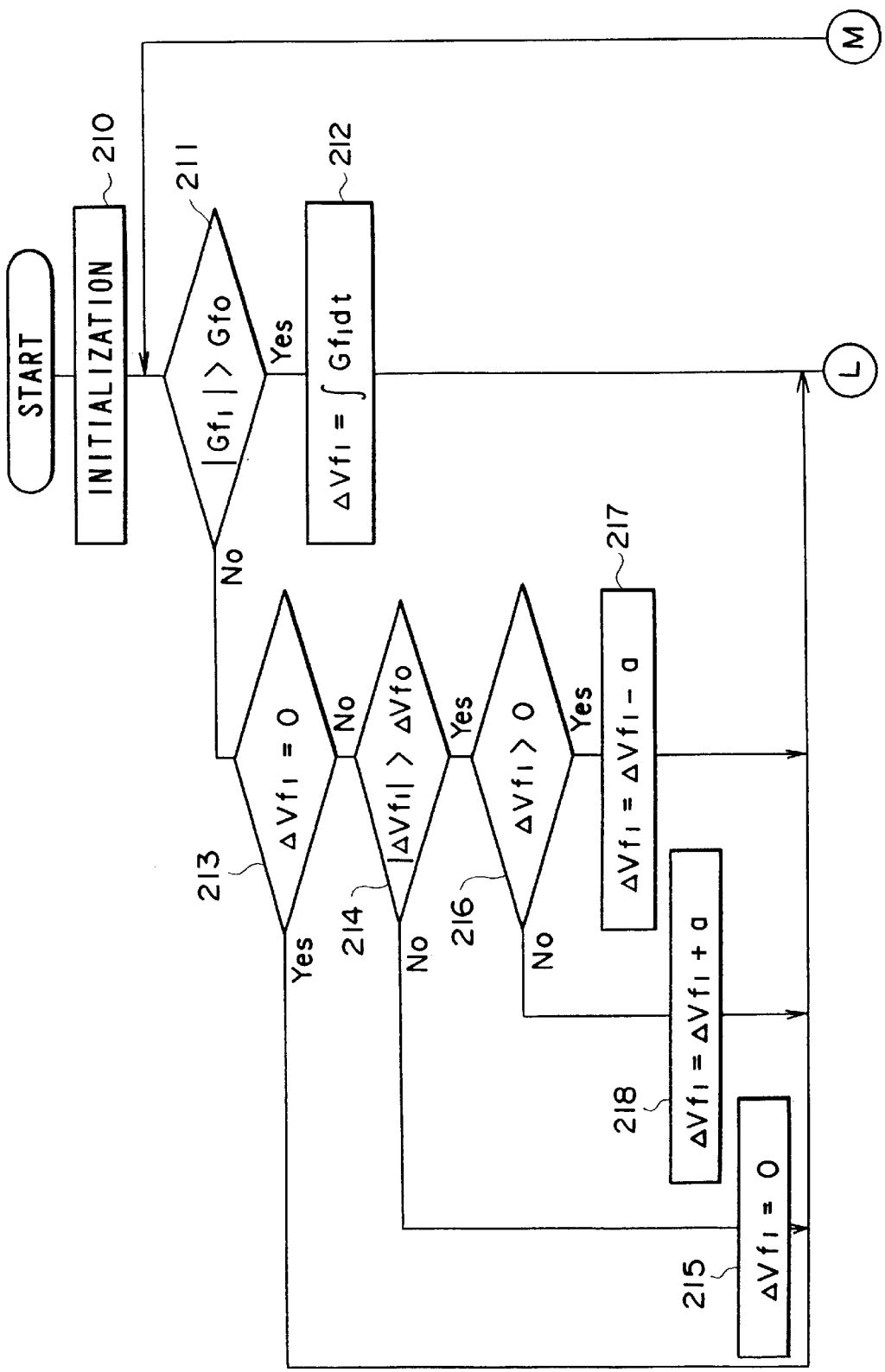
FIG. 18, FIG. 19 and FIG. 20 are flow diagrams of the microcomputer of FIG. 1 showing a sixth embodiment of the present invention.
Figure 19:
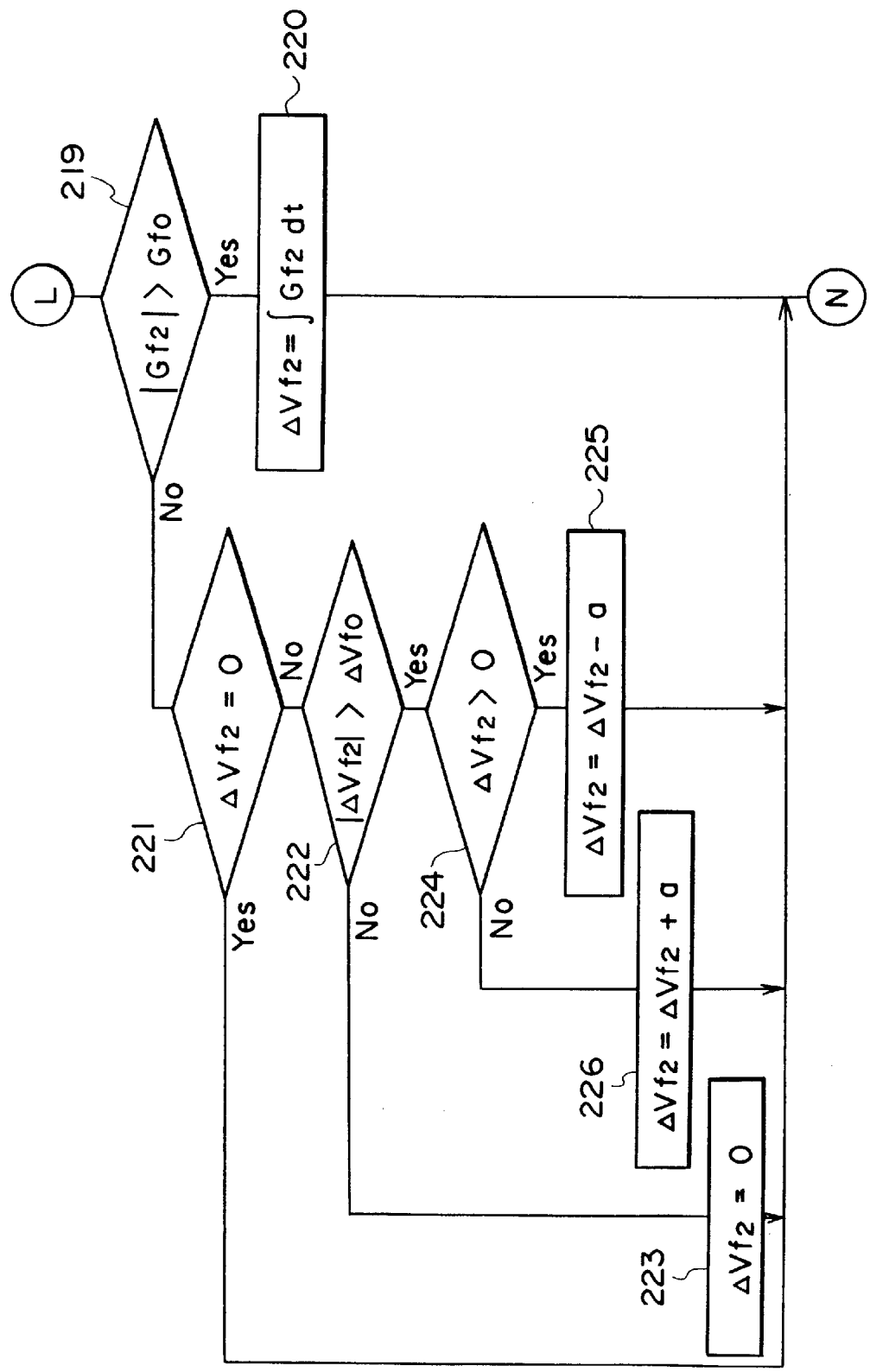
Figure 20:
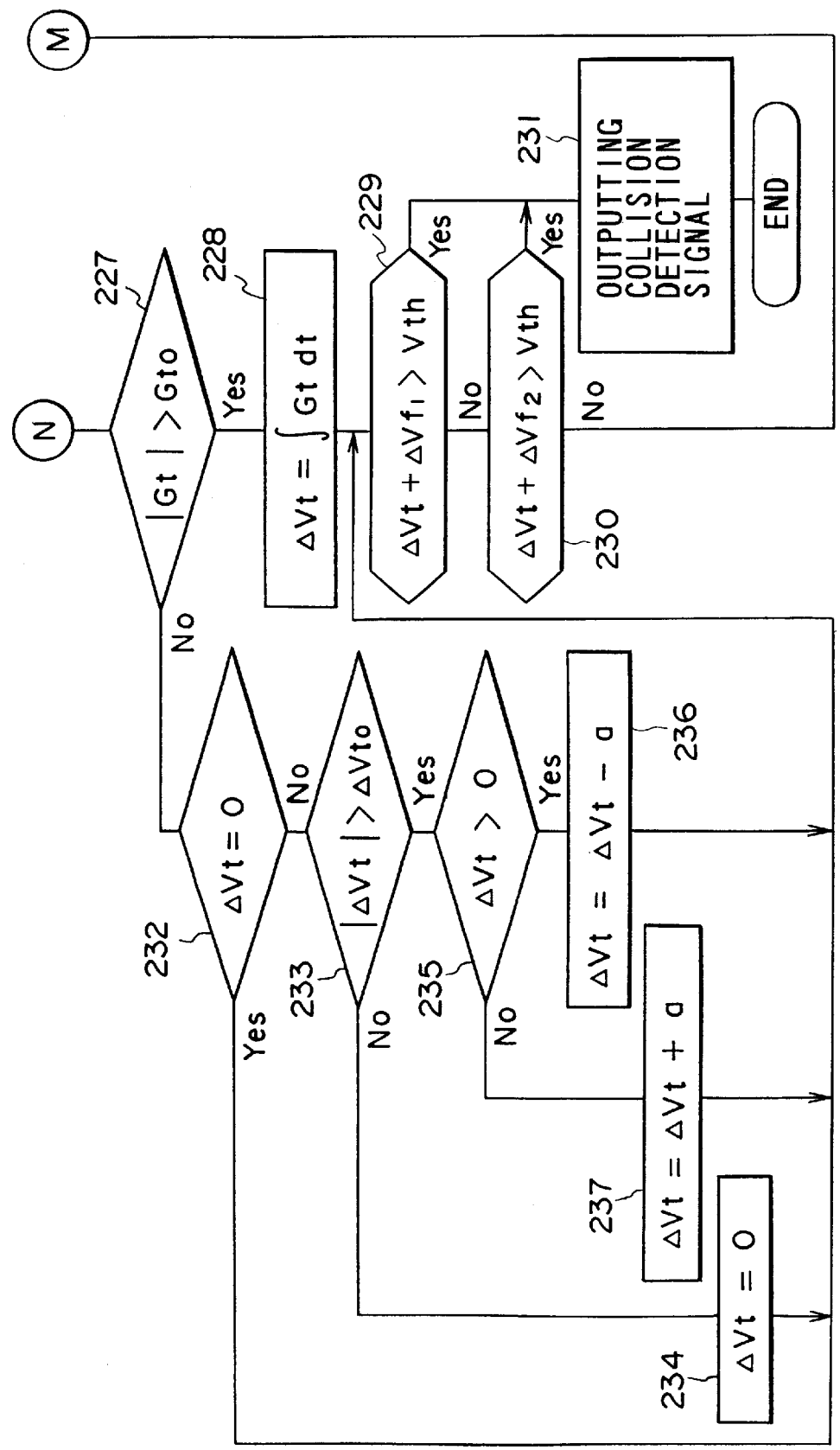

FIG. 18, FIG. 19 and FIG. 20 are flow diagrams of the microcomputer 2 of FIG. 1 showing a sixth embodiment. FIGS. 18–20 are applied to the microcomputer 2 in place of the flow diagrams of FIGS. 3–5. A terminal L of FIG. 19 is connected to a terminal having the same sign L of FIG. 18, and terminals M and N of the FIG. 20 are connected to terminals having the same signs M and N of FIG. 18 and FIG. 19.

The microcomputer 2 of the control unit 1, when the control processing is started, enters a step 211 after an initialization of a step 210. In the step 211, the microcomputer 2 inputs an acceleration signal Gf1 of the first front acceleration sensor 6, and decides whether an absolute value of the acceleration signal Gf1 is larger than the front reference value Gfo. When the absolute value of the acceleration signal Gf1 is larger than the reference value Gfo, the microcomputer 2 computes an integrated value $\Delta$Vf1 of the acceleration signal Gf1 in a step 212 and enters a step 219 of FIG. 19. The front reference value Gfo is as described in the first embodiment.

On the other hand, in the step 211, when the absolute value of the acceleration signal Gf1 is smaller than the front reference value Gfo, the microcomputer 2 enters a reset processing of steps 213–218, and goes to the step 219 of FIG. 19 after the reset processing. In the reset processing of the steps 213–218, the same processing as the aforementioned reset processing of the steps 56–61 in FIG. 3 is executed.

In the step 219 of FIG. 19, the microcomputer 2 inputs an acceleration signal Gf2 of the second front acceleration sensor 7, and decides whether an absolute value of the acceleration signal Gf2 is larger than the front reference value Gfo. When the absolute value of the acceleration signal Gf2 is larger than the reference value Gfo, the microcomputer 2 computes an integrated value $\Delta$Vf2 of the acceleration signal Gf2 in a step 220 and enters a step 227 of FIG. 20.

On the other hand, in the step 219, when the absolute value of the acceleration signal Gf2 is smaller than the front reference value Gfo, the microcomputer 2 enters a reset processing of steps 221–226, and goes to the step 227 of FIG. 20 after the reset processing. In the reset processing of the steps 221–226, the same processing as the aforementioned reset processing of the steps 66–71 in FIG. 4 is executed.

In the step 227 of FIG. 20, the microcomputer 2 inputs an acceleration signal Gt of the room acceleration sensor 8, and decides whether an absolute value of the acceleration signal Gt is larger than the room reference value Gto. When the absolute value of the acceleration signal Gt is larger than the reference value Gto, the microcomputer 2 computes an integrated value, $\Delta$Vt of the acceleration signal Gt in the step 228 and enters a following step 229. In the step 229, the microcomputer 2 computes a first added value $\Delta$Vt+$\Delta$Vf1 by adding the integrated value $\Delta$Vf1 of the first front acceleration sensor 6 to the integrated value $\Delta$Vt of the room acceleration sensor 8, and decides whether the first added value $\Delta$Vt+$\Delta$Vf1 is larger than a predetermined threshold value Vth. The threshold value Vth is set experimentally based on a collision requiring the drive of the occupant protection device 9 and a collision not requiring its drive. In the step 229, when the first added value $\Delta$Vt+$\Delta$Vf1 is smaller than the threshold value Vth, the microcomputer 2 enters a following step 230, computes a second added value $\Delta$Vt+$\Delta$Vf2 by adding the integrated value $\Delta$Vf2 of the second front acceleration sensor 7 to the integrated value $\Delta$Vt of the room acceleration sensor 8, and decides whether the second added value $\Delta$Vt+$\Delta$Vf2 is larger than the threshold value Vth. In the step 230, when the second added value $\Delta$Vt+$\Delta$Vf2 is smaller than the threshold value Vth, the microcomputer 2 returns to the step 211 of FIG. 18, and the aforementioned control processing is repeated. In the step 229, when the first added value $\Delta$Vt+$\Delta$Vf1 is larger than the threshold value Vth, the microcomputer 2 enters a step 231. Also, in the step 230, when the second added value $\Delta$Vt+$\Delta$Vf2 is larger than the threshold value Vth, the microcomputer 2 enters the step 231. By this, the microcomputer 2 outputs the collision detection signal to the drive circuit 5, and finishes the control processing. The drive circuit 5, when the collision detection signal is provided from the microcomputer 2, outputs the drive signal to the occupant protection device 9, and thereby the occupant protection device 9 such as an airbag is driven. The room reference value Gto is as described in the first embodiment.

Figure 21:
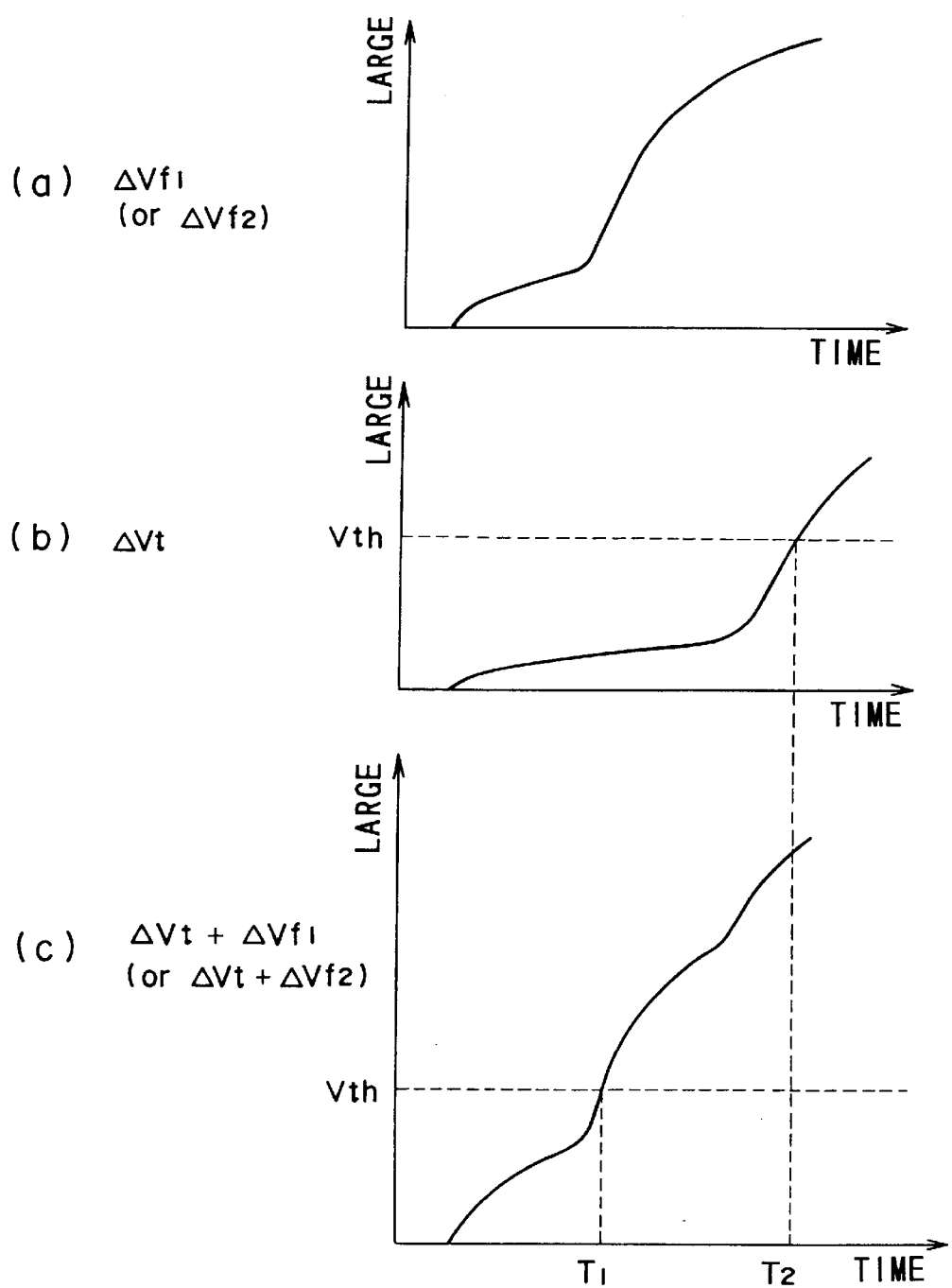
FIG. 21 is an explanatory drawing for explaining collision decisions in the sixth embodiment of FIGS. 18, 19 and 20.

FIG. 21 is an explanatory drawing for explaining a collision detection in the sixth embodiment of FIGS. 18–20. FIG. 21 shows an example of a collision in which a collision acceleration transmitted to the room acceleration sensor 8 provided on the floor tunnel is weakened. In FIG. 21, a reference letter (a) shows the integrated value $\Delta$Vf1 ($\Delta$Vf2) of the front acceleration sensor 6 (7), a reference letter (b) shows the integrated value $\Delta$Vt of the room acceleration sensor 8, and a reference letter (c) shows the added value $\Delta$Vt+$\Delta$Vf1 ($\Delta$Vt+$\Delta$Vf2). When a collision occurs, since the front acceleration sensor 6 (7) is provided in the front part of the vehicle, the integrated at value $\Delta$Vf1 ($\Delta$Vf2) of the front acceleration sensor 6 (7) increases immediately as shown in FIG. 21(a). As compared with this, since the collision acceleration transmitted to the floor tunnel is weakened due to absorption of impact by a crush of the car body, the integrated value $\Delta$Vt of the room acceleration sensor 8 increases later than the integrated value $\Delta$Vf1 ($\Delta$Vf2) of the front acceleration sensor 6 (7), and exceeds the threshold value Vth at a time point T2, as shown in FIG. 21(b). The added value $\Delta$Vt+$\Delta$Vf1 ($\Delta$Vt+$\Delta$Vf2) exceeds the threshold value Vth at a time point T1 before the time point T2, as shown in FIG. 21(c). Therefore, the microcomputer 2 can provide the collision detection signal to the drive circuit 5 without occurring a delay in the collision decision.

Reverting to FIG. 20, in the step 227, when the absolute value of the acceleration signal Gt of the room acceleration signal 8 is smaller than the room reference value Gto, the microcomputer 2 enters a reset processing of steps 232–237, and goes to the step 229 after the reset processing. In the reset processing of the steps 232–237, the same processing as the aforementioned reset processing of the steps 75–80 in FIG. 5 is executed.

Figure 22:
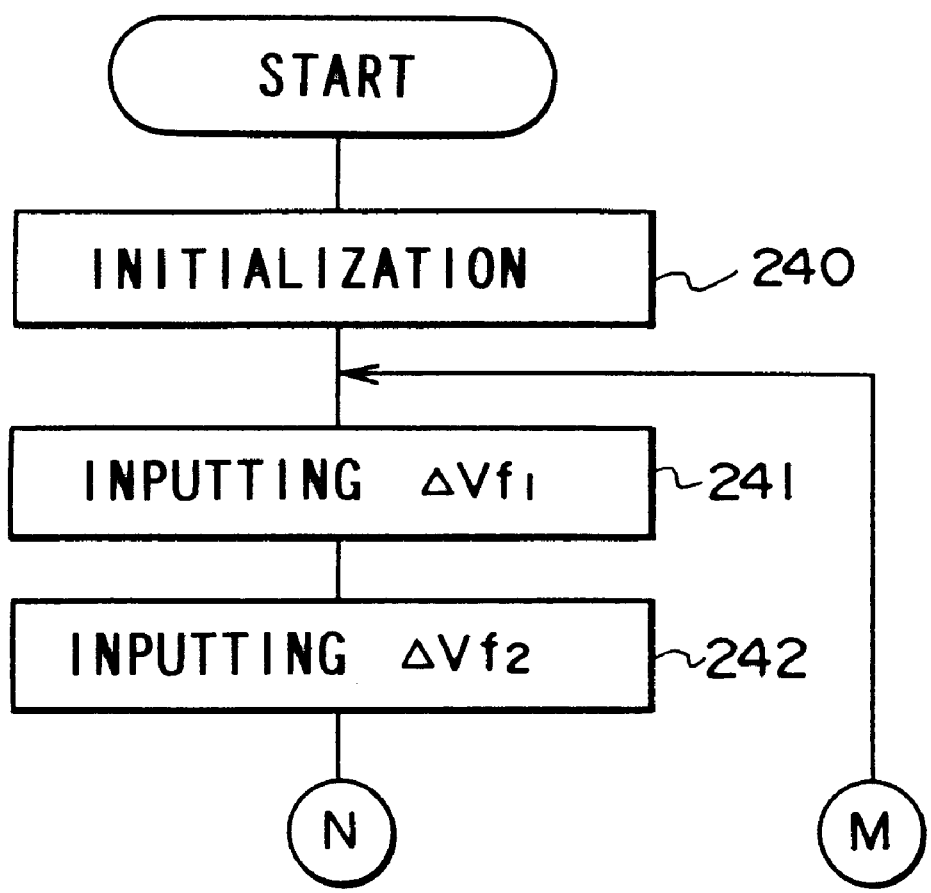
FIG. 22 is a flow diagram of the microcomputer of FIG. 1 showing a seventh embodiment of the present invention, and constitutes the flow diagrams of the microcomputer together with FIG. 20.

FIG. 22 is a flow diagram of the microcomputer 2 of FIG. 1 showing a seventh embodiment. FIG. 22 shows the flow diagram in the case in which the first and second front acceleration sensors 6' and 7' of FIG. 6 are used, and this is applied to the microcomputer 2 in place of the flow diagrams of FIG. 18 and FIG. 19. Terminals M and N of FIG. 22 are connected to terminals having the same signs M and N of FIG. 20. That is, FIG. 22 constitutes the flow diagrams of the microcomputer 2 together with FIG. 20.

The microcomputer 2 of the control unit 1, when the control processing is started, enters a step 241 after an initialization of a step 240. The microcomputer 2 inputs an integrated value $\Delta$Vf1 of an acceleration signal from the first front acceleration sensor 6' in the step 241, inputs an integrated value $\Delta$Vf2 of an acceleration signal from the first front acceleration sensor 7' in the step 242, and enters the step 227 of FIG. 20. In FIG. 20, as described above, whether the first added value $\Delta$Vt+$\Delta$Vf1 of the integrated values $\Delta$Vt and $\Delta$Vf1 is larger than the threshold value Vth is decided, and whether the second added value $\Delta$Vt+$\Delta$Vf2 of the integrated values $\Delta$Vt and $\Delta$Vf2 is larger than the threshold value Vth is decided. When both the first and second added values $\Delta$Vt+$\Delta$Vf1 and $\Delta$Vt+$\Delta$Vf2 are smaller than the threshold value Vth, the microcomputer 2 returns to the step 241 of FIG. 22. When one of the first and second added values $\Delta$Vt+$\Delta$Vf1 and $\Delta$Vt+$\Delta$Vf2 is larger than the threshold value Vth, the microcomputer 2 provides the collision detection signal to the drive circuit 5.

According to the seventh embodiment described above, since the microcomputer 2 does not need to perform an integration and a reset processing in relation to the sensor outputs of the first and second front acceleration sensors 6' and 7', simplification of composition as well as an improvement in processing speed can be achieved.

Figure 23:
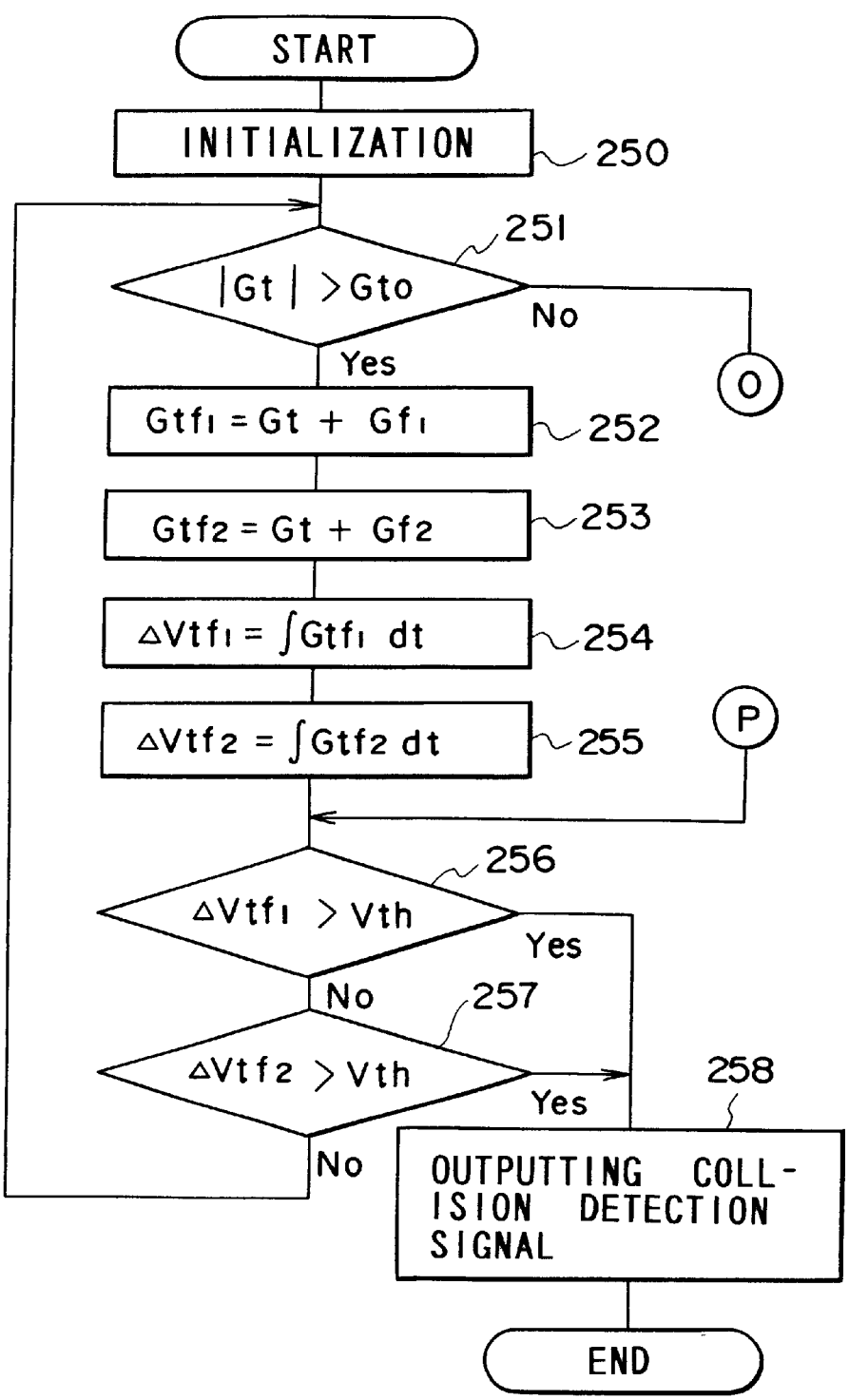
FIG. 23 and FIG. 24 are flow diagrams of the microcomputer of FIG. 1 showing an eighth embodiment of the present invention.
Figure 24:
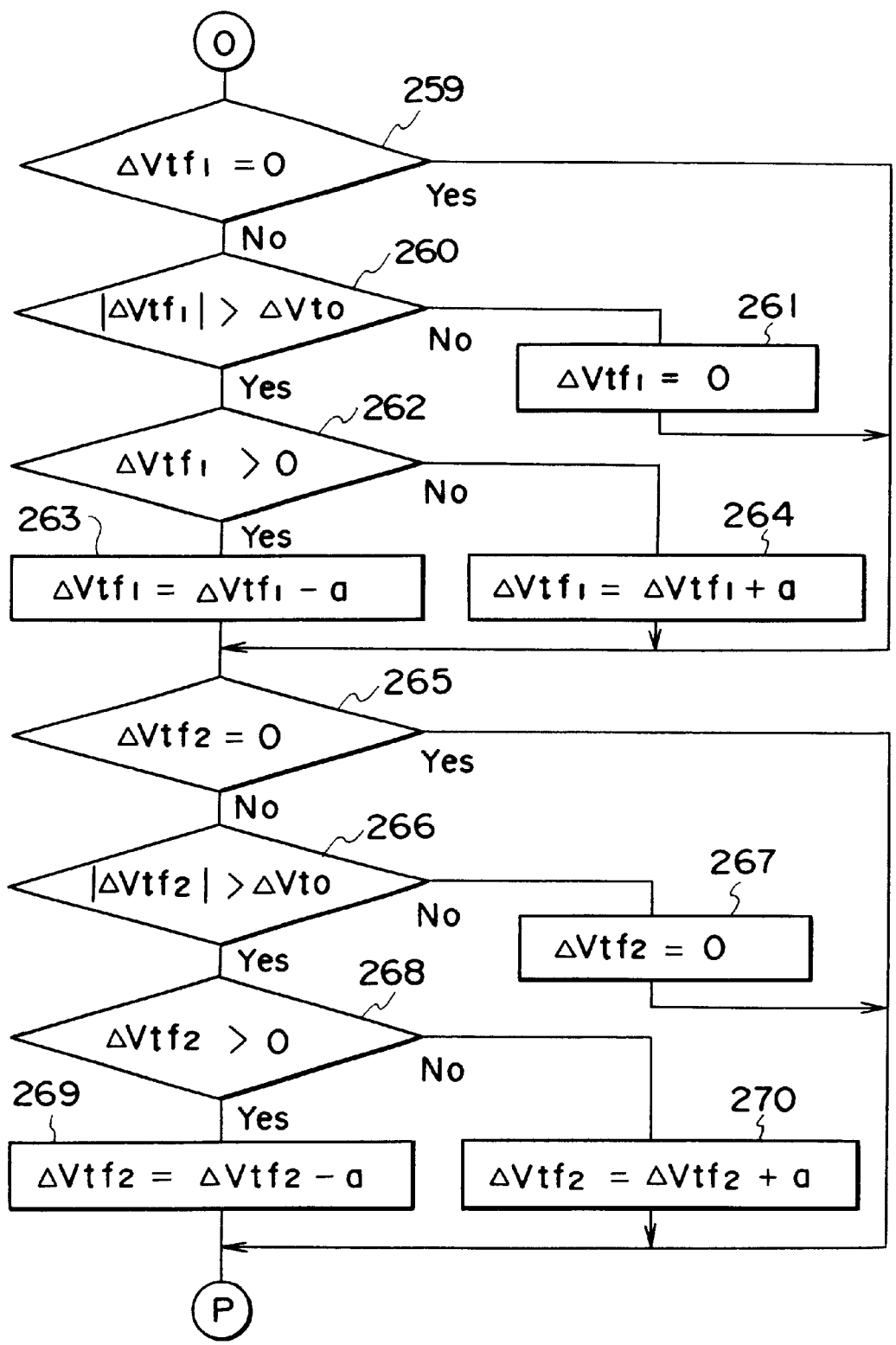

FIG. 23 and FIG. 24 are flow diagrams of the microcomputer 2 of FIG. 1 showing an eighth embodiment. FIG. 23 and FIG. 24 are applied to the microcomputer 2 in place of the flow diagrams of FIGS. 3–5. Terminals O and P of FIG. 23 are connected to terminals having the same signs O and P of FIG. 24.

The microcomputer 2 of the control unit 1, when the control processing is started, enters a step 251 after an initialization of a step 250. In the step 251, the microcomputer 2 inputs an acceleration signal Gt of the room acceleration sensor 8, and decides whether an absolute value of the acceleration signal Gt is lager than a reference value Gto. The reference value Gto is as described by way of the room reference value Gto in the first embodiment. When the absolute value of the acceleration signal Gt is larger than the reference value Gto, the microcomputer 2 enters a step 252. inputs an acceleration signal Gf1 of the first front acceleration sensor 6, and computes a first acceleration added value Gtf1 by adding the acceleration signal Gf1 to the acceleration signal Gt of the room acceleration sensor 8. In a following step 253, the microcomputer 2 inputs an acceleration signal Gf2 of the second front acceleration sensor 7, computes a second acceleration added value Gtf2 by adding the acceleration signal Gf2 to the acceleration signal Gt of the room acceleration sensor 8, and enters a step 254. The microcomputer 2 computes an integrated value ΔVtf1 of the first acceleration added value Gtf1 in the step 254, and computes an integrated value ΔVtf2 of the second acceleration added value Gtf2 in a following step 255. Thereafter, in a step 256, the microcomputer 2 decides whether the integrated value ΔVtf1 of the first acceleration added value Gtf1 is larger than the threshold value Vth. The threshold value Vth is as described in the sixth embodiment. When the integrated value ΔVtf1 is smaller than the threshold value Vth, the microcomputer 2 enters a step 257. In the step 257, the microcomputer 2 decides whether the integrated value ΔVtf2 of the second acceleration added value Gtf2 is larger than the threshold value Vth. When the integrated value ΔVtf2 is smaller than the threshold value Vth, the microcomputer 2 returns to the step 251, and the control processing is repeated. In the step 256, when the integrated value ΔVtf1 of the first acceleration added value Gtf1 is larger than the threshold value Vth, the microcomputer 2 enters a step 258. Also, in the step 257, when the integrated value ΔVtf2 of the second acceleration added value Gtf2 is larger than the threshold value Vth, the microcomputer 2 enters the step 258. By this, the microcomputer 2 outputs the collision detection signal to the drive circuit 5, and finishes the control processing. The drive circuit 5, when the collision detection signal is provided from the microcomputer 2, outputs the drive signal to the occupant protection device 9, and thereby the occupant protection device 9 is driven.

On the other hand, in the step 251, when the absolute value of the acceleration signal Gt of the room acceleration sensor 8 is smaller than the front reference value Gfo, the microcomputer 2 enters the flow diagram of FIG. 24, executes a reset processing of the integrated value ΔVtf1 of the first acceleration added value Gtf1 in steps 259–264 and a reset processing of the integrated value ΔVtf2 of the second acceleration added value Gtf2 in steps 265–270, and goes to the step 256 of FIG. 23 after the reset processings.

In the reset processings of the steps 259–264 and the steps 265–270, a processing like the aforementioned reset processing in the first embodiment is executed.

That is, in the step 259, whether the integrated value ΔVtf1 of the first acceleration added value Gtf1 is "0" is decided. The microcomputer 2 directly enters from the step 259 to the step 265 when the integrated value ΔVtf1 is "0", and enters the following step 260 when the integrated value ΔVtf1 is not "0". In the step 260, whether an absolute value of the integrated value ΔVtf1 is larger than a reset reference value ΔVto is decided. The reset reference value ΔVto is as described by way of the room reset reference value ΔVto in the first embodiment. When the absolute value of the integrated value ΔVtf1 is smaller than the reference value ΔVto, the microcomputer 2 resets the integrated value ΔVtf1 to "0" in the step 261 and enters the step 265. When the absolute value of the integrated value ΔVtf1 is larger than the reference value ΔVto, the microcomputer 2 enters from the 260 to the 262 and decides whether the integrated value ΔVtf1 is larger than "0". When the integrated value ΔVtf1 is larger than "0", the subtraction value "a" is subtracted from the integrated value ΔVtf1 in the step 263. When the integrated value ΔVtf1 is not larger than "0", the subtraction value "a" is added to the integrated value ΔVtf1 in the step 264. Thereafter, the microcomputer 2 enters the step 265.

In the step 265, whether the integrated value ΔVtf2 of the second acceleration added value Gtf2 is "0" is decided. The microcomputer 2 enters from the step 265 to the step 256 of FIG. 23 when the integrated value ΔVtf2 is "0", and enters the following step 266 when the integrated value ΔVtf2 is not "0". In the step 266, whether an absolute value of the integrated value ΔVtf2 is larger than the reset reference value ΔVto is decided. When the absolute value of the integrated value ΔVtf2 is smaller than the reference value ΔVto, the microcomputer 2 resets the integrated value ΔVtf2 to "0" in the step 267 and enters the step 256 of FIG. 23. When the absolute value of the integrated value ΔVtf2 is larger than the reference value ΔVto, the microcomputer 2 enters from the 266 to the 268 and decides whether the integrated value ΔVtf2 is larger than "0". When the integrated value ΔVtf2 is larger than "0", the subtraction value "a" is subtracted from the integrated value ΔVtf2 in the step 269. When the integrated value ΔVtf2 is not larger than "0", the subtraction value "a" is added to the integrated value ΔVtf2 in the step 270. Thereafter, the microcomputer 2 enters the step 256 of FIG. 23.

According to the eighth embodiment, the first acceleration added value Gtf1 is computed by adding the acceleration signal Gf1 of the first front acceleration sensor 6 to the acceleration signal Gt of the room acceleration sensor 8, and the second acceleration added value Gtf2 is computed by adding the acceleration signal Gf2 of the second front acceleration sensor 6 to the acceleration signal Gt of the room acceleration sensor 8. And, when one of the integrated value ΔVtf1 of the first acceleration added value Gtf1 and the integrated value ΔVtf2 of the second acceleration added value Gtf2 exceeds the threshold value Vth, the occupant protection device 9 is driven. Because of this, likewise the sixth embodiment of FIGS. 18–20, even in case of a collision in which a collision acceleration transmitted to the room acceleration sensor 8 is weakened, the control unit 1 can exactly drive the occupant protection device 9 without causing a delay in collision decision.

Figure 25:
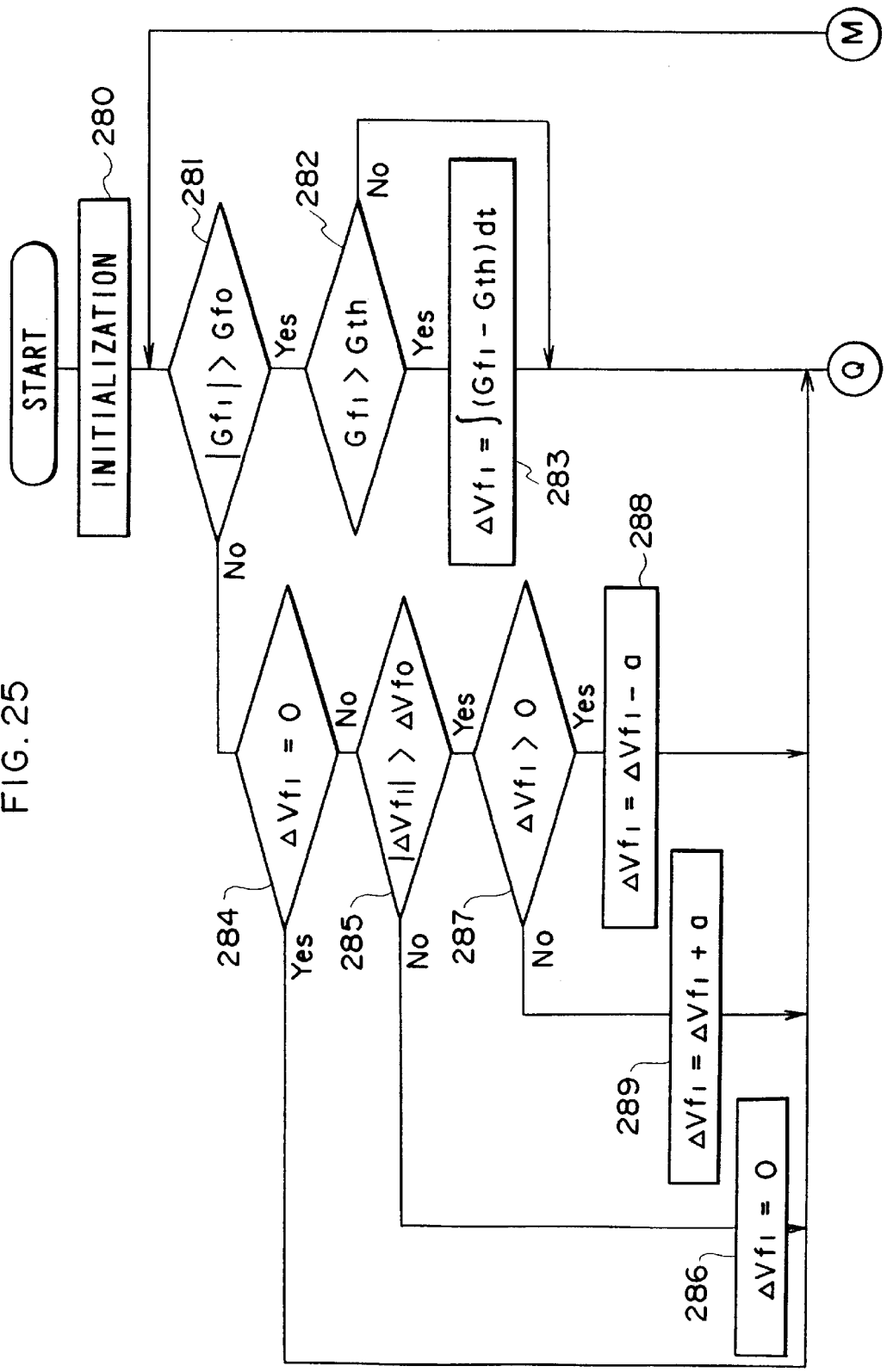
FIG. 25 and FIG. 26 are flow diagrams of the microcomputer of FIG. 1 showing a ninth embodiment of the present invention, and constitute the flow diagrams of the microcomputer together with FIG. 20.
Figure 26:
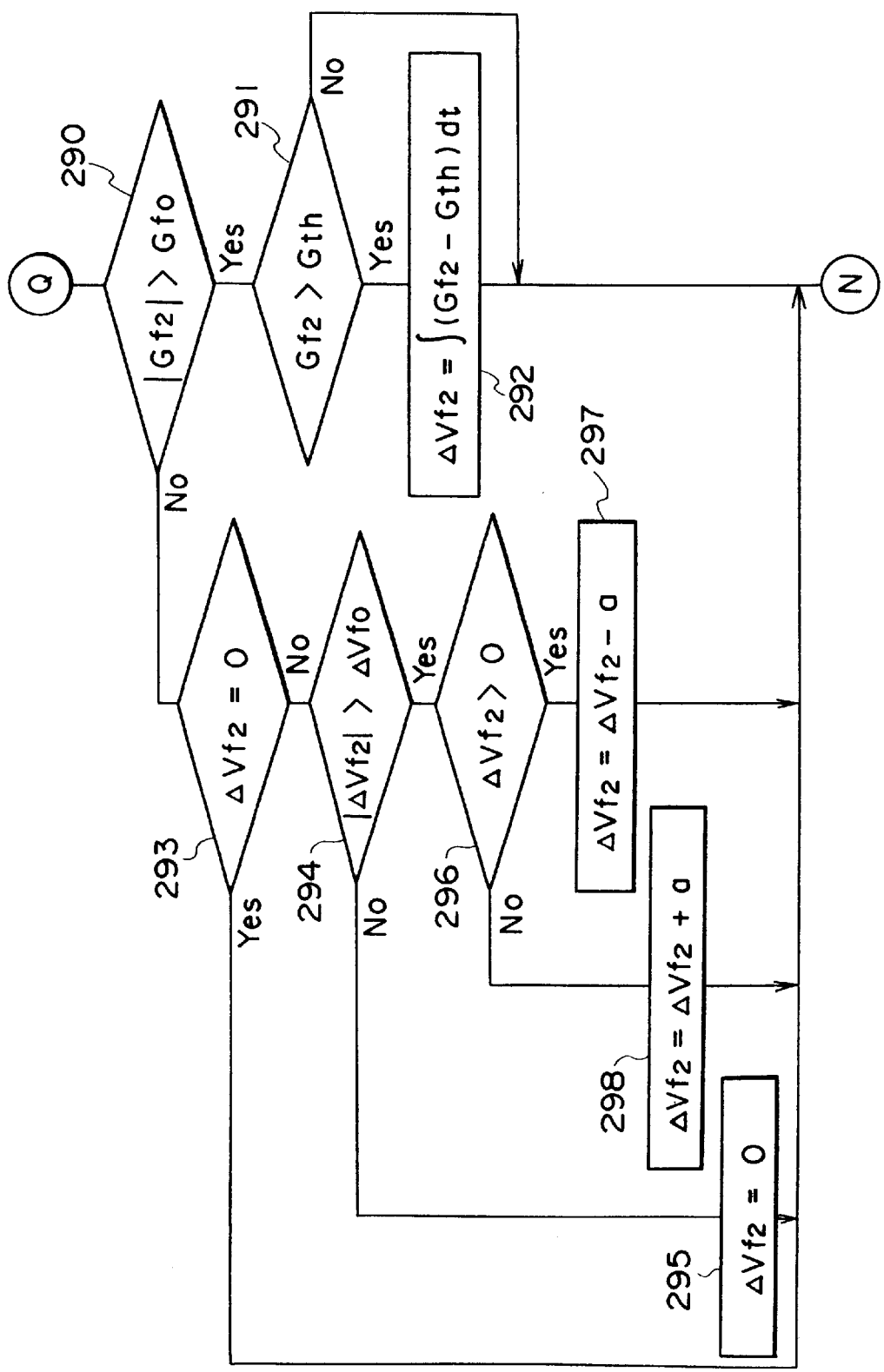

FIG. 25 and FIG. 26 are flow diagrams of the microcomputer 2 of FIG. 1 showing a ninth embodiment. FIG. 25 and FIG. 26 are applied to the microcomputer 2 in place of the flow diagrams of FIG. 18 and FIG. 19. A terminal M of FIG.

25 is connected to a terminal having the same sign M of FIG. 20, and terminals N and Q of FIG. 26 are connected to terminals having the same signs N and Q of FIG. 20 and FIG. 25. That is, FIG. 25 and FIG. 26 constitute the flow diagrams of the microcomputer 2 together with FIG. 20.

The microcomputer 2 of the control unit 1, when the control processing is started, enters a step 281 after an initialization of a step 280. In the step 281, the microcomputer 2 inputs an acceleration signal Gf1 of the first front acceleration sensor 6, and decides whether an absolute value of the acceleration signal Gf1 is larger than the front reference value Gfo. The front reference value Gfo is as described in the first embodiment. When the absolute value of the acceleration signal Gf1 is larger than the reference value Gfo, the microcomputer 2 enters a step 282, and decides whether the acceleration signal Gf1 is larger than a predetermined value Gth. The predetermined value Gth is a threshold value for extracting a collision acceleration signal to be integrated from a collision acceleration signal given from the front acceleration sensor 6 (7) at the time of vehicle collision. The predetermined value Gth is set to a value larger than the front reference value Gfo. The predetermined value Gth is set experimentally based on a collision acceleration occurring in a collision in which a drive of the occupant protection device 9 is not required, for example. When the acceleration signal Gf1 is larger than the value Gth, the microcomputer 2 enters from the step 282 to a step 283, computes an acceleration part Gf1−Gth over the predetermined value Gth by subtracting the predetermined value Gth from the acceleration signal Gf1, computes an Integrated value ΔVf1 of the acceleration part Gf1−Gth, and enters a step 290 of FIG. 26. When the acceleration signal Gf1 is smaller than the value Gth, the microcomputer 2 directly enters the step 290 of FIG. 26 without entering the step 283.

On the other hand, in the step 281, when the absolute value of the acceleration signal Gf1 is smaller than the front reference value Gfo, the microcomputer 2 enters a reset processing of steps 284–289, and goes to the step 290 of FIG. 26 after the reset processing. In the reset processing of the steps 284–289, the same processing as the aforementioned reset processing of the steps 56–61 in FIG. 3 is executed.

In the step 290 of FIG. 26, the microcomputer 2 inputs an acceleration signal Gf2 of the second front acceleration sensor 7, and decides whether an absolute value of the acceleration signal Gf2 is larger than the front reference value Gfo. When the absolute value of the acceleration signal Gf2 is larger than the reference value Gfo, the microcomputer 2 enters a step 291, and decides whether the acceleration signal Gf2 is larger than the predetermined value Gth. When the acceleration signal Gf2 is larger than the value Gth, the microcomputer 2 enters a step 292, computes an acceleration part Gf2−Gth over the predetermined value Gth by subtracting the predetermined value Gth from the acceleration signal Gf2, computes an integrated value ΔVf2 of the acceleration part Gf2−Gth, and enters the step 227 of FIG. 20. When the acceleration signal Gf2 is smaller than the value Gth, the microcomputer 2 directly enters the step 227 of FIG. 20 without entering the step 292.

On the other hand, in the step 290, when the absolute value of the acceleration signal Gf2 is smaller than the front reference value Gfo, the microcomputer 2 enters a reset processing of steps 293–298, and goes to the step 227 of FIG. 20 after the reset processing. In the reset processing of the steps 293–298, the same processing as the aforementioned reset processing of the steps 66–71 in FIG. 4 is executed.

FIG. 27 is an explanatory drawing for explaining the integration processing of the acceleration signal Gf1 (Gf2) of the front acceleration sensor 6 (7) in the ninth embodiment of FIGS. 25, 26, and 20. In FIG. 27, a reference letter (a) shows the acceleration signal Gf1 (Gf2) of the front acceleration sensor 6 (7) at the time of a small collision, and a reference letter (b) shows it at the time of a big collision. In the ninth embodiment, the acceleration part Gf1−Gth (Gf2−Gth), shown by oblique lines, over the predetermined value Gth in the acceleration signal Gf1 (Gf2) is integrated. An acceleration part under the predetermined value Gth is not integrated. Because of this, a ratio between an integrated value on the occasion of the small collision and an integrated value on the occasion of the big collision becomes large as comparison with a case that the whole of the acceleration signal Gf1 (Gf2) is integrated. That is, a difference in dimension of the integrated values as to the small and big collisions becomes more conspicuous. As a result, when the integrated value of the room acceleration sensor 8 and the integrated value of the front acceleration sensor 6 (7) are added as described below, an added value on the occasion of the big collision becomes larger as against an added value on the occasion of the small collision. Hence, it is easy to distinguish between an collision requiring to drive the occupant protection device 9 and an collision not requiring to drive it.

In FIG. 20, as described above, a first added value ΔVt+ΔVf1 is computed by adding the integrated value ΔVf1 of the acceleration part Gf1−Gth of the first front acceleration sensor 6 to the integrated value ΔVt of the room acceleration sensor 8, and decides whether the first added value ΔVt+ΔVf1 is larger than the threshold value Vth. Also, a second added value ΔVt+ΔVf2 is computed by adding the integrated value ΔVf2 of the acceleration part Gf2−Gth of the second front acceleration sensor 7 to the integrated value ΔVt of the room acceleration sensor 8, and decides whether the second added value ΔVt+ΔVf2 is larger than the threshold value Vth. When the first and second added values ΔVt+ΔVf1 and ΔVt+ΔVf2 are smaller than the threshold value Vth, the microcomputer 2 returns to the step 281 of FIG. 25. When one of the first and second added values ΔVt+ΔVf1 and ΔVt+ΔVf2 is larger than the threshold value Vth, the microcomputer 2 outputs the collision detection signal to the drive circuit 5.

According to the ninth embodiment described above, the acceleration part Gf1−Gth over the predetermined value Gth is extracted from the acceleration signal Gf1 of the first front acceleration sensor 6, and the first added value ΔVt+ΔVf1 is computed by adding the integrated value ΔVf1 of the acceleration part Gf1−Gth to the integrated value ΔVt of the room acceleration sensor 8. Also, the acceleration part Gf2−Gth over the predetermined value Gth is extracted from the acceleration signal Gf2 of the second front acceleration sensor 7, and the second added value ΔVt+ΔVf2 is computed by adding the integrated value ΔVf2 of the acceleration part Gf2−Gth to the integrated value ΔVt of the room acceleration sensor 8. And, when one of the first and second added values ΔVt+ΔVf1 and ΔVt+ΔVf2 exceeds the threshold value Vth, the occupant protection device 9 is driven. Because of this, likewise the sixth embodiment of FIGS. 18–20, even in case of a collision in which a collision acceleration transmitted to the room acceleration sensor 8 is weakened, the control unit 1 can exactly drive the occupant protection device 9 without causing a delay in collision decision.

Although two front acceleration sensors are used in the sixth, seventh, eighth and ninth embodiments, the number of front acceleration sensors, as described above, can be one, or more than two.

From foregoing it will now be apparent that a new and improved control apparatus of an occupant protection device has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A control apparatus of an occupant protection device having a room acceleration sensor, provided in a room of a vehicle, for detecting an acceleration of the vehicle and outputting an acceleration signal representative thereof, comprising:

at least one front acceleration sensor, provided in a front part of the vehicle, for detecting the acceleration of the vehicle and outputting an acceleration signal representative thereof or an integrated value of the acceleration signal as a sensor output; and a control unit, connected to said room acceleration sensor and said front acceleration sensor, for inputting the acceleration signal of said room acceleration sensor and the sensor output of said front acceleration sensor, said control unit driving the occupant protection device when an integrated value of the acceleration signal of said room acceleration sensor exceeds a predetermined threshold value, said control unit detecting whether the vehicle is in a collision requiring to drive the occupant protection device based on the sensor output of said front acceleration sensor, and increasing the integrated value of said room acceleration sensor when the collision is detected based on the sensor output of said front acceleration sensor.

2. The control apparatus of claim 1, having first and second front acceleration sensors, wherein:

said control unit detects whether the vehicle is in the collision based on each sensor output of said first and second acceleration sensors, respectively;

said control unit adds a first addition value to the integrated value of the acceleration signal of said room acceleration sensor when the collision is detected by either one of a detection based on the first front acceleration sensor or a detection based on the second front acceleration sensor; and said control unit adds a second addition value larger than the first addition value to the integrated value of the acceleration signal of said room acceleration sensor when the collision is detected by both of the detection based on the first front acceleration sensor and the detection based on the second front acceleration sensor.

3. The control apparatus of claim 2, wherein:

said control unit recognizes a first collision time representative of a time point of the collision detected based on the sensor output of said first front acceleration sensor, and recognizes a second collision time representative of a time point of the collision detected based on the sensor output of said second front acceleration sensor; and said control unit decides whether a time difference between the first and second collision times is smaller than a predetermined time value when the collision is detected by both of the detection based on the first front acceleration sensor and the detection based on the second front acceleration sensor, and adds a third addition value larger than the second addition value to the integrated value of the acceleration signal of said room acceleration sensor when the time difference is smaller than the predetermined time value.

4. The control apparatus of claim 2, wherein said first and second front acceleration sensors are provided near right and left portions of a radiator of a vehicle front, respectively.

5. The control apparatus of claim 2, wherein:

said first and second front acceleration sensors output the acceleration signals;

said control unit has a front reference value for deciding whether to integrate each acceleration signal of said first and second front acceleration sensors;

said control unit integrates each acceleration signal of said first and second front acceleration sensors when each acceleration signal of said first and second front acceleration sensors is larger than the front reference value, and detects the collision based on a comparison between each integrated value of said first and second acceleration sensors and a predetermined front threshold value, respectively; and said control unit, when each acceleration signal of said first and second front acceleration sensors is smaller than the front reference value, processes each integrated value of said first and second front acceleration sensors gradually toward a reset direction.

6. The control apparatus of claim 1, wherein:

said front acceleration sensor outputs the acceleration signal;

said control unit has a front reference value for deciding whether the acceleration signal of said front acceleration sensor is integrated;

said control unit integrates the acceleration signal of said front acceleration sensor when the acceleration signal of said front acceleration sensor is larger than the front reference value, and detects the collision based on a comparison between an integrated value of the acceleration signal and a predetermined front threshold value; and said control unit, when the acceleration signal of said front acceleration sensor is smaller than the front reference value, processes the integrated value of the acceleration signal of said front acceleration sensor gradually toward a reset direction.

7. The control apparatus of claim 1, wherein said front acceleration sensor is provided near a radiator of a center part of a vehicle front.

8. The control apparatus of claim 1, wherein said front acceleration sensor comprises:

a piezo-electric element for detecting the acceleration;

an amplifier circuit for inputting voltage outputs of both ends of said piezo-electric element, and for outputting the acceleration signal by differentially amplifying the voltage outputs of said piezo-electric element;

a bias resistor circuit provided at an input side of said amplifier circuit;

a condenser inserted in parallel with said piezo-electric element so as to lower a lower cut-off frequency without increasing resistance values of said bias resistor circuit;

temperature compensation means for adjusting a gain of said amplifier circuit so that an output-temperature characteristic of said piezo-electric element is compensated; and a reference voltage circuit for giving a reference potential to said amplifier circuit and said bias resistor circuit.

9. The control apparatus of claim 8, wherein a capacity of said condenser is set so that resistors of said bias resistor circuit have values that can be used in a normal atmosphere and so that the lower cut-off frequency have a low value in which velocity variations can easily be detected.

10. The control apparatus of claim 8, wherein:

said amplifier circuit includes a first non-inverting amplifier circuit for non-inversion amplifying one voltage output of said piezo-electric element, a second non-inverting amplifier circuit for non-inversion amplifying the other voltage output of said piezo-electric element, and a differential amplifier circuit for differentially amplifying outputs of said first and second non-inverting amplifier circuits; and said temperature compensation means is a single temperature compensation element for adjusting gains of said first and second non-inverting amplifier circuits.

11. The control apparatus of claim 10, wherein:

said first non-inverting amplifier circuit has a first operational amplifier, one input terminal of the first operational amplifier being connected to one end of said piezo-electric element, and the other input terminal of the first operational amplifier being connected through a first resistor to an output terminal of the first operational amplifier;

said second non-inverting amplifier circuit has a second operational amplifier, one input terminal of the second operational amplifier being connected to the other end of said piezo-electric element, and the other input terminal of the second operational amplifier being connected through a second resistor to an output terminal of the second operational amplifier; and said temperature compensation element is inserted between the other input terminal of the first operational amplifier and the other input terminal of the second operational amplifier, and decreases the gains of the first and second operational amplifiers when temperature rises and increases these gains when temperature drops.

12. The control apparatus of claim 10, wherein the gains of the said first and second non-inverting amplifier circuits are set so that decrement in the voltage outputs of said piezo-electric element due to the parallel insertion of said condenser to said piezo-electric element can be supplemented.

13. The control apparatus of claim 10, wherein:

said differential amplifier circuit has an operational amplifier, one input terminal of the operational amplifier receiving the output of said second non-inverting amplifier circuit and the reference potential of said reference voltage circuit, and the other input terminal of the operational amplifier receiving the output of said first non-inverting amplifier circuit; and said reference voltage circuit has a reference voltage buffer amplifier for matching with output impedances of said first and second non-inverting amplifier circuits, and supplies the reference potential to at least said differential amplifier circuit by way of the reference voltage buffer amplifier.

14. The control apparatus of claim 8, wherein:

said front acceleration sensor has a sensor power supply line to which a constant voltage is supplied from an outside, an output terminal of said amplifier circuit of said front acceleration sensor is grounded by way of an output resistor, and the acceleration signal of said front acceleration sensor is output as current variations in the sensor power supply line; and said control unit includes a unit power supply line for supplying the constant voltage to the sensor power supply line by way of a transmission cable, and a receiving circuit for receiving the acceleration signal of said front acceleration sensor by detecting the current variations in the unit power supply line.

15. The control apparatus of claim 14, wherein the receiving circuit comprises:

a current mirror circuit, inserted between the unit power supply line and the transmission cable, for giving a current output according to the current variations representative of the acceleration signal of said front acceleration sensor; and a detection resistor, inserted between an output side of the current mirror circuit and the ground, for outputting a voltage signal corresponding to the current output of the current mirror circuit.

16. The control apparatus of claim 1, wherein said front acceleration sensor comprises:

a piezo-electric element for detecting the acceleration;

an amplifier circuit for inputting voltage outputs of both ends of said piezo-electric element, for differentially amplifying and integrating the voltage outputs of said piezo-electric element, and for outputting the integrated value of the acceleration signal as the sensor output;

a bias resistor circuit provided at an input side of said amplifier circuit;

a condenser inserted in parallel with said piezo-electric element so as to lower a lower cut-off frequency without increasing resistance values of said bias resistor circuit;

temperature compensation means for adjusting a gain of said amplifier circuit so that an output-temperature characteristic of said piezo-electric element is compensated; and a reference voltage circuit for giving a reference potential to said amplifier circuit and said bias resistor circuit.

17. The control apparatus of claim 16, wherein a capacity of said condenser is set so that resistors of said bias resistor circuit have values that can be used in a normal atmosphere and so that the lower cut-off frequency have a low value in which velocity variations can easily be detected.

18. The control apparatus of claim 16, wherein:

said amplifier circuit includes a first non-inverting amplifier circuit for non-inversion amplifying one voltage output of said piezo-electric element, a second non-inverting amplifier circuit for non-inversion amplifying the other voltage output of said piezo-electric element, and a differential amplifier circuit for differentially amplifying outputs of said first and second non-inverting amplifier circuits, said first and second non-inverting amplifier circuits and/or said differential amplifier circuit having an integrating function; and said temperature compensation means is a single temperature compensation element for adjusting gains of said first and second non-inverting amplifier circuits.

19. The control apparatus of claim 18, wherein:

said first non-inverting amplifier circuit has a first operational amplifier, one input terminal of the first operational amplifier being connected to one end of said piezo-electric element, and the other input terminal of the first operational amplifier being connected to an output terminal of the first operational amplifier by way of a parallel connection of a first resistor and a first condenser;

said second non-inverting amplifier circuit has a second operational amplifier, one input terminal of the second operational amplifier being connected to the other end of said piezo-electric element, and the other input terminal of the second operational amplifier being connected to an output terminal of the second operational amplifier by way of a parallel connection of a second resistor and a second condenser; and said temperature compensation element is inserted between the other input terminal of the first operational amplifier and the other input terminal of the second operational amplifier, and decreases the gains of the first and second operational amplifiers when temperature rises and increases these gains when temperature drops.

20. The control apparatus of claim 18, wherein said differential amplifier circuit has a third operational amplifier, one input terminal of the third operational amplifier being connected to an output terminal of said second non-inverting amplifier circuit by way of a third resistor and being also connected to said reference voltage circuit by way of a parallel connection of a fourth resistor and a third condenser, and the other input terminal of the third operational amplifier being connected to an output terminal of said first non-inverting amplifier circuit by way of a fifth resistor and being also connected to an output terminal of the third operational amplifier by way of a parallel connection of a sixth resistor and a fourth condenser.

21. The control apparatus of claim 18, wherein the gains of said first and second non-inverting amplifier circuits are set so that decrement in the voltage outputs of said piezo-electric element due to the parallel insertion of said condenser to said piezo-electric element can be supplemented.

22. The control apparatus of claim 18, wherein:

said differential amplifier circuit has an operational amplifier, one input terminal of the operational amplifier receiving the output of said second non-inverting amplifier circuit and the reference potential of said reference voltage circuit, and the other input terminal of the operational amplifier receiving the output of said first non-inverting amplifier circuit; and said reference voltage circuit has a reference voltage buffer amplifier for matching with output impedances of said first and second non-inverting amplifier circuits, and supplies the reference potential to at least said differential amplifier circuit by way of the reference voltage buffer amplifier.

23. The control apparatus of claim 16, wherein:

said front acceleration sensor has a sensor power supply line to which a constant voltage is supplied from an outside, an output terminal of said amplifier circuit of said front acceleration sensor is grounded by way of an output resistor, and the integrated value of the acceleration signal from said front acceleration sensor is output as current variations in the sensor power supply line; and said control unit includes a unit power supply line for supplying the constant voltage to the sensor power supply line by way of a transmission cable, and a receiving circuit for receiving the integrated value of the acceleration signal from said front acceleration sensor by detecting the current variations in the unit power supply line.

24. The control apparatus of claim 23, wherein the receiving circuit comprises:

a current mirror circuit, inserted between the unit power supply line and the transmission cable, for giving a current output according to the current variations representative of the integrated value of the acceleration signal of said front acceleration sensor; and a detection resistor, inserted between an output side of the current mirror circuit and the ground, for outputting a voltage signal corresponding to the current output of the current mirror circuit.

25. A control apparatus of an occupant protection device having a room acceleration sensor, provided in a room of a vehicle, for detecting an acceleration of the vehicle and outputting an acceleration signal representative thereof, comprising:

at least one front acceleration sensor, provided in a front part of the vehicle, for detecting the acceleration of the vehicle and outputting an acceleration signal representative thereof or an integrated value of the acceleration signal as a sensor output; and a control unit, connected to said room acceleration sensor and said front acceleration sensor, for inputting the acceleration signal of said room acceleration sensor and the sensor output of said front acceleration sensor, said control unit computing an added value by adding the integrated value of the acceleration signal of said front acceleration sensor to an integrated value of the acceleration signal of said room acceleration sensor, and driving the occupant protection device when the added value exceeds a predetermined threshold value.

26. The control apparatus of claim 25, having a plurality of front acceleration sensors, wherein:

said control unit computes respectively added values by adding each integrated value of acceleration signals of said front acceleration sensors to the integrated value of the acceleration signal of said room acceleration sensor, and drives the occupant protection device when one of the added values exceeds the predetermined threshold value.

27. The control apparatus of claim 26, having first and second front acceleration sensors, wherein said first and second front acceleration sensors are provided near right and left portions of a radiator of a vehicle front, respectively.

28. The control apparatus of claim 25, wherein:

said front acceleration sensor outputs the acceleration signal;

said control unit has a front reference value for deciding whether the acceleration signal of said front acceleration sensor is integrated;

said control unit integrates the acceleration signal of said front acceleration sensor when the acceleration signal of said front acceleration sensor is larger than the front reference value; and said control unit, when the acceleration signal of said front acceleration sensor is smaller than the front reference value, processes the integrated value of the acceleration signal of said front acceleration sensor gradually toward a reset direction.

29. A control apparatus of an occupant protection device having a room acceleration sensor, provided in a room of a vehicle, for detecting an acceleration of the vehicle and outputting an acceleration signal representative thereof, comprising:

at least one front acceleration sensor, provided in a front part of the vehicle, for detecting the acceleration of the vehicle and outputting an acceleration signal representative thereof; and a control unit, connected to said room acceleration sensor and said front acceleration sensor, for inputting the acceleration signals of said room and front acceleration sensors, said control unit computing an acceleration added value by adding the acceleration signal of said front acceleration sensor to the acceleration signal of said room acceleration sensor, and computing an integrated value of the acceleration added value, said control unit driving the occupant protection device when the integrated value of the acceleration added value exceeds a predetermined threshold value.

30. The control apparatus of claim 29, having a plurality of front acceleration sensors, wherein:

said control unit computes respectively acceleration added values by adding each acceleration signal of said front acceleration sensors to the acceleration signal of said room acceleration sensor, computes respectively integrated values of the acceleration added values, and drives the occupant protection device when one of the Integrated values exceeds the predetermined threshold value.

31. The control apparatus of claim 29, wherein:

said control unit has a reference value for deciding whether the acceleration signal of said room acceleration sensor is integrated;

said control unit computes the acceleration added value and the integrated value of the acceleration added value when the acceleration signal of said room acceleration sensor is lager than the reference value; and said control unit, when the acceleration signal of said room acceleration sensor is smaller than the reference value, processes the integrated value of the acceleration added value gradually toward a reset direction.

32. A control apparatus of an occupant protection device having a room acceleration sensor, provided in a room of a vehicle, for detecting an acceleration of the vehicle and outputting an acceleration signal representative thereof, comprising:

at least one front acceleration sensor, provided in a front part of the vehicle, for detecting the acceleration of the vehicle and outputting an acceleration signal representative thereof; and a control unit, connected to said room acceleration sensor and said front acceleration sensor, for inputting the acceleration signals of said room and front acceleration sensors, said control unit extracting an acceleration part over a predetermined acceleration value from the acceleration signal of said front acceleration sensor, and computing an integrated value of the acceleration part, said control unit computing an added value by adding the integrated value of the acceleration part to an integrated value of the acceleration signal of said room acceleration sensor, and driving the occupant protection device when the added value exceeds a predetermined threshold value.

33. The control apparatus of claim 32, having a plurality of front acceleration sensors, wherein:

said control unit extracts respectively acceleration parts over the predetermined acceleration value from acceleration signals of said front acceleration sensors, computes respectively integrated values of the acceleration parts, computes respectively added values by adding each integrated value of the acceleration parts to the integrated value of the acceleration signal of said room acceleration sensor, and drives the occupant protection device when one of the added values exceeds the predetermined threshold value.

34. The control apparatus of claim 32, wherein:

said control unit has a front reference value for deciding whether to integrate the acceleration signal of said front acceleration sensor;

said control unit extracts the acceleration part to integrate when the acceleration signal of said front acceleration sensor is larger than the front reference value; and said control unit, when the acceleration signal of said front acceleration sensor is smaller than the front reference value, processes the integrated value of the acceleration signal of said front acceleration sensor gradually toward a reset direction.

35. A control apparatus of an occupant protection device having a room acceleration sensor, provided in a room of a vehicle, for detecting an acceleration of the vehicle and outputting an acceleration signal representative thereof, comprising:

first and second front acceleration sensors provided in a front part of the vehicle, each of said first and second front acceleration sensors detecting the acceleration of the vehicle and outputting an acceleration signal representative thereof or an integrated value of the acceleration signal as a sensor output; and a control unit, connected to said room acceleration sensor, said first front acceleration sensor and said second front acceleration sensor, for inputting the acceleration signal of said room acceleration sensor and the sensor outputs of said first and second front acceleration sensors, said control unit driving the occupant protection device when an integrated value of the acceleration signal of said room acceleration sensor exceeds a predetermined threshold value, said control unit detecting whether the vehicle is in the collision requiring to drive the occupant protection device based on each sensor output of said first and second acceleration sensors, respectively, said control unit recognizing a first collision time representative of a time point of the collision detected based on the sensor output of said first front acceleration sensor, and recognizing a second collision time representative of a time point of the collision detected based on the sensor output of said second front acceleration sensor, said control unit adding a predetermined addition value to the integrated value of the acceleration signal of said room acceleration sensor when a time difference between the first collision time and the second collision time is smaller than a predetermined time value.

36. The control apparatus of claim 35, wherein said first and second front acceleration sensors are provided near right and left portions of a radiator of a vehicle front, respectively.

37. The control apparatus of claim 35, wherein said each of said first and second front acceleration sensors comprises:

a piezo-electric element for detecting the acceleration;

an amplifier circuit for inputting voltage outputs of both ends of said piezo-electric element, and for outputting the acceleration signal by differentially amplifying the voltage outputs of said piezo-electric element;

a bias resistor circuit provided at an input side of said amplifier circuit;

a condenser inserted in parallel with said piezo-electric element so as to lower a lower cut-off frequency without increasing resistance values of said bias resistor circuit;

temperature compensation means for adjusting a gain of said amplifier circuit so that an output-temperature characteristic of said piezo-electric element is compensated; and a reference voltage circuit for giving a reference potential to said amplifier circuit and said bias resistor circuit.

38. The control apparatus of claim 37, wherein:

said amplifier circuit includes a first non-inverting amplifier circuit for non-inversion amplifying one voltage output of said piezo-electric element, a second non-inverting amplifier circuit for non-inversion amplifying the other voltage output of said piezo-electric element, and a differential amplifier circuit for differentially amplifying outputs of said first and second non-inverting amplifier circuits; and said temperature compensation means is a single temperature compensation element for adjusting gains of said first and second non-inverting amplifier circuits.

39. The control apparatus of claim 38, wherein:

said first non-inverting amplifier circuit has a first operational amplifier, one input terminal of the first operational amplifier being connected to one end of said piezo-electric element, and the other input terminal of the first operational amplifier being connected through a first resistor to an output terminal of the first operational amplifier;

said second non-inverting amplifier circuit has a second operational amplifier, one input terminal of the second operational amplifier being connected to the other end of said piezo-electric element, and the other input terminal of the second operational amplifier being connected through a second resistor to an output terminal of the second operational amplifier; and said temperature compensation element is inserted between the other input terminal of the first operational amplifier and the other input terminal of the second operational amplifier, and decreases the gains of the first and second operational amplifiers when temperature rises and increases these gains when temperature drops.

40. The control apparatus of claim 38, wherein the gains of said first and second non-inverting amplifier circuits are set so that decrement in the voltage outputs of said piezo-electric element due to the parallel insertion of said condenser to said piezo-electric element can be supplemented.

41. The control apparatus of claim 38, wherein:

said differential amplifier circuit has an operational amplifier, one input terminal of the operational amplifier receiving the output of said second non-inverting amplifier circuit and the reference potential of said reference voltage circuit, and the other input terminal of the operational amplifier receiving the output of said first non-inverting amplifier circuit; and said reference voltage circuit has a reference voltage buffer amplifier for matching with output impedances of said first and second non-inverting amplifier circuits, and supplies the reference potential to at least said differential amplifier circuit by way of the reference voltage buffer amplifier.

42. The control apparatus of claim 37, wherein a capacity of said condenser is set so that resistors of said bias resistor circuit have values that can be used in a normal atmosphere and so that the lower cut-off frequency have a low value in which velocity variations can easily be detected.

43. The control apparatus of claim 37, wherein:

each front acceleration sensor has a sensor power supply line to which a constant voltage is supplied from an outside, an output terminal of said amplifier circuit of each front acceleration sensor is grounded by way of an output resistor, and the acceleration signal or the integrated value of the acceleration signal of each front acceleration sensor is output as current variations in the sensor power supply line; and said control unit includes unit power supply lines for supplying the constant voltages to the sensor power supply line of each front acceleration sensor by way of transmission cables, and first and second receiving circuits for receiving the acceleration signal or the integrated value of the acceleration signal of each front acceleration sensor by detecting the current variations in the unit power supply lines, respectively.

44. The control apparatus of claim 43, wherein each of the first and second receiving circuits comprises:

a current mirror circuit, inserted between the unit power supply line and the transmission cable, for giving a current output according to the current variations representative of the acceleration signal of said front acceleration sensor; and a detection resistor, inserted between an output side of the current mirror circuit and the ground, for outputting a voltage signal corresponding to the current output of the current mirror circuit.

45. The control apparatus of claim 35, wherein each of said first and second front acceleration sensors comprises:

a piezo-electric element for detecting the acceleration;

an amplifier circuit for inputting voltage outputs of both ends of said piezo-electric element, for differentially amplifying and integrating the voltage outputs of said piezo-electric element, and for outputting the integrated value of the acceleration signal as the sensor output;

a bias resistor circuit provided at an input side of said amplifier circuit;

a condenser inserted in parallel with said piezo-electric element so as to lower a lower cut-off frequency without increasing resistance values of said bias resistor circuit;

temperature compensation means for adjusting a gain of said amplifier circuit so that an output-temperature characteristic of said piezo-electric element is compensated; and a reference voltage circuit for giving a reference potential to said amplifier circuit and said bias resistor circuit.

46. The control apparatus of claim 45, wherein:

said amplifier circuit includes a first non-inverting amplifier circuit for non-inversion amplifying one voltage output of said piezo-electric element, a second non-inverting amplifier circuit for non-inversion amplifying the other voltage output of said piezo-electric element, and a differential amplifier circuit for differentially amplifying outputs of said first and second non-inverting amplifier circuits, said first and second non-inverting amplifier circuits and/or said differential amplifier circuit having an integrating function; and said temperature compensation means is a single temperature compensation element for adjusting gains of said first and second non-inverting amplifier circuits.

47. The control apparatus of claim 46, wherein:

said first non-inverting amplifier circuit has a first operational amplifier, one input terminal of the first operational amplifier being connected to one end of said piezo-electric element, and the other input terminal of the first operational amplifier being connected to an output terminal of the first operational amplifier by way of a parallel connection of a first resistor and a first condenser;

said second non-inverting amplifier circuit has a second operational amplifier, one input terminal of the second operational amplifier being connected to the other end of said piezo-electric element, and the other input terminal of the second operational amplifier being connected to an output terminal of the second operational amplifier by way of a parallel connection of a second resistor and a second condenser; and said temperature compensation element is inserted between the other input terminal of the first operational amplifier and the other input terminal of the second operational amplifier, and decreases the gains of the first and second operational amplifiers when temperature rises and increases these gains when temperature drops.

48. The control apparatus of claim 46, wherein said differential amplifier circuit has a third operational amplifier, one input terminal of the third operational amplifier being connected to an output terminal of said second non-inverting amplifier circuit by way of a third resistor and being connected to said reference voltage circuit by way of a parallel connection of a fourth resistor and a third condenser, and the other input terminal of the third operational amplifier being connected to an output terminal of said first non-inverting amplifier circuit by way of a fifth resistor and being connected to an output terminal of the third operational amplifier by way of a parallel connection of a sixth resistor and a fourth condenser.

* * * * *